United States Patent
Currivan et al.

(10) Patent No.: US 7,415,061 B2
(45) Date of Patent: Aug. 19, 2008

(54) CANCELLATION OF BURST NOISE IN A COMMUNICATION SYSTEM WITH APPLICATION TO S-CDMA

(75) Inventors: Bruce J. Currivan, Dove Canyon, CA (US); Nabil R. Yousef, Foothill Ranch, CA (US); Thomas J. Kolze, Phoenix, AZ (US); Gottfried Ungerboeck, Langnau a.A. (CH)

(73) Assignee: Broadcom Corporation, Irvine, CA (US)

( * ) Notice: Subject to any disclaimer, the term of this patent is extended or adjusted under 35 U.S.C. 154(b) by 735 days.

(21) Appl. No.: 11/089,139

(22) Filed: Mar. 24, 2005

(65) Prior Publication Data

US 2005/0163196 A1 Jul. 28, 2005

Related U.S. Application Data

(63) Continuation-in-part of application No. 10/142,189, filed on May 8, 2002, now Pat. No. 7,110,434, which is a continuation-in-part of application No. 09/652,721, filed on Aug. 31, 2000, now Pat. No. 6,778,611.

(60) Provisional application No. 60/647,182, filed on Jan. 26, 2005, provisional application No. 60/367,564, filed on Mar. 26, 2002, provisional application No. 60/151,680, filed on Aug. 31, 1999.

(51) Int. Cl.
*H04B 1/707* (2006.01)
(52) U.S. Cl. ...................... 375/144; 375/148
(58) Field of Classification Search ................ 375/141, 375/144, 145, 148, 149, 261; 370/320, 335, 370/342, 441
See application file for complete search history.

(56) References Cited

U.S. PATENT DOCUMENTS

2005/0047489 A1 * 3/2005 Yousef et al. .............. 375/148

FOREIGN PATENT DOCUMENTS

| EP | 1 235 402 A | 8/2002 |
|---|---|---|
| WO | WO 01 91337 A | 11/2001 |
| WO | WO 02 101953 A | 12/2002 |

OTHER PUBLICATIONS

Terayon: "DOCSIS 2.0 and Advanced S-CDMA Maximizing te Data Return Path," Terayon White Paper, 'Online!', XP002244687—retrieved from the Internet <URL: www.terayon.com/admin/file_handler/92db67a670062e801146dbe9011350fa/1014605152/PHYWhitePaper_R3_final.pdf>, retrieved on Jun. 17, 2003.
"Performance Analysis of the Adaptive Projection Receiver for Joint Detection of CDMA" by Tao Wu, Christian Schlegel; Electrical Engineering Department, University of Utah, Salt Lake City, UT 84112; pp. 2250-2254; copyright 1999 IEEE.

* cited by examiner

*Primary Examiner*—Don N Vo
(74) *Attorney, Agent, or Firm*—Garlick Harrison & Markison; Bruce E. Garlick

(57) ABSTRACT

A communication system performs burst noise cancellation. A transmitter produces and transmits a spread signal that comprises at least one known-value symbol spread by a plurality of non data-carrying orthogonal codes and data symbols spread by at least one data-carrying orthogonal code. The transmitter transmits the spread signal across a communication link that introduces burst noise. A burst noise detector determines burst noise affected chips of the orthogonal codes. A weight computation functional block calculates a plurality of complex-valued combining weights based upon the burst noise affected chips. A vector de-spreader and a linear combiner operate in combination to use the plurality of non data-carrying orthogonal codes, the at least one data-carrying orthogonal code, and the plurality of complex-valued combining weights to de-spread the received spread signal to produce the data symbols with the burst noise substantially removed.

22 Claims, 38 Drawing Sheets

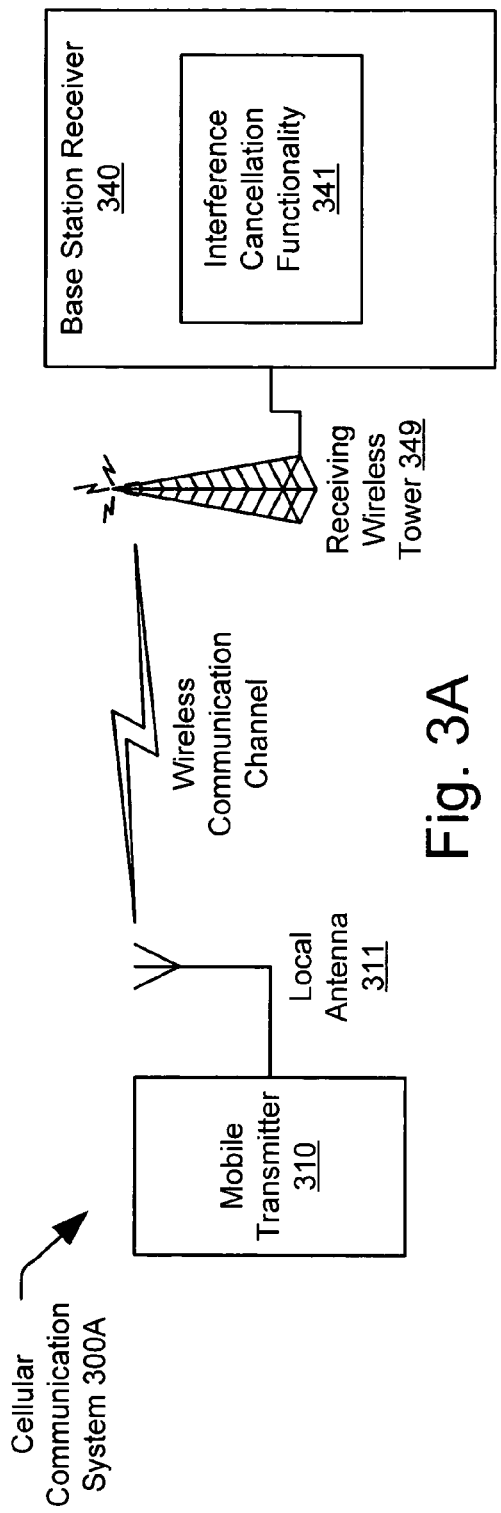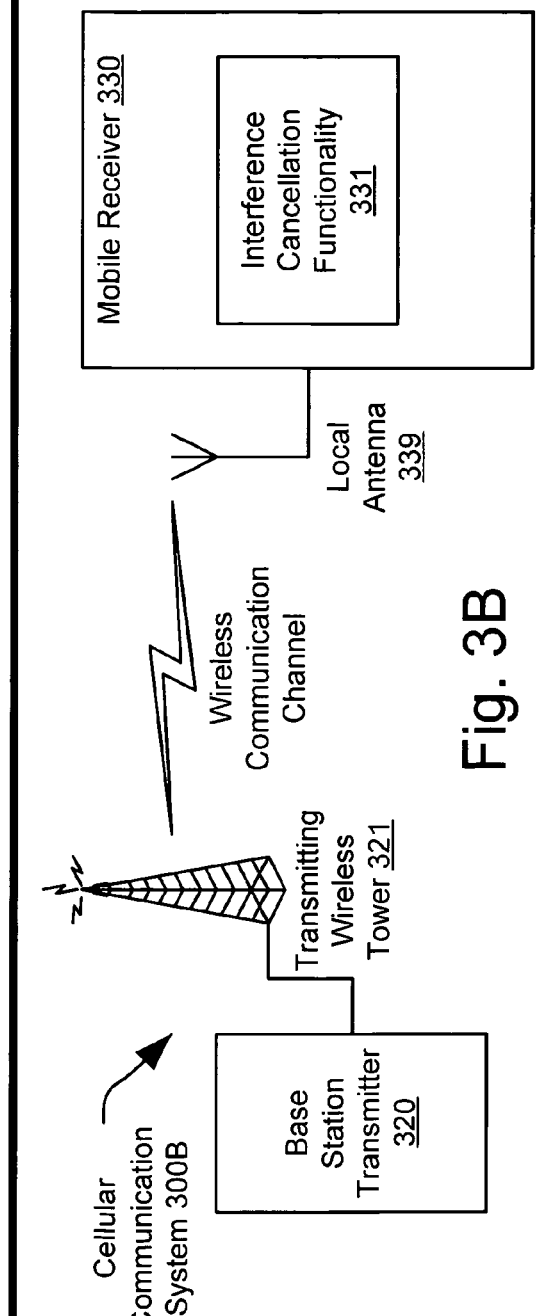
Fig. 3A
Fig. 3B

CANCELLATION OF BURST NOISE IN A COMMUNICATION SYSTEM WITH APPLICATION TO S-CDMA

CROSS REFERENCES TO RELATED APPLICATIONS

The present U.S. Utility Patent Application is a continuation-in-part of U.S. Regular Utility Pat. application Ser. No. 10/142,189, filed May 8, 2002, now U.S. Pat. No. 7,110,434 pending, which claims priority under 35 U.S.C. 119(e) to U.S. Provisional Patent Application Ser. No. 60/367,564, filed Mar. 26, 2002 and which is a continuation-in-part of U.S. Utility application Ser. No. 09/652,721, filed Aug. 31, 2000, issued as U,S. Pat. No. 6,778,611 on Aug. 17, 2004, which claims priority under 35 U.S.C. 119(e) to U.S. Provisional Application Ser. No. 60/151,680, filed Aug. 31, 1999. The present application also claims priority to U.S. Provisional Application Ser. No. 60/647,182, filed Jan. 26, 2005. All of these prior applications are incorporated herein by reference in their entirety and are made part of the present U.S. Utility Patent Application for all purposes.

BACKGROUND OF THE INVENTION

1. Technical Field of the Invention

The invention relates generally to communication systems; and, more particularly, it relates to communication systems that may be affected by undesirable interference.

2. Description of Related Art

Signal processing within communication systems having a communication channel, in an effort to improve the quality of signals passing through the communication channel, has been under development for many years. In the past several years, emphasis has moved largely to the domain of digital communication systems that modulate bit streams into an analog signal for transmission over a communication channel. This channel can be a variety of channel types. Many different approaches are employed in the prior art to try to minimize or substantially reduce the effects of interference that may be introduced into a signal that is transmitted across a communication channel. In particular, the prior art approaches that seek to perform cancellation of interference that occupies a small number of signal dimensions in a signal are typically deficient for a number of reasons as is briefly referenced below. One particular type of interference that these prior art schemes seek to minimize is the narrowband interference that is sometimes referred to as ingress interference. Another type of interference occupying only a subset of the dimensions used by the signaling waveform is the interference of impulse/burst noise. Yet another type of interference that may be problematic is within the code division multiple access (CDMA) context when the interference is on a small number of codes. In the present context, the term "code," "spreading code" or "despreading code" refers to a sequence of chips which are used to spread or despread a signal, such as in a spread-spectrum or CDMA system. This usage should not be confused with the language used to describe forward error correction (FEC) coding.

One of the main methods employed in the prior art to eliminate narrowband interference is the use of a notch filter. This solution is sufficient in some applications, but the notch filter itself oftentimes causes distortion of the desired signal. In the CDMA context, this distortion is called inter-code interference (ICI). Then, another means must oftentimes be included to remove the very ICI that has been introduced by the notch filter. One way to do this is to de-spread the signal. Then, hard decisions are made using the de-spread signal. The hard decisions are then respread and passed through the notch filter and subtracted from the original signal to remove the estimated distortion. In some instances, this process is repeated numerous times to try to achieve an adequate result. These prior art approaches described above are deficient in that they suffer the effect of error propagation. The decision circuit is prone to make incorrect decisions, requiring many iterations before the process converges, if it ever converges at all.

Similar problems exist for iterative methods to remove impulse or burst noise. The excision of the chips associated with the impulse or burst noise may be thought of as a time-domain filter. This filter itself causes distortion of the desired signal. In the CDMA context, this distortion is called inter-code interference (ICI). Then, another means must oftentimes be included to remove the very ICI that has been introduced by the filter. One way to do this is to de-spread the signal. Then, hard decisions are made using the de-spread signal. The hard decisions are then respread and passed through the filter and subtracted from the original signal to remove the estimated distortion. In some instances, this process is repeated numerous times to try to achieve an adequate result. These prior art approaches described above are deficient in that they suffer the effect of error propagation. The decision circuit is prone to make incorrect decisions, requiring many iterations before the process converges, if it ever converges at all.

Various techniques have been used to overcome problems caused by burst noise interference. These techniques include Forward Error Correction (FEC) coding, Automatic Retransmission reQuest (ARQ) operations, and time spreading. FEC coding includes adding coded (or parity) bits in the transmitter. At the receiver, the parity bits are used to reconstruct the missing pieces of the signal that resulted from degradation by burst noise. An example of FEC coding is block coding such as Reed-Solomon coding, in which an N-symbol block is sent consisting of k information symbols and N–k parity symbols. A burst of noise corrupting up to $T = (N-k)/2$ Reed-Solomon symbols can be corrected, and if erasure decoding is used, up to 2T Reed-Solomon symbols can be marked for erasure and the information is still recovered. With ARQ operations, error detection at the receiver determines missing data packets (or portions thereof) that were affected by the burst noise and causes retransmission of such missing data packets. ARQ operations introduce latency due to the requirements of lost data detection and retransmission.

Time spreading in Code Division Multiple Access (CDMA) systems, e.g., in an S-CDMA DOCSIS 2.0 system, spreads each data symbol across a time period. A given noise burst therefore may appear only during a partial duration of the data symbol. The effect of the noise burst can be repaired by coding and/or other techniques. Time spreading has a limited range over which it operates effectively, since burst noise that is very strong, that is of long duration compared to a spread symbol (e.g., many chips), or that corrupts more FEC symbols than the FEC is capable of correcting, can overwhelm the communication system.

Further limitations and disadvantages of conventional and traditional systems will become apparent through comparison of such systems with the invention as set forth in the remainder of the present application with reference to the drawings.

SUMMARY OF THE INVENTION

A communication system that is operable to perform burst noise cancellation helps to solve the above-described problems among others. The burst noise cancellation may operate alone, or in conjunction with the above-mentioned elements such as FEC and iterative processing. The communication system includes a transmitter and a receiver. The transmitter is operable to produce a spread signal that comprises at least one known-value symbol (which in one embodiment may be zero) spread by a plurality of non data-carrying orthogonal codes and data symbols spread by at least one data-carrying orthogonal code. The transmitter is further operable to transmit the spread signal across a communication link. The receiver is operable to receive the spread signal after being transmitted across the communication link. Upon receipt by the receiver, the received spread signal may include burst noise. The receiver includes a burst noise detector, a weight computation functional block, a vector de-spreader, and a linear combiner. The burst noise detector is operable to determine burst-noise-affected chips of the orthogonal codes. The weight computation functional block is operable to calculate a plurality of complex-valued combining weights based upon the burst-noise-affected chips. The vector de-spreader and the linear combiner are operable in combination to use the plurality of non data-carrying orthogonal codes, the at least one data-carrying orthogonal code, and the plurality of complex-valued combining weights to de-spread the received spread signal to produce the data symbols with the burst noise substantially removed. Although the codes are assumed herein to be orthogonal, the invention may be applied to nearly orthogonal (quasi-orthogonal) codes as well.

According to a first embodiment of the receiver, the vector de-spreader is operable to despread the received spread signal using the plurality of non data-carrying orthogonal codes to produce a plurality of non data-carrying despread signals and to despread the received spread signal using the at least one data-carrying orthogonal code to produce at least one data-carrying despread signal. Further, according to the first embodiment, the linear combiner is operable to apply the plurality of complex-valued combining weights to the plurality of non data-carrying despread signals to produce a plurality of complex-valued adjusted non data-carrying despread signals and to combine the plurality of complex-valued adjusted non data-carrying despread signals with the at least one data-carrying despread signal to produce the data symbols with the burst noise substantially removed. That is, in the first embodiment, the signals are first despread, and then the despread signals are combined to remove the interference.

According to a second embodiment of the receiver, the vector de-spreader is operable to despread the received spread signal using the plurality of non data-carrying orthogonal codes to produce a plurality of non data-carrying despread signals and to despread the received spread signal using the at least one data-carrying orthogonal code to produce at least one data-carrying despread signal. Further, according to the second embodiment, the linear combiner is operable to apply the plurality of complex-valued combining weights to the plurality of non data-carrying despread signals and to the at least one data-carrying despread signal to produce a plurality of complex-valued adjusted despread signals and to combine the plurality of complex-valued adjusted despread signals to produce the data symbols with the burst noise substantially removed. That is, in the second embodiment, the signals are first despread, and then the despread signals are combined, including a weight assigned to the data-carrying code, to remove the interference.

According to a third embodiment of the receiver, the linear combiner is operable to apply the plurality of complex-valued combining weights to the plurality of non data-carrying orthogonal codes to produce a plurality of complex-valued weighted non-data carrying orthogonal codes and to combine the plurality of complex-valued weighted non-data carrying orthogonal codes with the at least one data-carrying orthogonal code to produce an adapted rotated code. Further, with the third embodiment, the vector de-spreader is operable to despread the received spread signal using the adapted rotated code to produce the data symbols with the burst noise substantially removed. That is, in the second embodiment, the codes are first combined to produce an adapted rotated code, then the signals are despread using this combined code to remove the interference.

According to a fourth embodiment of the receiver, the linear combiner is operable to apply the plurality of complex-valued combining weights to the plurality of non data-carrying orthogonal codes and to the at least one data-carrying orthogonal code to produce a plurality of complex-valued weighted orthogonal codes and to combine the plurality of complex-valued weighted orthogonal codes to produce an adapted rotated code. Further, with the fourth embodiment, the vector de-spreader is operable to despread the received spread signal using the adapted rotated code to produce the data symbols with the burst noise substantially removed. That is, in the second embodiment, the codes are first combined to produce an adapted rotated code, including a weight assigned to the data-carrying code, then the signals are despread using this combined code to remove the interference.

The weight computation functional block may employ at least one of least mean square processing and least square processing, or any other optimization method, to calculate the plurality of complex-valued combining weights. The data symbols may be modulated according to, for example, Binary Phase Shift Keying (BPSK), Quadrature Phase Shift Keying (QPSK), 8 Quadrature Amplitude Modulation (QAM), 16 QAM, 32 QAM, 64 QAM, 128 QAM, 256 QAM, 516 QAM, and 1024 QAM. The receiver may be, for example, a multi-channel headend physical layer burst receiver, a single chip wireless modem, a single chip Data Over Cable Service Interface Specification (DOCSIS)/EuroDOCSIS cable modem, a base station receiver, a mobile receiver, a satellite earth station, a tower receiver, a high definition television set top box receiver, and a transceiver. Another embodiment of the present invention includes simply a receiver. Still another embodiment includes a method of operation. In addition, other aspects, advantages, and novel features of the invention will become apparent from the following detailed description of the invention when considered in conjunction with the accompanying drawings.

BRIEF DESCRIPTION OF THE DRAWINGS

A better understanding of the present invention can be obtained when the following detailed description is considered in conjunction with the following drawings.

FIG. 3A is a system diagram illustrating an embodiment of a cellular communication system that is built according to the present invention.

FIG. 3B is a system diagram illustrating another embodiment of a cellular communication system that is built according to the present invention.

DETAILED DESCRIPTION OF THE DRAWINGS

Figure 1:
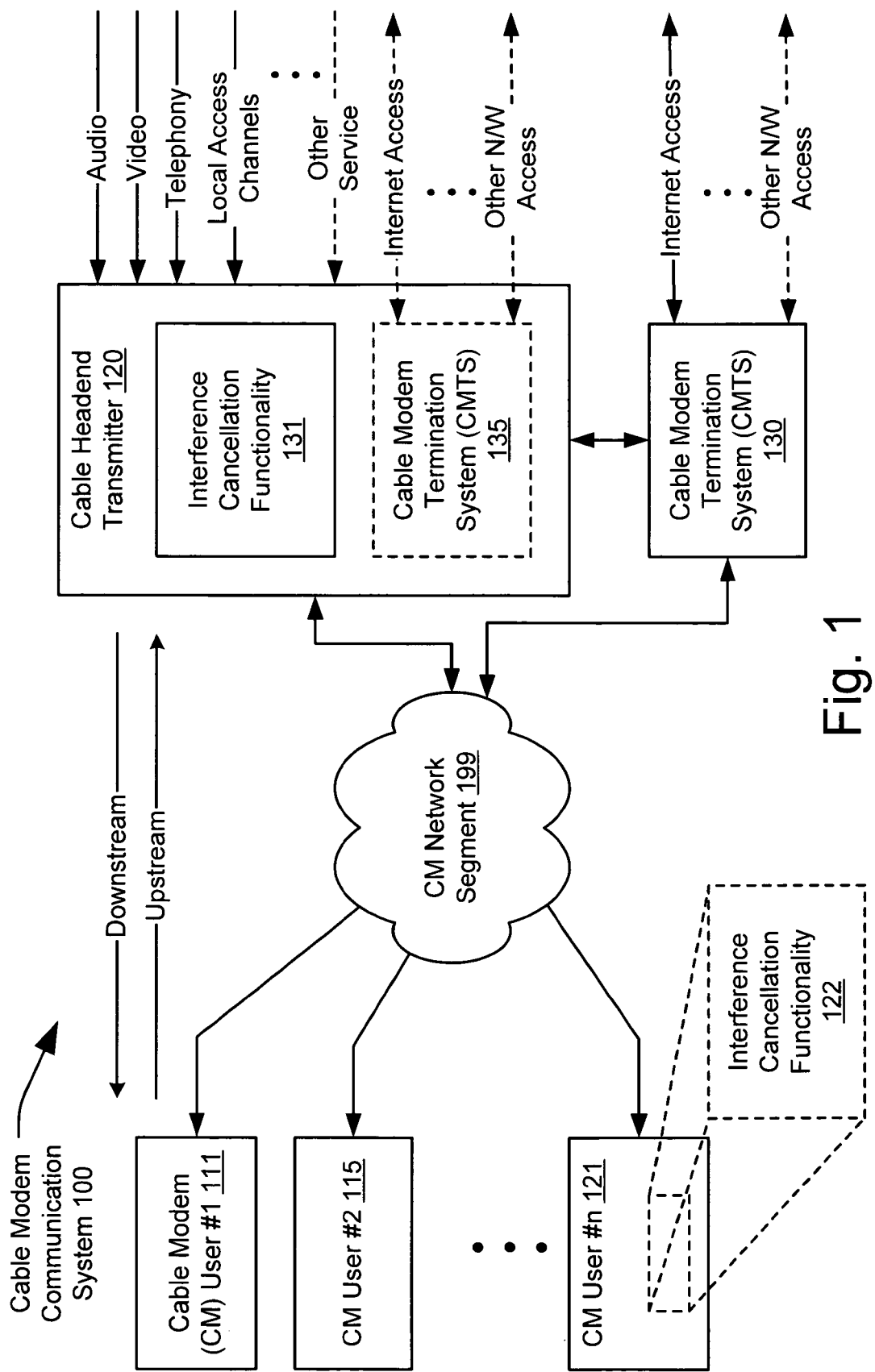
FIG. 1 is a system diagram illustrating an embodiment of a cable modem (CM) communication system that is built according to the present invention.

The present invention provides a solution for interference cancellation for communication systems (where a medium is used by one user or if shared among many users). More specifically, the present invention is applicable within code-division multiple access (CDMA) communication systems, as well as synchronous code-division multiple access (S-CDMA) communication systems. One particular type of S-CDMA communication system that may benefit from the present invention is the Data Over Cable Service Interface Specifications (DOCSIS) version 2.0 S-CDMA that is operable for communication systems. The present invention presents a solution that provides for cancellation of interference in any such communication systems. The interference cancellation may be viewed as being directed primarily towards the type of interference that occupies a small number of signal dimensions. Examples of such types of interference include narrowband interference (herein also referred to as ingress) or impulse/burst noise. The present invention also provides a solution where it may operate in the presence of simultaneous narrowband interference and impulse/burst noise and to substantially eliminate them both.

The present invention provides an approach for interference cancellation that provides a number of benefits including a completely linear method of canceling ingress that employs no DFE (Decision Feedback Equalizer) or SIC (Successive Ingress Cancellation). This approach can cancel wideband ingress and may be implemented in a relatively simple and efficient structure. Moreover, the present invention may be combined relatively easily, given its simple and efficient structure, with other methods and systems that may assist in the interference cancellation.

The present invention uses a linear combination of the unused dimensions (for example, the unused orthogonal codes) to cancel the interference. This may be done after the de-spreader, or, equivalently, as part of the de-spreading process. There is no appreciable inter-code interference introduced and no decision errors are made as part of this process. The allocation of unused codes reduces the capacity of the system by a small amount; for example, to 120/128 of the original capacity for a system of 128 codes where 8 unused codes are employed. The term "codes" is generally used herein to describe orthogonal codes. In some embodiments, these codes are orthonormal as well. Quasi-orthogonal codes may also be used. It is noted here that the specific examples of 120 active codes and 8 unused codes in a system having 128 available codes is exemplary. Clearly, other embodiments may be employed (having different numbers of codes—both different numbers of used and unused) without departing from the scope and spirit of the invention.

From certain perspectives, the present invention may be viewed as being an extension of sub-dimensional modulation that is employed for TDMA (Time Division Multiple Access), and it may then be extended to S-CDMA (Synchronous Code Division Multiple Access). To begin this discussion, we consider an example case where 120 active codes are used and narrowband ingress (narrowband interference) is present. (The same principles will apply to burst noise cancellation as to narrowband ingress cancellation.) The remaining 8 codes are then transmitted as true zero symbols. At the receiver, the unused 8 codes are received with samples of the narrowband ingress. This information may then be used to cancel the ingress in the same manner that is used in sub-dimensional modulation. The 8 unused codes are considered as extra dimensions and the receiver is trained based on this information.

We continue on with 128 code example (8 of the codes being unused). By employing the 8 unused spreading codes, linear combinations of these 8 codes may be added to any other code that is transmitted from a transmitter to a receiver, and the resulting composite waveform can be used for de-spreading that one transmitted code. Since, ideally, no signal is present on any of these 8 codes (being zero codes), little or no inter-code interference from the transmitters will be induced. In AWGN (Additive White Gaussian Noise), the inclusion of these additional de-spreading codes serves to merely increase the noise at the decision slicer for the code of interest. However, in the presence of interference, such as narrowband interference, some combination of these codes in the de-spreading process is operable to reduce the ingress enough to overcome the increased AWGN and make it worthwhile. Heuristically, the unused codes may correlate somewhat with the interference, and if so, may be used to "subtract" some component of the interference at the decision slicer, as a type of noise canceller.

The similarity of this approach is somewhat analogous to the functionality of an ICF (Ingress Cancellation Filter). In certain embodiments, a TDMA-only, CDMA-only, and/or a TDMA/CDMA burst receiver may be leveraged for this S-CDMA application, including the use of the Trench method or derivative that is mentioned below.

It is noted that the approach to reducing the interference power at the decision point using only the unused codes may not be optimal in certain embodiments, since using codes with data carried on them may offer some interference rejection overcoming the introduction of the transmitter inter-code interference. It is also noted that including "in use" codes would actually provide benefit in practical situations.

It is also noted that using a strict LMS (Least Mean Square) type of approach to converging 128 taps to the desired de-spreading code may prove laborious (in terms of requiring many iterations). This approach does not focus on just the unused codes, and has far more degrees of freedom than just finding 8 coefficients for the weightings of the 8 unused codes. If LMS is used, constraints may be employed to reduce the number of degrees of freedom.

Analysis has shown that indeed there is great similarity in the formulation and solution of the optimal taps in the monic filter of the ICF for ingress cancellation, and in this application of unused spreading codes in ingress cancellation for S-CDMA. Both can be formulated in a LS (Least Squares) type of problem, with the ensuing typical solution taking form.

One advantage that may arise for the TDMA ICF case is when the matrix to be inverted is Toeplitz (a Toeplitz matrix in addition a matrix in which all the elements are the same along any diagonal that slopes from northwest to southeast), and thus admits significant computational advantages, such as discovered by William Trench.

However, in the S-CDMA formulation with unused codes, the matrix to be inverted is not Toeplitz, and the Trench approach does not apply. There still may be some computational advantages due to the underlying construction of the matrix to be inverted, but it may be that only the traditional numerical methods such as Cholesky decomposition may introduce simplification. The matrix to be inverted is at least of the form $C^*RC$, where $C=128\times8$, with each column orthogonal with the others (a sub-matrix of a Unitary matrix), and $R=128\times128$ and is Toeplitz, and * stands for complex conjugate.

One implementation of the present invention may be described as shown below.

Let $R=R_{m,n}=E\{r^*(m)\ r(n)\}$, where $r(n)$ are noise and ingress samples, containing little or no signal. R is $128\times128$, where the samples correspond to the noise in the chips of a spreading interval. The symbol * denotes complex conjugate. This is the noise (or noise plus interference) covariance matrix.

Let $C=[c1\ c2\ c3\ c4\ c5\ c6\ c7\ c8]$, where $ci$=column of 128 chips of $i^{th}$ unused spreading code. C is 128 rows by 8 columns.

Let:

$dsc_{opt}$=optimal de-spreading code for code-of-interest $c_k$, (written alternatively below)

$dsc_{opt}=c_k+w_1c1+w_2c2+\ldots+w_8c8$, where $dsc_{opt}$ is a column vector with 128 components, and $w_i$ are scalar weighting coefficients.

Thus, $dsc_{opt}=[1 \ w_1 \ w_2 \ ... \ w_8][c_k \ c1 \ c2 \ ... \ c8]$, and we can see that the optimal solution for the S-CDMA case indeed has a form similar to the monic filter in the TDMA ICF solution.

Let $w_{opt}=[w_1 \ w_2 \ ... \ w_8]$ which provides the optimal de-spreading for signaling with the $k^{th}$ spreading code.

It can be shown that $w_{opt}=-[C^T R C]^{-1}[C^T R]c_k$, where all the vectors, matrices, and notation are as defined above.

It is noted that with the ICF in TDMA, $$w_{opt} = -[R]^{-1}[r1 \ r2 \ r3 \ ... \ r16]^T, \text{ where}$$

$$R = \begin{bmatrix} r0 & r1 & r2 & ... & r16 \\ r1^* & r0 & r1 & ... & r15 \\ \vdots & & & \ddots & \vdots \\ r16^* & r15^* & ... & r1^* & r0 \end{bmatrix}$$

Another characteristic of the present invention is that the complexity of the method with the LS approach is high for large matrices compared to the ICF and Trench method with TDMA. However, this complexity is mitigated by the reduced matrix size resulting from the sub-space projection approach described here and below. From certain perspectives, the S-CDMA approach with unused codes may be viewed as not lending itself to the computational efficiencies of Trench approach or its derivatives.

However, using an LMS tap update approach has been found to work. The weights of the unused spreading codes, $w_i$, are updated in LMS fashion. In this method, the de-spreader for the code of interest is input to a decision slicer. The resulting complex error is computed. Similarly, each unused spreading code has its corresponding de-spreading operating. The result of the de-spreader corresponding to an unused spreading code is "signal," just as the "signal" rests in the various shift registers in the conventional FIR (Finite Impulse Response) filter in the normal LMS. The de-spread outputs for each of the unused codes is multiplied by the error vector, and then multiplied by a step size factor "-mu" and added to the existing tap weight, to update the tap weight.

With 8 unused spreading codes, there is a set of 8 tap weights for each used spreading code. Thus, with the 8 unused spreading codes, there are 8×120 tap weights to iterate.

This approach is much less computationally intensive than using an LS-based. The S-CDMA LMS approach introduces little additional computation when compared to operating the de-spreading codes themselves. This approach is beneficial for a number of reasons. It is computationally acceptable, in that, it limits the number of taps to only 8 (in our continuing example of 8 unused spreading codes), which almost certainly provides much more rapid convergence and less "tap noise." In addition, it eliminates from the search for optimal coefficients in the de-spreader those codes that are known to correspond to used codes.

FIG. 1 is a system diagram illustrating an embodiment of a CM communication system 100 that is built according to the present invention. The CM communication system includes a number of CMs (shown as a CM user #1 111, a CM user #2 115, ..., and a CM user #n 121) and a CMTS 130. The CMTS 130 is a component that exchanges digital signals with CMs on a cable network.

Each of a number of CM users, shown as the CM user #1 111, the CM user #2 115, ..., and the CM user #n 121, is able to communicatively couple to a CM network segment 199. A number of elements may be included within the CM network segment 199. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, a cable CMTS is in fact contained within a headend transmitter. In other embodiments, the functionality of the cable CMTS and the headend transmitter are represented as two distinct functional blocks so that their respective contribution may be more easily appreciated and understood. This viewpoint is shown in the situation where the CMTS 130 is pictorially shown as being located externally to a cable headend transmitter 120. In the more common representation and implementation, a CMTS 135 is located within the cable headend transmitter 120. The combination of a CMTS and a cable headend transmitter may be referred to as being the "cable headend transmitter" which supports the CMTS functionality. The CMTS 130 may be located at a local office of a cable television company or at another location within a CM communication system. In the following description, the CMTS 130 is used for illustration; yet, the same functionality and capability as described for the CMTS 130 may equally apply to embodiments that alternatively employ the CMTS 135. The cable headend transmitter 120 is able to provide a number of services including those of audio, video, telephony, local access channels, as well as any other service known in the art of cable systems. Each of these services may be provided to the one or more CM users 111, 115, ..., and 121.

In addition, through the CMTS 130, the CM users 111, 115, ..., 121 are able to transmit and receive data from the Internet, ..., and/or any other network to which the CMTS 130 is communicatively coupled. The operation of a CMTS, at the cable-provider's head-end, may be viewed as providing many of the same functions provided by a digital subscriber line access multiplexer (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specifications (DOCSIS), the major standard used by U.S. cable systems in providing Internet access to users.

The downstream information flows to all of the connected CM users 111, 115, ..., 121; this may be viewed to be in a manner that is similar to that manner within an Ethernet network. The individual network connection, within the CM network segment 199, decides whether a particular block of data is intended for it or not. On the upstream side, information is sent from the CM users 111, 115, ..., 121 to the CMTS 130; on this upstream transmission, the users within the CM users 111, 115, ..., 121 to whom the data is not intended do not see that data at all. As an example of the capabilities provided by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Embodiments implementing the present invention are described below and in the various Figures that show the data handling and control within one or both of a CM and a CMTS within a CM system that operates by employing S-CDMA (Synchronous Code Division Multiple Access).

The CMs of the CM users 111, 115, . . . , 121 and the CMTS 130 communicate synchronization information to one another to ensure proper alignment of transmission from the CM users 111, 115, . . . , 121 to the CMTS 130. This is where the synchronization of the S-CDMA communication systems is extremely important. When a number of the CMs all transmit their signals at a same time such that these signals are received at the CMTS 130 on the same frequency and at the same time, they must all be able to be properly de-spread and decoded for proper signal processing.

Each of the CMs users 111, 115, . . . , 121 is located a respective transmit distance from the CMTS 130. In order to achieve optimum spreading diversity and orthogonality for the CMs users 111, 115, . . . , 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, . . . , 121 will typically transmit to the CMTS 130 at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their S-CDMA data so that all CM transmissions will arrive synchronously at the CMTS 130.

The present invention enables interference cancellation within the CMTS 130, as shown in a functional block 131. The present invention may also be implemented to support interference cancellation within any one of the CMs 111, 115, . . . , 121; the particular implementation of interference cancellation is shown as a functional block 122 within the CM 122, yet it is understood that the interference cancellation functionality may also be supported within the other CMs as well. The CMTS 130 receives an input spread signal and is operable to perform dispreading and interference cancellation according to the present invention. The CMTS 130 is operable to employ a linear combiner that uses as inputs complex valued combining weights to the particular codes that are selectively used to assist in the interference cancellation of one of the de-spread signals that is de-spread from the input spread signal that the CMTS 130 receives. Alternatively, the present invention may be viewed as employing at least one of an adapted code and an adapted code matrix to perform interference cancellation according to the present invention.

Figure 2:
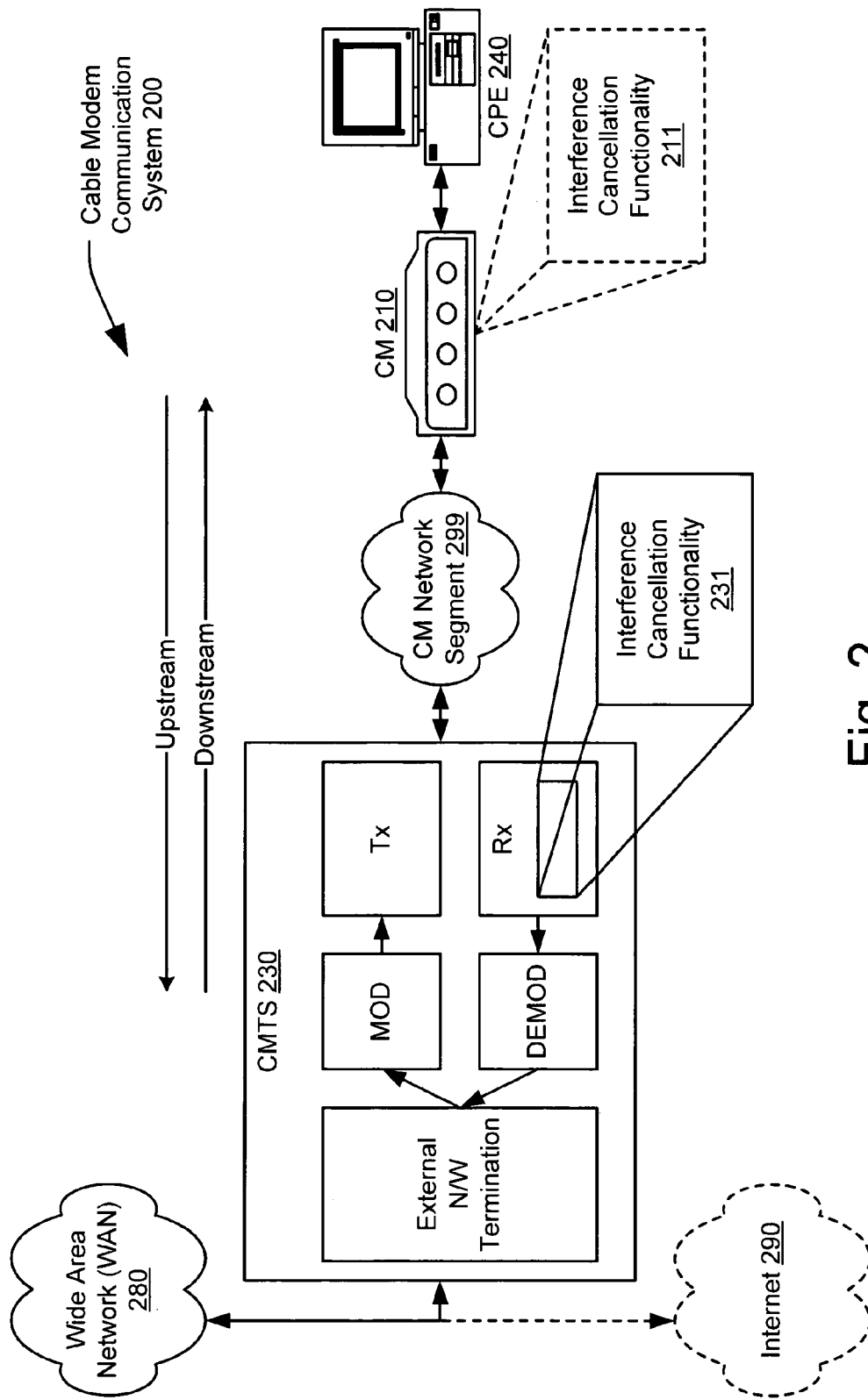
FIG. 2 is a system diagram illustrating another embodiment of a CM communication system that is built according to the present invention.

FIG. 2 is a system diagram illustrating another embodiment of a CM communication system 200 that is built according to the present invention. From certain perspectives, the FIG. 2 may be viewed as a communication system allowing bi-directional communication between customer premise equipment (CPE) 240 and a network. In some embodiments, the CPE 240 is a personal computer or some other device allowing a user to access an external network. The network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NSI: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via a CMTS-NSI. The CMTS 230 is operable to support the external network termination, for one or both of the WAN 280 and the Internet 290. The CMTS 230 includes a modulator and a demodulator to support transmitter and receiver functionality to and from a CM network segment 299. The receiver functionality within the CMTS 230 is operable to support interference cancellation functionality 231 according to the present invention. It is also noted that there may be embodiment where the CM 210 is also operable to support interference cancellation functionality using the present invention, as shown by a functional block 211. Implementing interference cancellation in the transmitter prevents noise enhancement that occurs when interference cancellation is performed in the receiver.

A number of elements may be included within the CM network segment 299. For example, routers, splitters, couplers, relays, and amplifiers may be contained within the CM network segment 299 without departing from the scope and spirit of the invention. The CM network segment 299 allows communicative coupling between a CM user and the CMTS 230. The FIG. 2 shows just one of many embodiments where the interference cancellation, performed according to the present invention, may be performed to provide for improved operation within a communication system.

FIG. 3A is a system diagram illustrating an embodiment of a cellular communication system 300A that is built according to the present invention. A mobile transmitter 310 has a local antenna 311. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 311, to a base station receiver 340 via a wireless communication channel. The base station receiver 340 is communicatively coupled to a receiving wireless tower 349 to be able to receive transmission from the local antenna 311 of the mobile transmitter 310 that have been communicated via the wireless communication channel. The receiving wireless tower 349 communicatively couples the received signal to the base station receiver 340.

The base station receiver 340 is then able to support interference cancellation functionality according to the present invention, as shown in a functional block 341, on the received signal. The FIG. 3A shows yet another of the many embodiments where the interference cancellation, performed according to the present invention, may be performed to provide for improved operation within a communication system.

FIG. 3B is a system diagram illustrating another embodiment of a cellular communication system that is built according to the present invention. From certain perspectives, the FIG. 3B may be viewed as being the reverse transmission operation of the cellular communication system 300B of the FIG. 3A. A base station transmitter 320 is communicatively coupled to a transmitting wireless tower 321. The base station transmitter 320, using its transmitting wireless tower 321, transmits a signal to a local antenna 339 via a wireless communication channel. The local antenna 339 is communicatively coupled to a mobile receiver 330 so that the mobile receiver 330 is able to receive transmission from the transmitting wireless tower 321 of the base station transmitter 320 that have been communicated via the wireless communication channel. The local antenna 339 communicatively couples the received signal to the mobile receiver 330. It is noted that the mobile receiver 330 may be any number of types of transmitters including a cellular telephone, a wireless pager unit, a mobile computer having transmit functionality, or any other type of mobile transmitter.

The mobile receiver 330 is then able to support interference cancellation functionality according to the present invention, as shown in a functional block 331, on the received signal. The FIG. 3B shows yet another of the many embodiments where the interference cancellation functionality, performed according to the present invention, may be performed to provide for improved operation within a communication system.

It is also noted that the embodiments described above within the FIGS. 3A and 3B may operate in conjunction within a single communication system. That is to say, a mobile unit (that supports both transmit and receive functionality) may be implemented to support interference cancellation functionality during receipt of signals while the base station device (that supports both transmit and receive functionality) may also be implemented to support interference cancellation functionality during receipt of signals. This way, both devices are operable to support the interference cancellation functionality according to the present invention at both ends of the communication link. This dual-end interference cancellation functionality is also true within other of the various embodiments described herein that illustrate both ends of a communication link.

It is further noted that the embodiments described above within the FIGS. 3A and 3B may operate in conjunction within a single communication system from yet another perspective. A mobile transmitter may be implemented to support interference cancellation functionality during signal processing and transmission of its signals to a base station receiver. Similarly, a base station transmitter may be implemented to support interference cancellation functionality during signal processing and transmission of its signals to a mobile unit receiver. This may be performed, at least in part, by adjusting a transmitted spectrum to meet a desired spectral mask. It may be desirable to attenuate certain portions of the spectrum using the subspace canceller. In these applications the canceller is predominantly located in the transmitter. Further detail of this interference cancellation within a transmitter device is presented below. This adjusting of a transmitted spectrum to meet a desired spectral mask may be performed within any of the various embodiments that include a transmitter that transmits a signal to a receiver according to the present invention.

Figure 4:
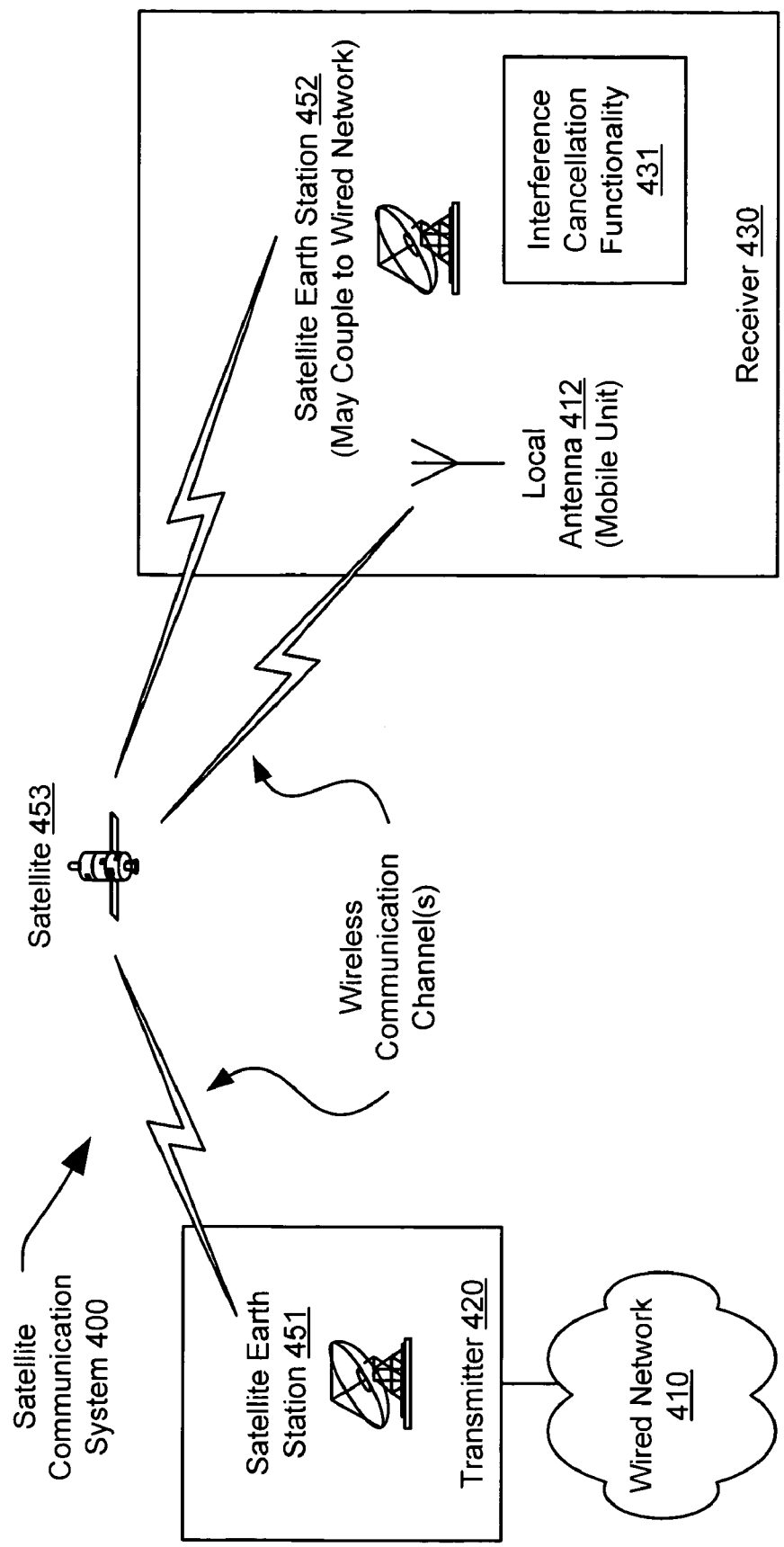
FIG. 4 is a system diagram illustrating an embodiment of a satellite communication system that is built according to the present invention.

FIG. 4 is a system diagram illustrating an embodiment of a satellite communication system 400 that is built according to the present invention. A transmitter 420 is communicatively coupled to a wired network 410. The wired network 410 may include any number of networks including the Internet, proprietary networks, and other wired networks. The transmitter 420 includes a satellite earth station 451 that is able to communicate to a satellite 453 via a wireless communication channel. The satellite 453 is able to communicate with a receiver 430. The receiver 430 is also located on the earth. Here, the communication to and from the satellite 453 may cooperatively be viewed as being a wireless communication channel, or each of the communication to and from the satellite 453 may be viewed as being two distinct wireless communication channels.

For example, the wireless communication "channel" may be viewed as not including multiple wireless hops in one embodiment. In other embodiments, the satellite 453 receives a signal received from the satellite earth station 451, amplifies it, and relays it to the receiver 430; the receiver 430 may include terrestrial receivers such as satellite receivers, satellite based telephones, and satellite based Internet receivers, among other receiver types. In the case where the satellite 453 receives a signal received from the satellite earth station 451, amplifies it, and relays it, the satellite 453 may be viewed as being a "transponder." In addition, other satellites may exist that perform both receiver and transmitter operations. In this case, each leg of an up-down transmission via the wireless communication channel would be considered separately. The wireless communication channel between the satellite 453 and a fixed earth station would likely be less time-varying than the wireless communication channel between the satellite 453 and a mobile station.

In whichever embodiment, the satellite 453 communicates with the receiver 430. The receiver 430 may be viewed as being a mobile unit in certain embodiments (employing a local antenna 412); alternatively, the receiver 430 may be viewed as being a satellite earth station 452 that may be communicatively coupled to a wired network in a similar manner that the satellite earth station 451, within the transmitter 420, communicatively couples to a wired network. In both situations, the receiver 430 is able to support interference cancellation functionality, as shown in a functional block 431, according to the present invention. For example, the receiver 430 is able to perform interference cancellation, as shown in a functional block 431, on the signal received from the satellite 453. The FIG. 4 shows yet another of the many embodiments where the interference cancellation, performed according to the present invention, may be performed to provide for improved receiver performance.

Figure 5A:
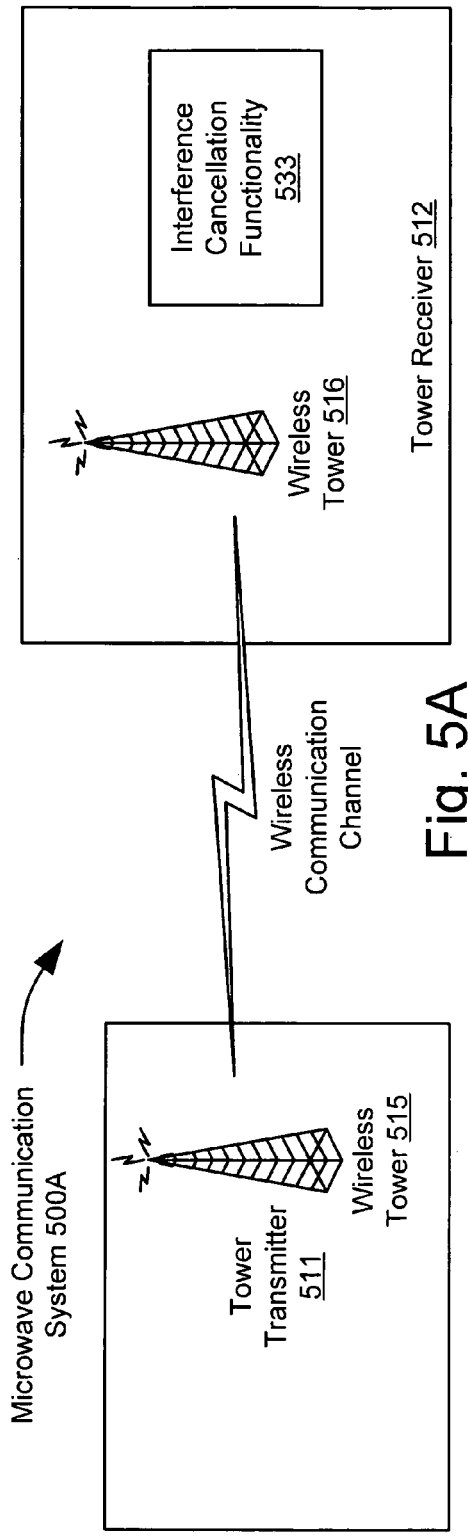
FIG. 5A is a system diagram illustrating an embodiment of a microwave communication system that is built according to the present invention.

FIG. 5A is a system diagram illustrating an embodiment of a microwave communication system 500A that is built according to the present invention. A tower transmitter 511 includes a wireless tower 515. The tower transmitter 511, using its wireless tower 515, transmits a signal to a tower receiver 512 via a wireless communication channel. The tower receiver 512 includes a wireless tower 516. The wireless tower 516 is able to receive transmissions from the wireless tower 515 that have been communicated via the wireless communication channel. The tower receiver 512 is then able to support interference cancellation functionality, as shown in a functional block 533. The FIG. 5A shows yet another of the many embodiments where interference cancellation, performed according to the present invention, may be performed to provide for improved receiver performance.

Figure 5B:
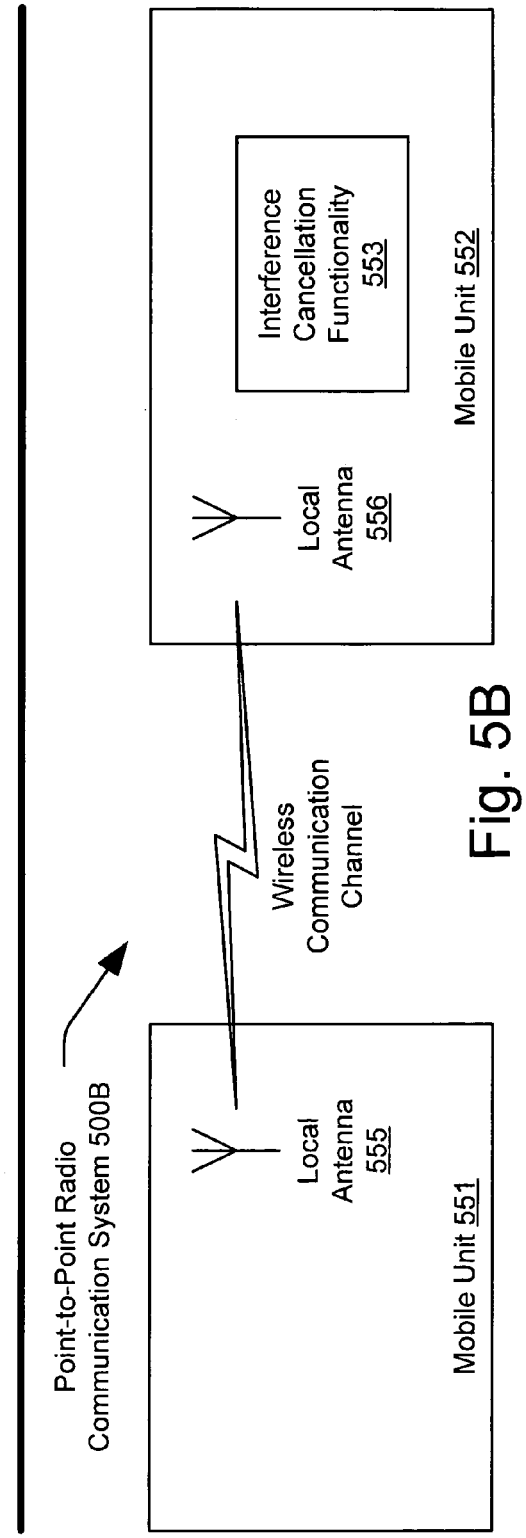
FIG. 5B is a system diagram illustrating an embodiment of a point-to-point radio communication system that is built according to the present invention.

FIG. 5B is a system diagram illustrating an embodiment of a point-to-point radio communication system 500B that is built according to the present invention. A mobile unit 551 includes a local antenna 555. The mobile unit 551, using its local antenna 555, transmits a signal to a local antenna 556 via a wireless communication channel. The local antenna 556 is included within a mobile unit 552. The mobile unit 552 is able to receive transmissions from the mobile unit 551 that have been communicated via the wireless communication channel. The mobile unit 552 is then able to support interference cancellation functionality, as shown in a functional block 553, on the received signal. The FIG. 5B shows just yet another of the many embodiments where interference cancellation, performed according to the present invention, may be performed to provide for improved receiver performance.

Figure 6:
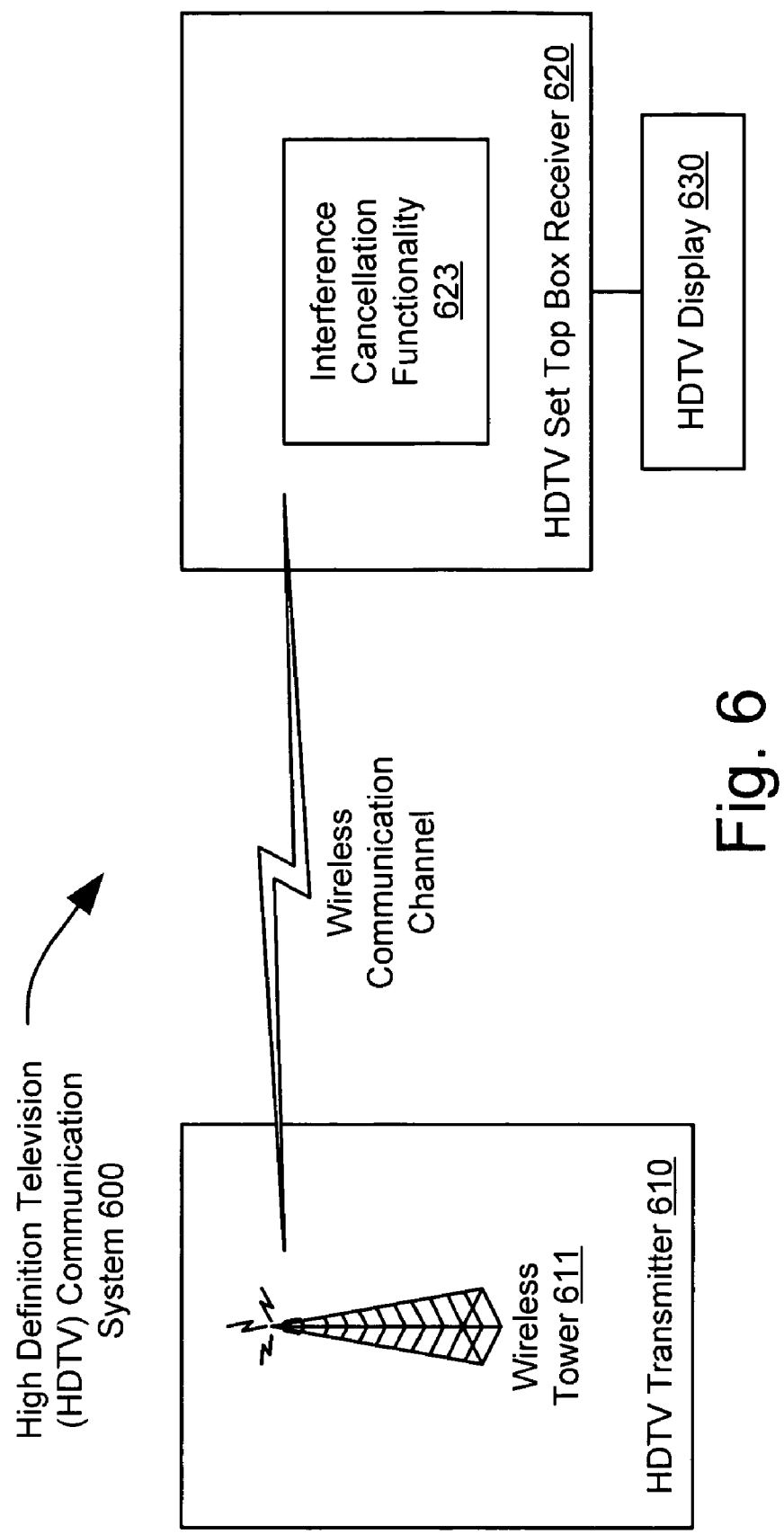
FIG. 6 is a system diagram illustrating an embodiment of a high definition (HDTV) communication system that is built according to the present invention.

FIG. 6 is a system diagram illustrating an embodiment of a high definition (HDTV) communication system 600 that is built according to the present invention. An HDTV transmitter 610 includes a wireless tower 611. The HDTV transmitter 610, using its wireless tower 611, transmits a signal to an HDTV set top box receiver 620 via a wireless communication channel. The HDTV set top box receiver 620 includes the functionality to receive the wireless transmitted signal. The HDTV set top box receiver 620 is also communicatively coupled to an HDTV display 630 that is able to display the demodulated and decoded wireless transmitted signals received by the HDTV set top box receiver 620.

The HDTV set top box receiver 620 is then able to support interference cancellation functionality, as shown in a functional block 623 to provide for improved receiver performance. The FIG. 6 shows yet another of the many embodiments where interference cancellation, performed according to the present invention, may be performed to provide for improved receiver performance.

Figure 7:
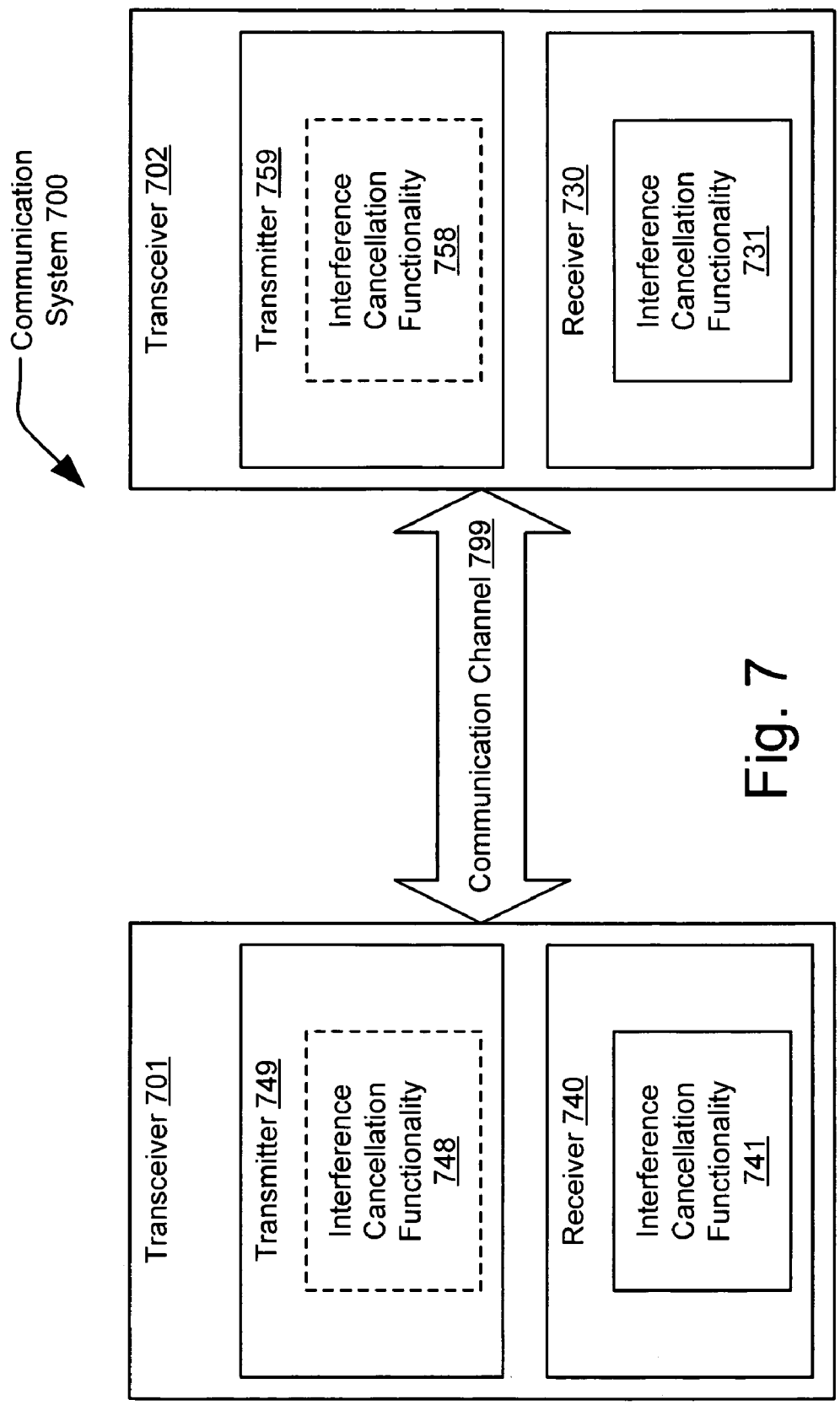
FIG. 7 is a system diagram illustrating an embodiment of a communication system that is built according to the present invention.

FIG. 7 is a system diagram illustrating an embodiment of a communication system that is built according to the present invention. The FIG. 7 shows communicative coupling, via a communication channel 799, between two transceivers, namely, a transceiver 701 and a transceiver 702. The communication channel 799 may be a wire line communication channel or a wireless communication channel.

Each of the transceivers 701 and 702 includes a transmitter and a receiver. For example, the transceiver 701 includes a transmitter 749 and a receiver 740; the transceiver 702 includes a transmitter 759 and a receiver 730. The receivers 740 and 730, within the transceivers 701 and 702, respectively, are each operable to support interference cancellation functionality according to the present invention. This will allow improved signal processing for both of the transceivers 701 and 702. For example, the receiver 740, within the transceiver 701, is able to support interference cancellation functionality, as shown in a functional block 741, on a signal received from the transmitter 759 of the transceiver 702. Similarly, the receiver 730, within the transceiver 702, is able to support interference cancellation functionality, as shown in a functional block 731, on a signal received from the transmitter 749 of the transceiver 701.

If desired in certain embodiments, the transmitters 749 and 759, within the transceivers 701 and 702, respectively, are each operable to support interference cancellation functionality according to the present invention. This will also allow improved signal processing for both of the transceivers 701 and 702. For example, the transmitter 749, within the transceiver 701, is able to support interference cancellation functionality, as shown in a functional block 748, on a signal that is to be transmitted from the transmitter 759 of the transceiver 702. Similarly, the transmitter 759, within the transceiver 702, is able to support interference cancellation functionality, as shown in a functional block 758, on a signal that is to be transmitted from the transmitter 759 of the transceiver 702.

This interference cancellation functionality, within the transmitters 749 and 759, respectively, may be performed, at least in part, by adjusting a transmitted spectrum to meet a desired spectral mask according to the present invention. The FIG. 7 shows yet another of the many embodiments where interference cancellation, performed according to the present invention, may be performed to provide for improved performance.

Figure 8:
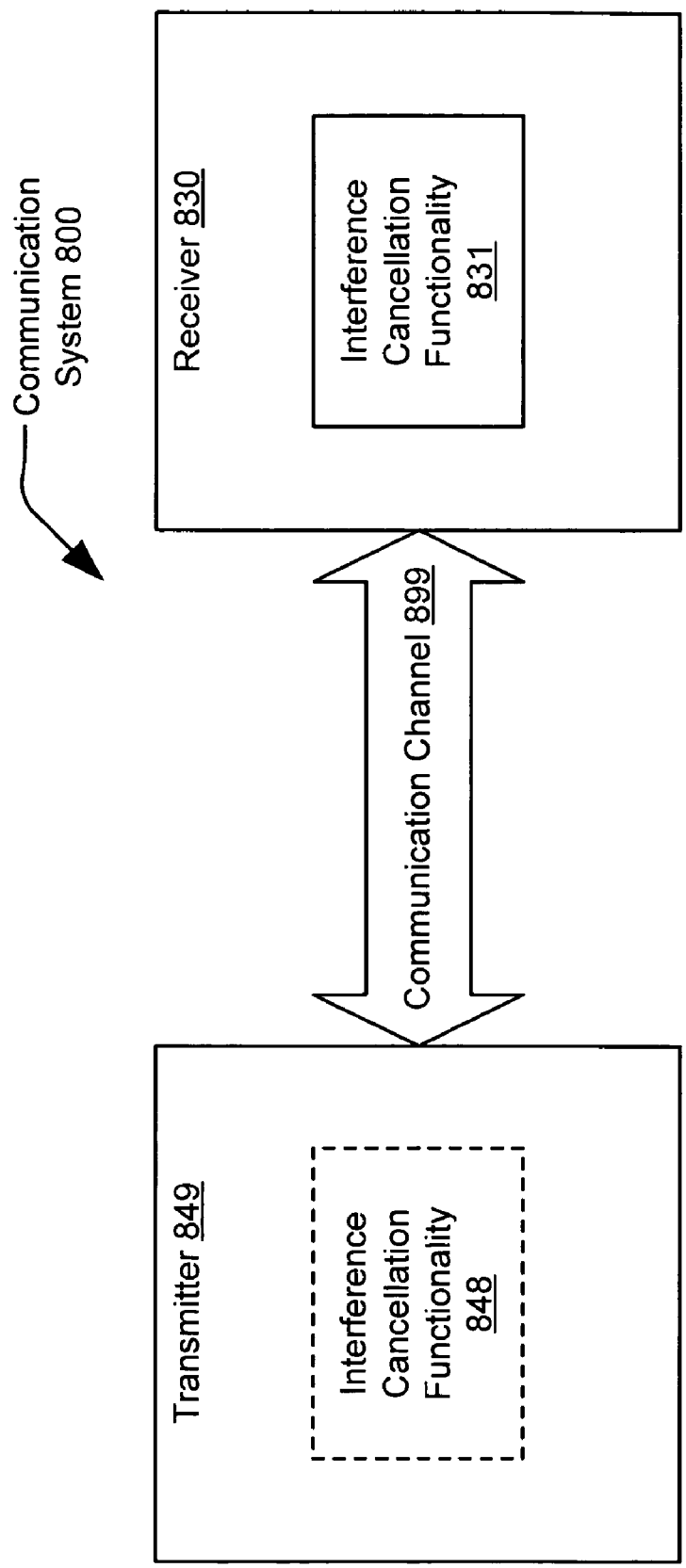
FIG. 8 is a system diagram illustrating another embodiment of a communication system that is built according to the present invention.

FIG. 8 is a system diagram illustrating another embodiment of a communication system 800 that is built according to the present invention. The FIG. 8 shows communicative coupling, via a communication channel 899, between a transmitter 849 and a receiver 830. The communication channel 899 may be a wire line communication channel or a wireless communication channel. The receiver 830 is operable to support interference cancellation, as shown in a functional block 831, according to the present invention. The FIG. 8 shows yet another of the many embodiments where interference cancellation, performed according to the present invention, may be performed to provide for improved performance.

In certain embodiments, the transmitter 849 is also operable to support interference cancellation, as shown in a functional block 848, according to the present invention. This interference cancellation functionality, within the transmitter 849, may be performed, at least in part, by adjusting a transmitted spectrum to meet a desired spectral mask according to the present invention. For example, the interference cancellation functionality of the present invention may be located at the transmitter 849, the receiver 830, or partly in each (as shown by the functional blocks 848 and 831). In many of the various embodiments described herein, the interference cancellation functionality has been located in a receiver of a communication system. The following describes one embodiment of how the interference cancellation functionality may be located at the transmitter. The unused codes, instead of being modulated at the transmitter with zero symbols, are modulated with a linear combination of the desired signals from the used codes. In the case of narrowband interference, the resulting transmitted signal will have a null on the interferer.

Figure 9:
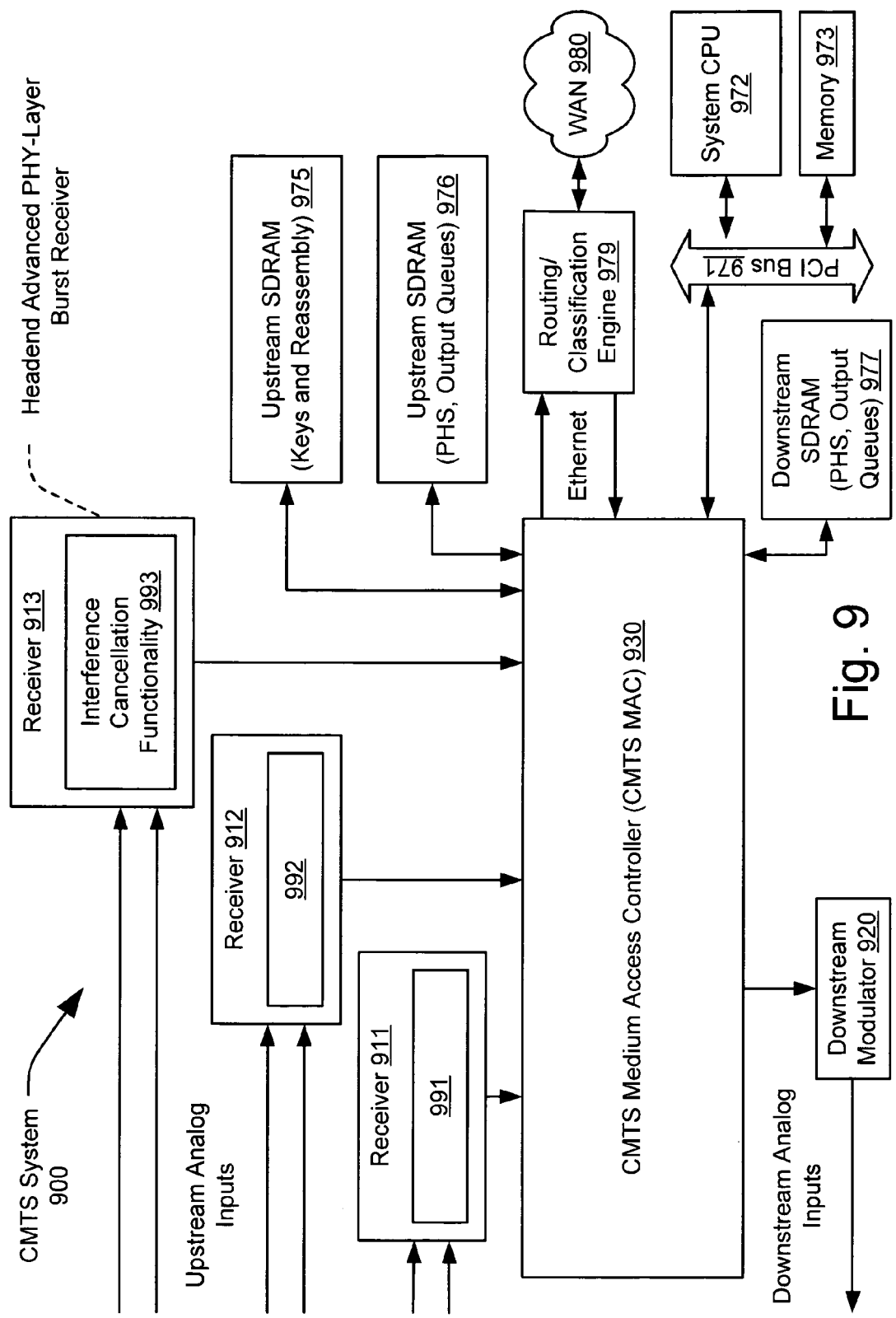
FIG. 9 is a system diagram illustrating an embodiment of a cable modem termination system (CMTS) system that is built according to the present invention.

FIG. 9 is a system diagram illustrating an embodiment of a CMTS system 900 that is built according to the present invention. The CMTS system 900 includes a CMTS medium access controller (MAC) 930 that operates with a number of other devices to perform communication from one or more CMs to a WAN 980. The CMTS MAC 930 may be viewed as providing the hardware support for MAC-layer per-packet functions including fragmentation, concatenation, and payload header suppression that all are able to offload the processing required by a system central processing unit (CPU) 972. This will provide for higher overall system performance. In addition, the CMTS MAC 930 is able to provide support for carrier class redundancy via timestamp synchronization across a number of receivers, shown as a receiver 911, a receiver 911, and a receiver 913 that are each operable to receive upstream analog inputs. In certain embodiments, each of the receivers 911, 912, and 913 are dual universal advanced TDMA/CDMA (Time Division Multiple Access/Code Division Multiple Access) PHY-layer burst receivers. That is top say, each of the receivers 911, 912, and 913 includes at least one TDMA receive channel and at least one CDMA receive channel; in this case, each of the receivers 911, 912, and 913 may be viewed as being multi-channel receivers.

In addition, the CMTS MAC 930 may be operated remotely with a routing/classification engine 979 that is located externally to the CMTS MAC 930 for distributed CMTS applications including mini fiber node applications. Moreover, a Standard Programming Interface (SPI) master port may be employed to control the interface to the receivers 911, 912, and 913 as well as to a downstream modulator 920.

The CMTS MAC 930 may be viewed as being a highly integrated CMTS MAC integrated circuit (IC) for use within the various DOCSIS and advanced TDMA/CDMA physical layer (PHY-layer) CMTS products. The CMTS MAC 930 may employ hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 975 (operable to support keys and reassembly) and SDRAM 976 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 930 includes an out-of-band generator and TDMA PHY-layer (and/or CDMA PHY-layer) interface that supports communication with a CM device's out-of-band receiver for control of power management functions. The downstream processor will also use SDRAM 977 (operable to support PHS and output queues). The CMTS MAC 930 may be configured and managed externally via a PCI interface and a PCI bus 971.

Each of the receivers 911, 912, and 913 is operable to support interference cancellation functionality. For example, the receiver 911 is operable to support interference cancellation functionality, as shown in a functional block 991; the receiver 912 is operable to support interference cancellation functionality, as shown in a functional block 992; and the receiver 913 is operable to support interference cancellation functionality, as shown in a functional block 993. The FIG. 9 shows yet another embodiment in which interference cancellation may be performed according to the present invention. Any of the functionality and operations described in the other embodiments may be performed within the context of the CMTS system 900 without departing from the scope and spirit of the invention.

Figure 10:
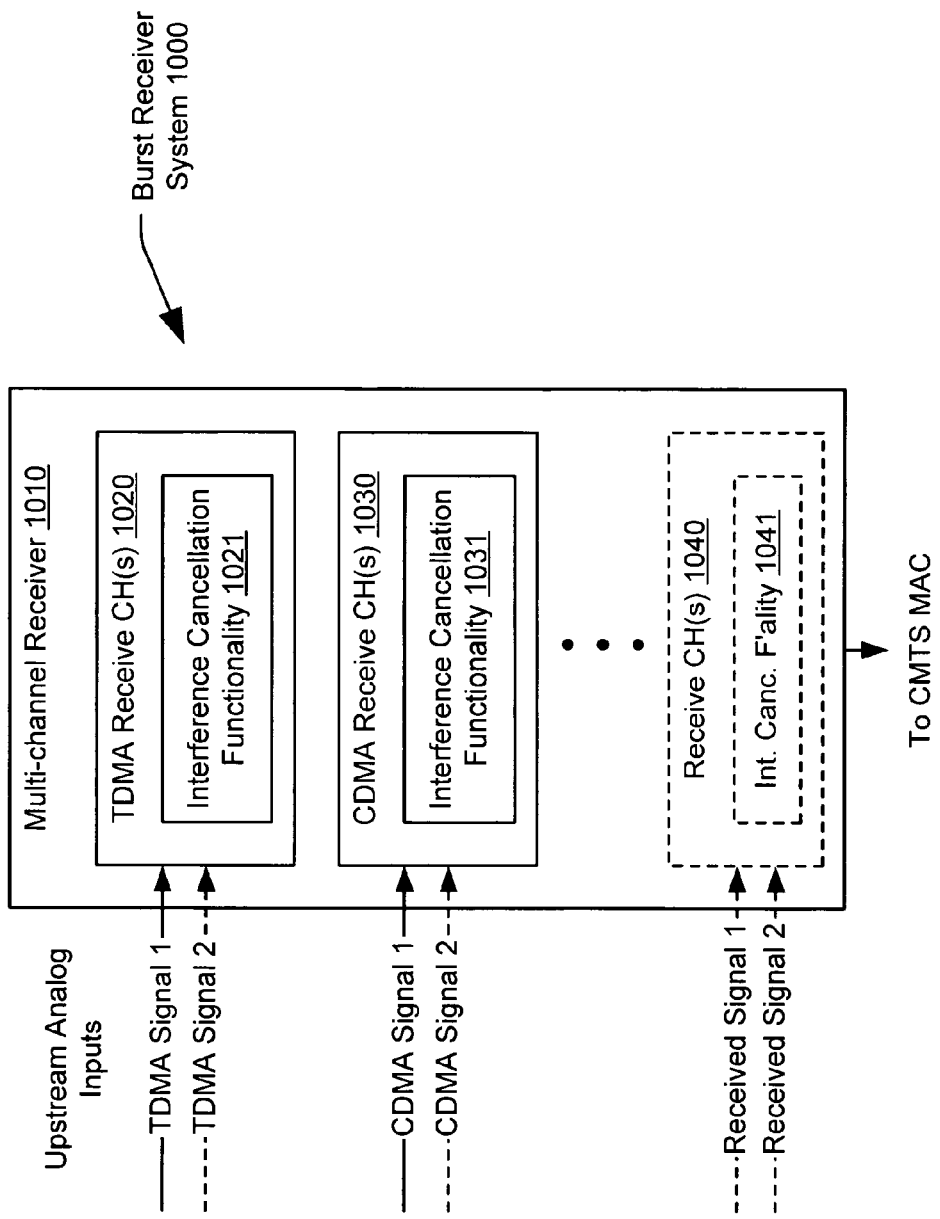
FIG. 10 is a system diagram illustrating an embodiment of a burst receiver system that is built according to the present invention.

FIG. 10 is a system diagram illustrating an embodiment of a burst receiver system 1000 that is built according to the present invention. The burst receiver system 1000 includes at least one multi-channel receiver 1010. The multi-channel receiver 1010 is operable to receive a number of upstream analog inputs that are transmitted from CMs. The upstream analog inputs may be in the form of either TDMA (Time Division Multiple Access) and/or CDMA (Code Division Multiple Access) format. A number of receive channels may be included within the multi-channel receiver 1010.

For example, the multi-channel receiver 1010 is operable to support a number of TDMA receive channels 1020 (shown as TDMA signal 1 and TDMA signal 2) and to support interference cancellation functionality, as shown in a functional block 1021, for those received TDMA signals. The multi-channel receiver 1010 is operable to support a number of TDMA receive channels 1030 (shown as CDMA signal 1 and CDMA signal 2) and to support interference cancellation functionality, as shown in a functional block 1031, for those received CDMA signals. Generically speaking, the multi-channel receiver 1010 is operable to support a number of receive channels 1040 (shown as received signal 1 and received signal 2) and to support interference cancellation functionality, as shown in a functional block 1041, for those received signals. The multi-channel receiver 1010 of the FIG. 10 is operable to interface with a CMTS MAC. The burst receiver system 1000 may include a number of multi-channel receivers that are each operable to interface with the CMTS MAC.

In certain embodiments, the multi-channel receiver 1010 provides a number of various functionalities. The multi-channel receiver 1010 may be a universal headend advanced TDMA PHY-layer QPSK/QAM (Quadrature Phase Shift Keying/Quadrature Amplitude Modulation) burst receiver; the multi-channel receiver 1010 also include functionality to be a universal headend advanced CDMA PHY-layer QPSK/QAM burst receiver; or the multi-channel receiver 1010 also include functionality to be a universal headend advanced TDMA/CDMA PHY-layer QPSK/QAM burst receiver offering both TDMA/CDMA functionality. The multi-channel receiver 1010 may be DOCSIS/EuroDOCSIS based, IEEE 802.14 compliant. The multi-channel receiver 1010 may be adaptable to numerous programmable demodulation including BPSK (Binary Phase Shift Keying), QPSK, and/or 8/16/32/64/128/256/516/1024 QAM. The multi-channel receiver 1010 is adaptable to support variable symbols rates as well. Other functionality may likewise be included to the multi-channel receiver 1010 without departing from the scope and spirit of the invention. Such variations and modifications may be made to the communication receiver.

Figure 11:
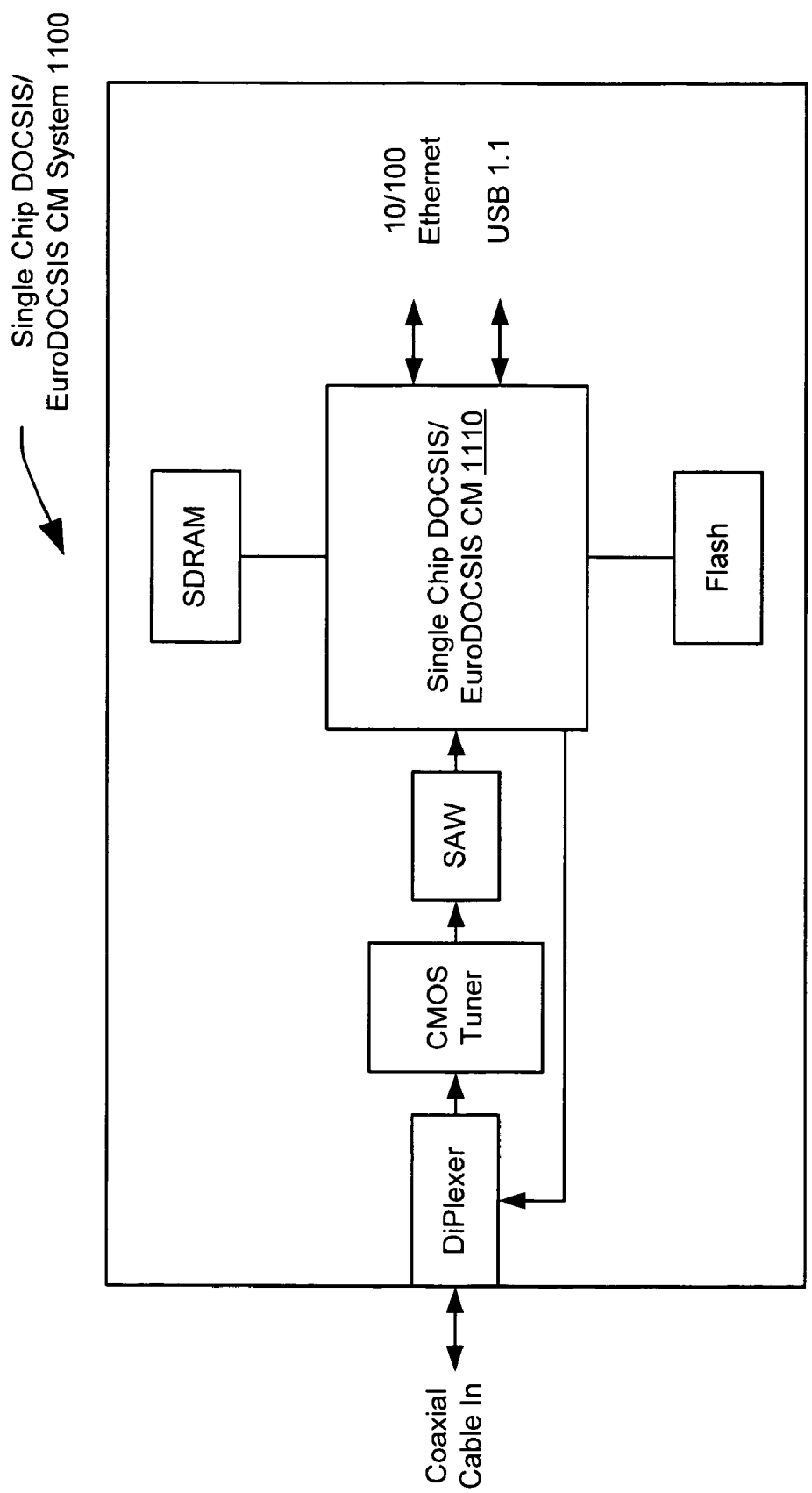
FIG. 11 is a system diagram illustrating an embodiment of a single chip DOCSIS/EuroDOCSIS CM system that is built according to the present invention.

FIG. 11 is a system diagram illustrating an embodiment of a single chip DOCSIS/EuroDOCSIS CM system 1100 that is built according to the present invention. The single chip DOCSIS/EuroDOCSIS CM system 1100 includes a single chip DOCSIS/EuroDOCSIS CM 1110 that is implemented in a very high level of integration and offering a very high level of performance. A coaxial cable inputs to a DiPlexer to provide CM access to the single chip DOCSIS/EuroDOCSIS CM system 600. The DiPlexer communicatively couples to a CMOS (Complementary Metal Oxide Semiconductor) tuner. The CMOS tuner may be implemented with a companion part that includes a low noise amplifier (LNA) and performs radio frequency (RF) automatic gain control (AGC). This two part solution is operable to support 64 and 256 QAM and other modulations as well, e.g., BPSK, QPSK, and other QAM modulations. These two parts operate cooperatively with the single chip DOCSIS/EuroDOCSIS CM 1110. The CMOS tuner may be operable to support an intermediate frequency (IF) output frequency range of 36-44 MHz, and specifically support the 36.125 and 43.75 MHz center frequencies for the Phase Alteration Line (PAL) and National Television System Committee (NTSC) standards. Also, the CMOS tuner and the LNA and RF AGC are DOCSIS and EuroDOCSIS standard supportable.

However, it is also noted that the CMOS tuner is operable to perform direct RF to baseband (BB) frequency transformation without requiring the IF transformation. An external bandpass Surface Acoustic Wave (SAW) filter removes the channels distant from the desired signal.

The output from the SAW filter is then passed to the single chip DOCSIS/EuroDOCSIS CM 1110. The single chip DOCSIS/EuroDOCSIS CM 1110 is supported by Synchronous Dynamic Random Access Memory (SDRAM) and Flash. In addition, the single chip DOCSIS/EuroDOCSIS CM 1110 supports both Ethernet and USB interfacing to any other devices that may exist within the single chip DOCSIS/EuroDOCSIS CM system 1100. The FIG. 11 shows yet another embodiment in which interference cancellation may be performed according to the present invention. The interference cancellation functionality may be supported directly within the single chip DOCSIS/EuroDOCSIS CM 1110. The single chip DOCSIS/EuroDOCSIS CM system 1100 shows an application context of yet another implementation of a device that may perform the present invention.

Figure 12:
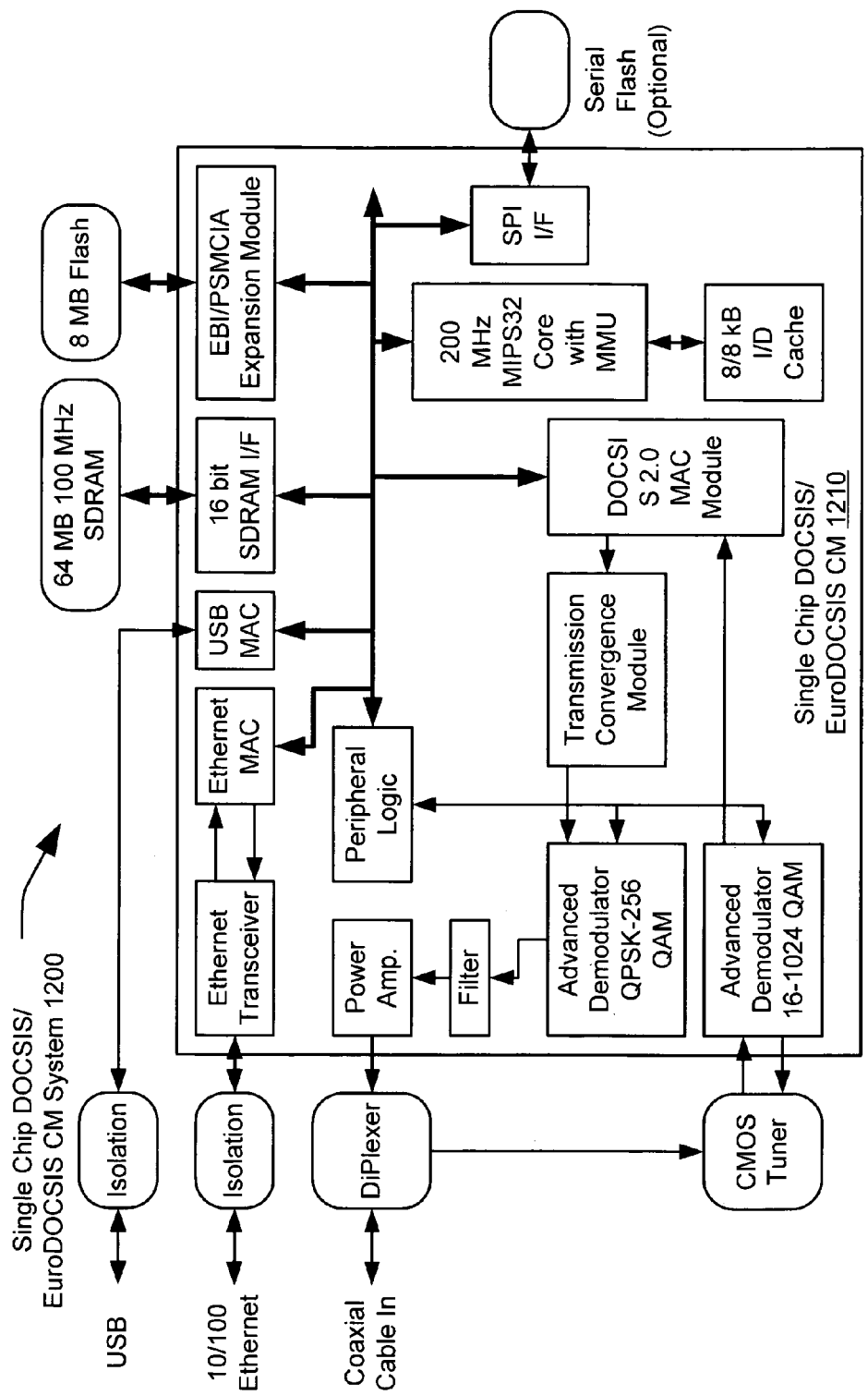
FIG. 12 is a system diagram illustrating another embodiment of a single chip DOCSIS/EuroDOCSIS CM system that is built according to the present invention.

FIG. 12 is a system diagram illustrating another embodiment of a single chip DOCSIS/EuroDOCSIS CM system 1200 that is built according to the present invention. The single chip DOCSIS/EuroDOCSIS CM system 1200 includes a single chip DOCSIS/EuroDOCSIS CM 1210 that combines an RF receiver with an advanced QAM demodulator, an advanced QAM and S-CDMA modulator/transmitter, a complete DOCSIS 2.0 Media Access Controller (MAC), a 200 MHz MIPS32 Communication Processor, a 16 bit, 100 MHz SDRAM interface, 10/100 Ethernet MAC with integrated transceiver and Media Independent Interface (MII), and a USB 1.1 controller with integrated transceiver.

The QAM receiver directly samples a tuner output (such as the CMOS tuner of the FIG. 6) with an 11 bit analog to digital converter (ADC) and input AGC amplifier. The receiver digitally re-samples and demodulates the signal with recovered clock and carrier timing, filters and equalizes the data, and passes soft decisions to an ITU-T J.83 Annex A/B/C compatible decoder. The receiver supports variable symbol rate 4/16/32/64/128/256/1024 QAM Forward Error Correction (FEC) decoding. The final received data stream is delivered in a serial MPEG-2 transport format. All gain, clock, and carrier, acquisition and tracking loops are integrated in the QAM receiver.

The upstream transmitter takes burst or continuous data, provides FEC encoding and pre-equalization for DOCSIS applications, filters and applies 2/4/8/16/64/256 QAM or S-CDMA modulation to the data stream, amplifies the signal through the integrated upstream power amplifier and provides a direct 0-65 MHz analog output.

The MAC of the single chip DOCSIS/EuroDOCSIS CM 1210 includes all features required for full DOCSIS 1.0, 1.1, and 2.0 compliance, including full support for baseline privacy (BPI+) encryption and decryption. Single-user support includes four SIDS (Standard Interoperable Datalink System) in downstream, four DA perfect match filters, a 256 entry CAM for multicast/unicast hash filter and four independent upstream queues for simultaneous support of Quality of Service (QoS) and BE traffic. To enhance operational support, the MAC of the MAC of the single chip DOCSIS/EuroDOCSIS CM 1210 provides extended Network Management MIB/Diagnostic features, as well as immediate UCC (on the fly) using independent resets for downstream and upstream queues and both individual queue reset/flush for upstream queues. The MAC of the single chip DOCSIS/EuroDOCSIS CM 1210 uses advance PROPANE™ techniques to provide packet acceleration to significantly improve upstream channel utilization.

With the incorporation of an upstream power amplifier, the MAC of the single chip DOCSIS/EuroDOCSIS CM 1210 allows a complete CM to be assembled with a minimal set of external components. When used with a CMOS tuner, such as the CMOS tuner of the FIG. 11, a very low cost solution for a high performance, single user DOCSIS 2.0 CM is provided. The MAC of the single chip DOCSIS/EuroDOCSIS CM 1210 of the FIG. 12 is operable to support all digital reference frequency locking functionality according to the present invention. FIG. 12 shows yet another embodiment where interference cancellation functionality may be supported according to the present invention. The interference cancellation functionality may be viewed as being supported and performed within the DOCSIS 2.0 MAC of the single chip DOCSIS/EuroDOCSIS CM 1210 of the FIG. 12.

Figure 13:
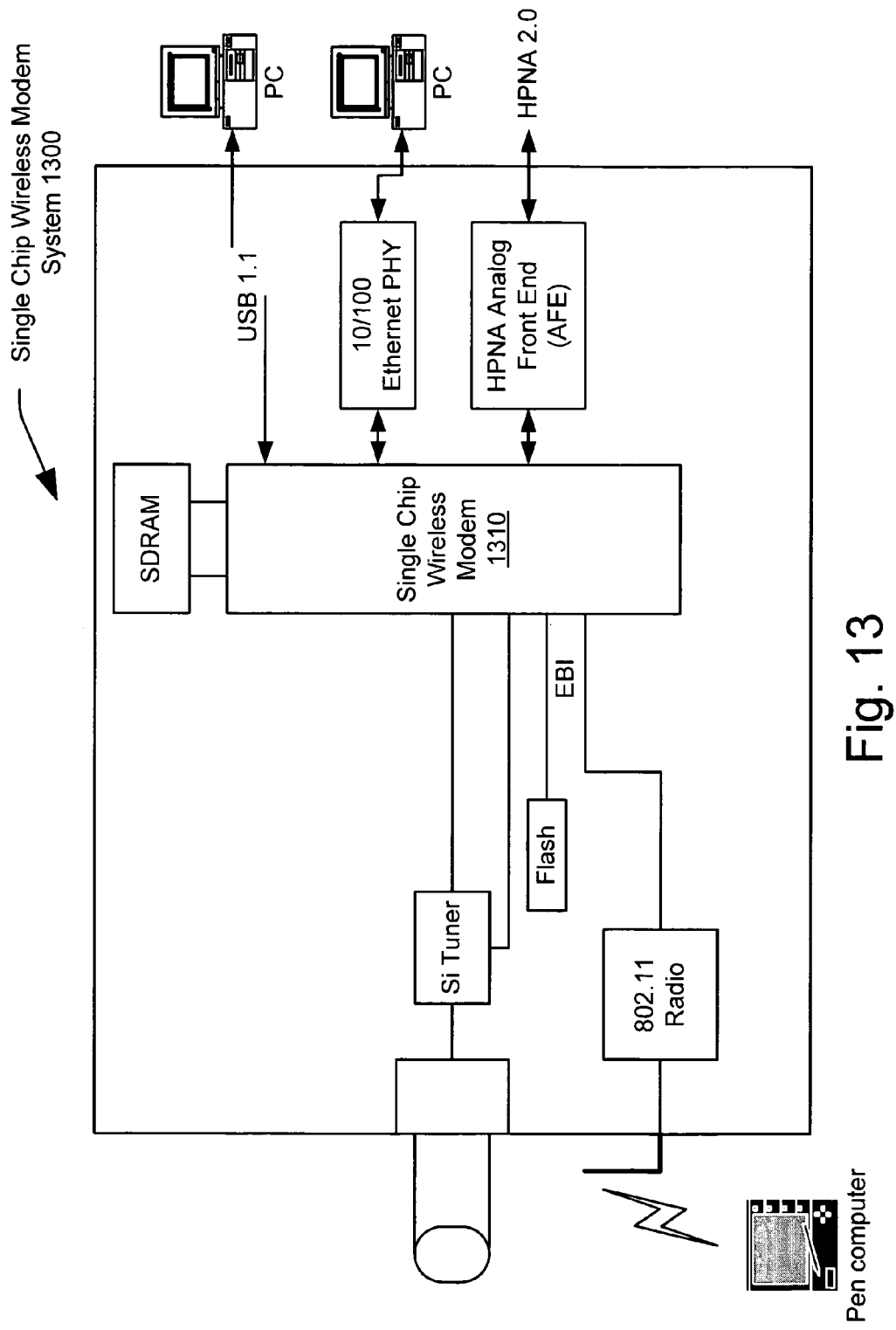
FIG. 13 is a system diagram illustrating an embodiment of a single chip wireless modem system that is built according to the present invention.

FIG. 13 is a system diagram illustrating an embodiment of a single chip wireless modem system 1300 that is built according to the present invention. The single chip wireless modem system 1300 includes a single chip wireless modem 1310 that is operable to support a variety of functionalities. The single chip wireless modem system 1300 is operable to perform wireless LAN operation using an 802.11 radio that is operable to communicatively couple to an external device that is wireless capable (example shown as the pen computer having wireless functionality). The single chip wireless modem 1310 of the single chip wireless modem system 1300 employs a 10/100 Ethernet PHY and an HPNA (Home Phoneline Network Alliance) analog front end (AFE) that is operable to interface with the HPNA 2.0 network. The single chip wireless modem 1310 of the single chip wireless modem system 1300 also supports capability to communicate with an external device via a USB 1.1 interface.

The single chip wireless modem 1310 of the single chip wireless modem system 1300 is compatible with existing cable modem application code. In addition, the single chip wireless modem 1310 supports advanced QAMLink® modulation/demodulation TP provide for higher throughputs and performance in noisy plant environments. The 802.11b MAC and baseband allow for wireless connectivity as mentioned above. In addition, the integrated HPNA 2.0 MAC supports high-speed multimedia services over phone lines. The integrated 10/100 Ethernet and USB 1.1 with integrated transceiver provide for a low cost CPE (Customer Premises Equipment), and the MPI interfaces provide for great flexibility through additional connectivity options. The single chip wireless modem 1310 is a part of a comprehensive solution that is operable to support certifiable DOCSIS/EuroDOCSIS 1.1 software as well as supporting residential gateway software including Firewall, NAT, and DHCP. The FIG. 13 shows yet another embodiment where interference cancellation functionality may be supported according to the present invention. The interference cancellation functionality may be viewed as being supported and performed within the single chip wireless modem 1310 of the single chip wireless modem system 1300.

Figure 14:
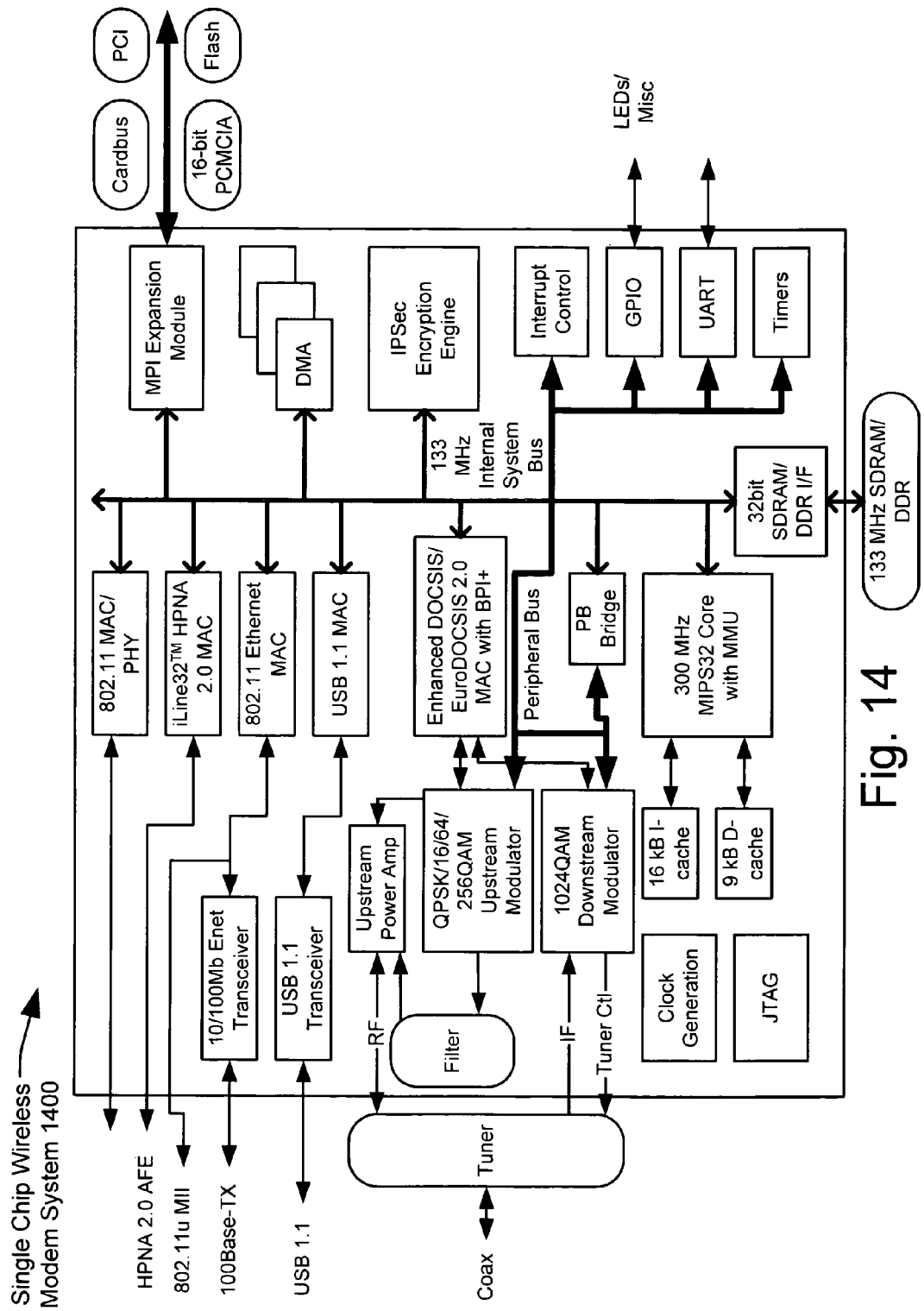
FIG. 14 is a system diagram illustrating another embodiment of a single chip wireless modem system that is built according to the present invention.

FIG. 14 is a system diagram illustrating another embodiment of a single chip wireless modem system 1400 that is built according to the present invention. The single chip wireless modem system 1400 includes a single chip wireless modem that is operable to support a variety of functionalities. The single chip wireless modem of the single chip wireless modem system 1300 integrates the DOCSIS/EuroDOCSIS 2.0 cable based modem with a 2/416/32/64/128/256/1024 QAM downstream receiver with Annex A, B, C FEC support. In addition, the single chip wireless modem integrates the DOCSIS/EuroDOCSIS 2.0 cable based modem with 2/4/8/16/32/64/128/256 QAM FA-TDMA ad S-CDMA. The 802.11b wireless MAC and baseband are also integrated on the single chip wireless modem. A number of other functional blocks are also integrated thereon, including, a 300 MHz MIPS32 CPU, a 32 bit 100 MHz SDRAM/DDR controller, an integrated upstream amplifier, an integrated IP SEC engine, an integrated advance PROPANE™ packet accelerator, a 12 Mbps USB 1.1 slave port with integrated transceiver, a 10/100 Ethernet MAC/PHY with MII interface, an MPI expansion bus (that supports PCI, Cardbus, and PCMCIA interfaces), a single 28 MHz reference crystal, and ability to operate using voltages of 1.8 V and/or 3.3 V.

The advanced QAMLink® technology of the single chip wireless modem, compliant with DOCSIS 2.0, supports up to 1024 QAM downstream modulation formats and both FA-TDMA and S-CDMA, with 256 QAM upstream modulation formats. This advanced technology provides a higher throughput and superior performance in noise plant environments, paving the way for symmetrical services, such as video conferencing.

The single chip wireless modem integrates both wireless and wire line networking functions for distributing broadband content throughout the home. An 802.11b solution is provided for wireless connectivity, while both 10/100 Ethernet and 32 Mbps HPNA 2.0 solutions provide wired connectivity. HPNA 2.0 allows multimedia services to be streamed across existing home phone lines.

The PROPANE™ technology provides bandwidth and performance enhancements to existing cable plants allowing up to twice as many subscribers per node, thereby minimizing the need for node splits. The FIG. 14 shows yet another embodiment where interference cancellation functionality may be supported according to the present invention. The interference cancellation functionality may be viewed as being supported and performed within the single chip wireless modem of the single chip wireless modem system 1400.

Figure 15:
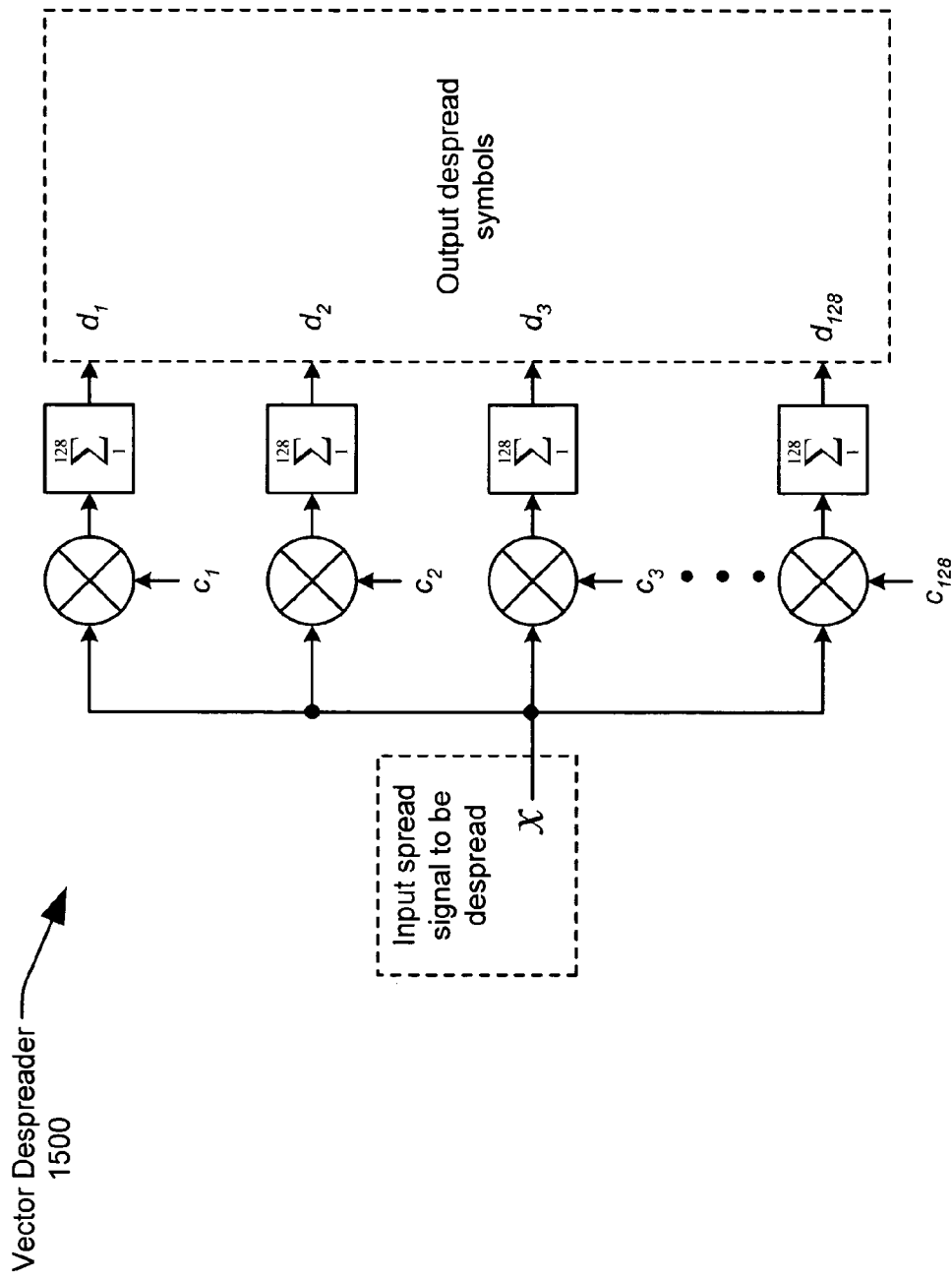
FIG. 15 is a diagram illustrating an embodiment of a vector de-spreader that is built according to the present invention.

FIG. 15 is a diagram illustrating an embodiment of a vector de-spreader 1500 that is built according to the present invention. The following description of embodiments of the present invention using the FIGS. 15, 16, 17, and 18 are made within the context of the DOCSIS 2.0 system. This system uses S-CDMA modulation for the upstream with 128 orthogonal codes. In the example there are 120 active (data-carrying) codes, with 8 unused (non data-carrying) codes. This example is for illustrative purposes only, and should by no means limit the scope of the invention. Again, it is noted that the specific examples of 120 active codes, and 8 unused codes in a system having 128 available codes is exemplary. Clearly, other embodiments may be employed (having different numbers of codes—both different numbers of used and unused) without departing from the scope and spirit of the invention.

The FIG. 15 depicts a vector de-spreader, arranged according to the present invention, consisting of 128 individual de-spreaders. De-spreading is the process of multiplying by a given code sequence and summing (or integrating) over the chips of a spreading sequence, in this case the length of the code, 128 chips. Each scalar de-spreader performs the function of de-spreading the received signal (input spread signal to be de-spread) using a single de-spreading code ($c_1, \ldots, c_{128}$). There are 128 orthogonal de-spreading codes in the present example.

Figure 16:
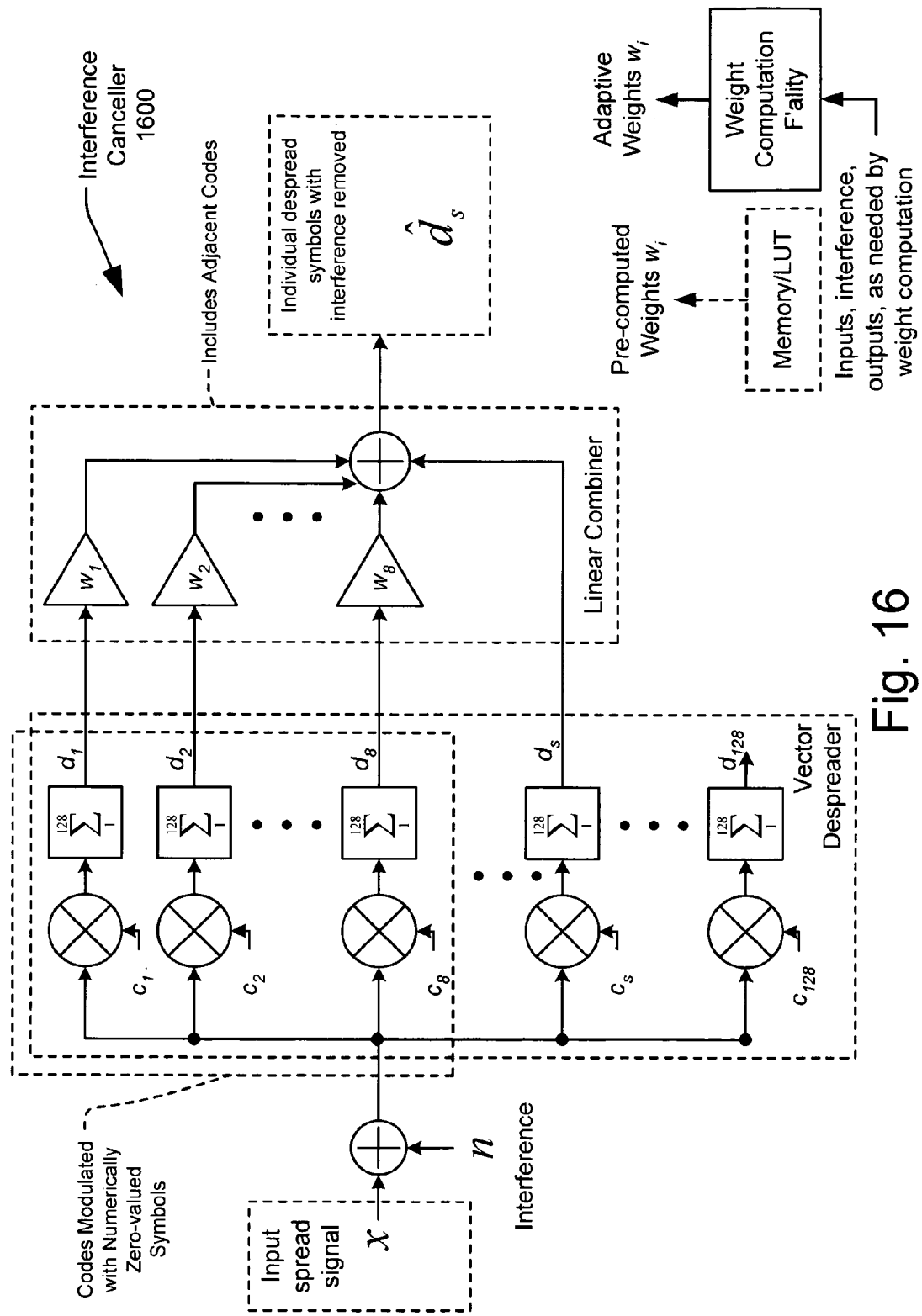
FIG. 16 is a diagram illustrating an embodiment of an interference canceller that is built according to the present invention.

FIG. 16 is a diagram illustrating an embodiment of an interference canceller 1200 that is built according to the present invention. The spread input signal x, consisting of the sum of multiple spreading codes modulating multiple data streams, enters the diagram at the left. The undesired interference n is added to the signal. The signal is applied to the vector de-spreader, which de-spreads each of the 128 codes. The upper 8 codes are not used for data transmission and are modulated with numerically zero-valued symbols instead of data. Clearly, there may be embodiments where other numerically constant-valued symbols or known-value symbols may be employed instead of data as well. Further, the symbol may contain data represented as a reduced constellation, such as BPSK or QPSK, on the "unused" codes.

One of the 120 data-carrying codes, code $d_s$, is identified for illustration in the FIG. 16. In order to cancel the interference, the de-spreader output $d_s$ is processed in a linear combiner, where it is summed with a linear combination of the 8 de-spreader outputs from the zero-modulation codes $d_1$-$d_8$. The complex-valued combining weights applied to these codes are $w_1$-$w_8$, respectively. These weights are computed in a weight computation method as shown in the lower right hand corner of the FIG. 16 using the weight computation functionality.

The weight computation functionality may employ a method that utilizes the input spread signal plus interference, and may utilize some system outputs if an iterative method is used. Examples of weight computation methods that have been found valuable are the LMS (least mean square) method and the LS (least squares) method. The result of the linear combination is the output $d_s$, which is the data stream $d_s$ with the interference largely removed. Although not shown in the figure, the same linear combiner structure is applied to the other 119 codes as well (all of the other active codes besides the code $d_s$). In each case, the desired code (one of the 120 "active" or data-carrying codes) is applied to a linear combiner to cancel the interference from that code. For each data-carrying code, the same 8 zero-modulation codes are summed with the desired code, but for each active code the weights $w_1$-$w_8$ are in general unique.

An alternative viewpoint is to define the adapted code as $$c_a(n) = c_s(n) + \sum_{k=1}^{N_u} w_k c_k(n)$$

that is, the desired code plus the linear combination of the weights times the unused ("inactive") codes. In this view, the adapted code is a modified code with complex coefficients, which is used instead of the code $c_s$ to de-spread a single desired signal from a single modulated code, while simultaneously canceling the interference. A weight could also be applied to the desired signal, but usually this weight is 1.

This approach can be extended to matrix notation by defining the adapted code matrix as $$C_{adapted} = C_{used} + WC_{unused}$$

where:

$C_{adapted}$=adapted code matrix, dimension $(N_c-N_u) \times 128$, for example, $120 \times 128$ $C_{used}$=matrix whose rows are the used codes in the original code matrix, dimension $(N_c-N_u) \times N_c$, for example, $120 \times 128$ W=matrix whose rows are the adaptive weight vectors for each unused code, dimension $(N_c-N_u) \times N_u$, for example, $120 \times 8$ $C_{unused}$=matrix whose rows are the unused codes in the original code matrix, dimension $N_u \times N_c$, for example, $8 \times 128$ $N_c$=number of total codes=number of chips in each code, for example, 128

$N_u$=number of unused codes, for example, 8

In this view, the adapted code matrix is a modified code matrix with complex coefficients, which is used instead of the code matrix C to de-spread the desired signals from all used codes, while simultaneously canceling the interference on all used codes.

It is noted that that the unused codes may be de-spread as well, and this side information, though not data-carrying, is of use in characterizing the interference environment.

It is also noted that the weight computation functionality may be performed offline, and these pre-computed complex-valued combining weights, $w_1$-$w_8$, may then be stored in memory and/or a look up table (LUT) that may be used to provide the complex-valued combining weights, $w_1$-$w_8$. The appropriate set of weights may be selected after analyzing the interference environment.

Figure 17:
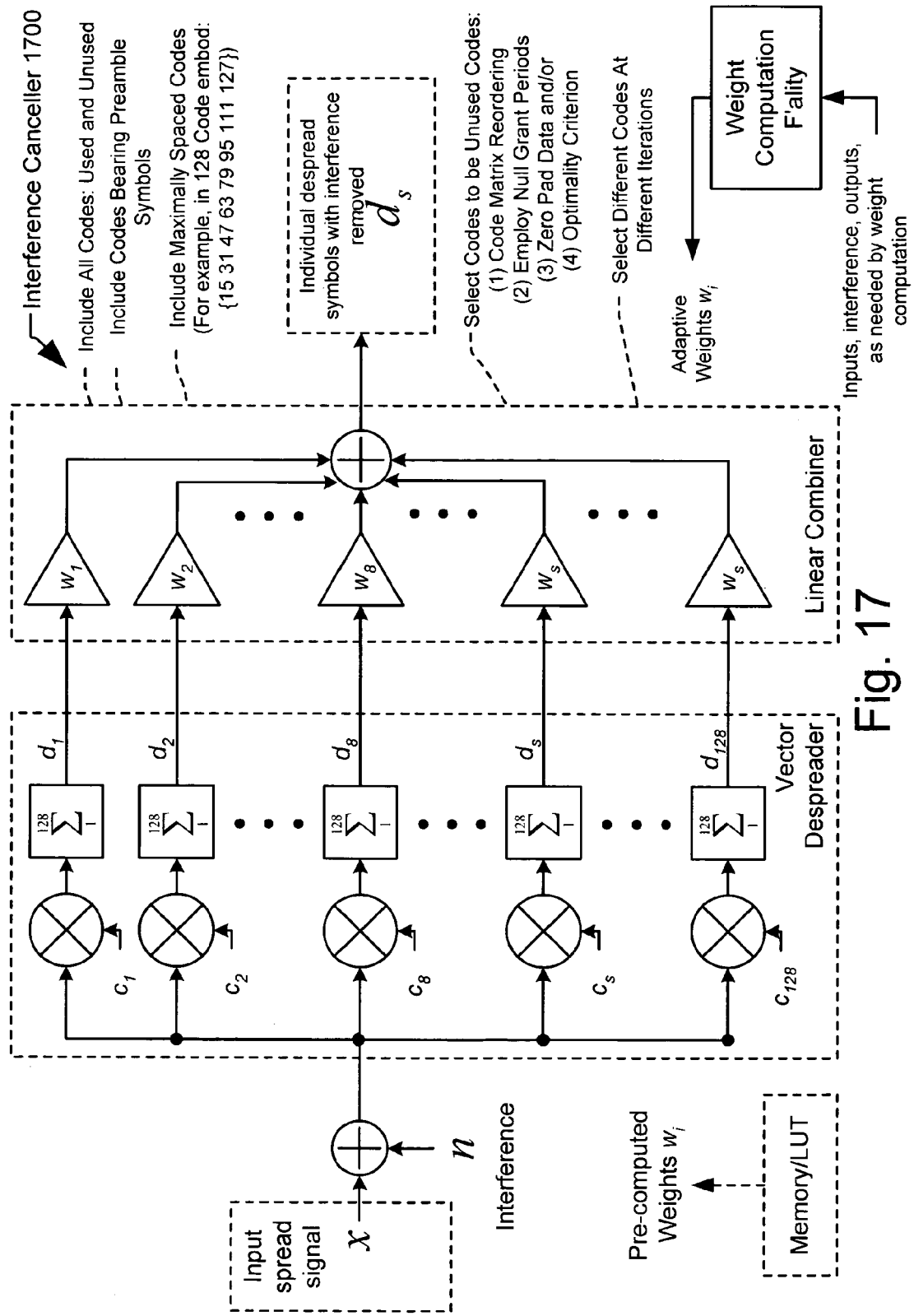
FIG. 17 is a diagram illustrating another embodiment of an interference canceller that is built according to the present invention.

FIG. 17 is a diagram illustrating another embodiment of an interference canceller 1700 that is built according to the present invention. The FIG. 17 may be viewed as being somewhat similar to the interference canceller 1600 of the FIG. 16 with some exceptions relating to the specific codes that are used to perform the linear combination in an effort to perform the interference cancellation according to the present invention.

FIG. 17 shows an embodiment where all of the codes are included in the linear combiner. This includes both the used codes and the unused codes, instead of only the unused codes. This will be useful if there is inter-code interference (ICI), since in that case the desired signal will appear on all codes. Conversely, the signals modulated onto all codes will appear on the desired de-spreader output, and can be subtracted from the desired de-spreader output.

In yet another alternative embodiment, to add to the number of effective unused codes, we may use codes bearing preamble symbols in addition to the codes carrying zero-valued symbols. The preamble symbols are known and can be subtracted once their amplitude and phase have been measured, for example using a preamble correlator. Thus the preamble-bearing codes can also be used as inputs to the linear combiner in order to better cancel the interference.

There are some other embodiments that may be employed as well. For example, the selection of the inactive codes may be performed as follows: (1) use codes 0, 1, 2, 3, . . . n (adjacent codes, as done in DOCSIS 2.0 spec) in which the codes are adjacent and the lower codes used in the coding and/or (2) spacing the codes maximally apart. For example, using DOCSIS 2.0 S-CDMA code set, the 8 unused codes out of 128 total codes might be code numbers {15 31 47 63 79 95 111 127} when seeking to perform the maximally spaced apart embodiment. Moreover, the selection of the unused codes may be performed according to an optimality criterion. Examples of some potential optimality criteria include: (1) select unused codes that have maximal correlation with the interference, (2) minimize enhancement of white noise resulting from cancellation process, and (3) minimize residual interference power after cancellation.

It is also noted that the particular codes that are selected as the unused codes may change over time during the processing of received signals. Moreover, the particular selection of the codes may vary from one iteration to the next. For example, in one situation, adjacent codes may be selected as the unused codes. In another situation, the maximally spaced codes may be selected as the unused codes.

The selection of the codes that are to be designated the unused codes may be performed using a variety of approaches including: (1) employing code matrix reordering, (2) employing null grant periods, (2) zero padding data, and/or (4) employing some optimality criterion (or criteria).

Similar to the embodiment of the FIG. 16, it is also noted that the weight computation functionality may be performed offline, and these pre-computed complex-valued combining weights that are used here in the FIG. 17 may similarly be stored in memory and/or a look up table (LUT) that may be used to provide the complex-valued combining weights. The appropriate set of weights may be selected after analyzing the interference environment. This may similarly be performed in the embodiments of the FIGS. 18 and 19 described in further detail below where these pre-computed complex-valued combining weights may also be stored in memory and/or a look up table (LUT).

Figure 18:
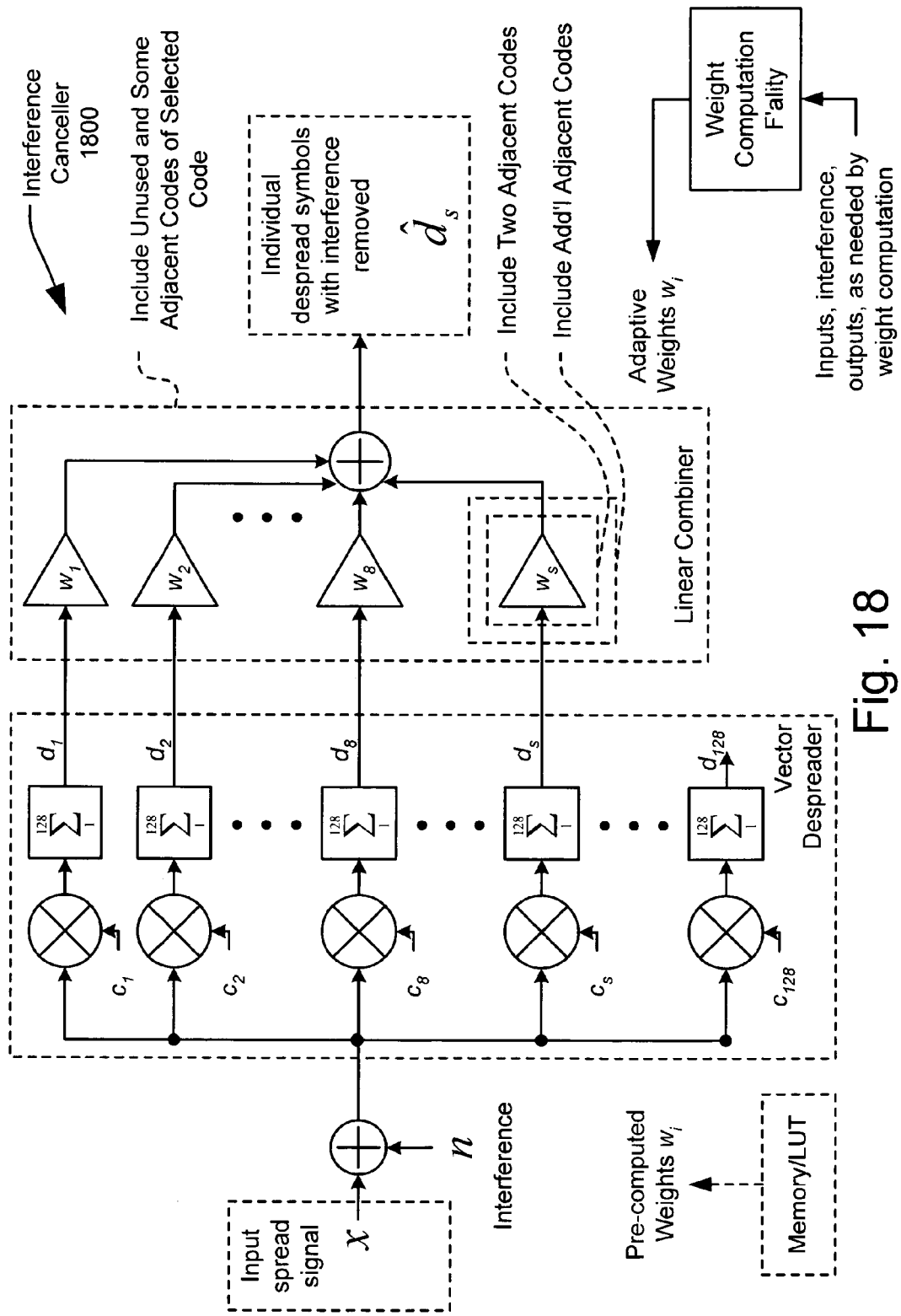
FIG. 18 is a diagram illustrating another embodiment of an interference canceller that is built according to the present invention.

FIG. 18 is a diagram illustrating another embodiment of an interference canceller 1800 that is built according to the present invention. The FIG. 18 may be viewed as being a variant of the FIG. 17 that has access to any of the codes (including both used and unused codes). The FIG. 18 includes a subset of the codes for use in the linear combiner, instead of all the codes or only the unused codes. For example, in DOCSIS 2.0 S-CDMA, adjacent codes are nearly shifts of each other. When a timing offset occurs, the codes lose orthogonality and ICI occurs. However, the ICI is predominant on the adjacent codes. For example, in the presence of a timing offset, code 35 will be interfered with predominantly by codes 34 and 36, with lesser effects coming from codes 33 and 37, even lesser effects from codes 32 and 38, and so on. Hence including as inputs to the linear combiner the data-bearing codes 33, 34, 36 and 37, plus the unused codes, but not the remaining data-bearing codes, will reduce the number of weights that have to be solved for compared to the more general case above in which all codes are included in the linear combination. Another embodiment would involve including as inputs to the linear combiner the data-bearing codes 34, and 36, plus the unused codes, but not the remaining data-bearing codes, in an effort to try to reduce the number of weights that have to be solved for compared to the more general case above in which all codes are included in the linear combination.

Figure 19:
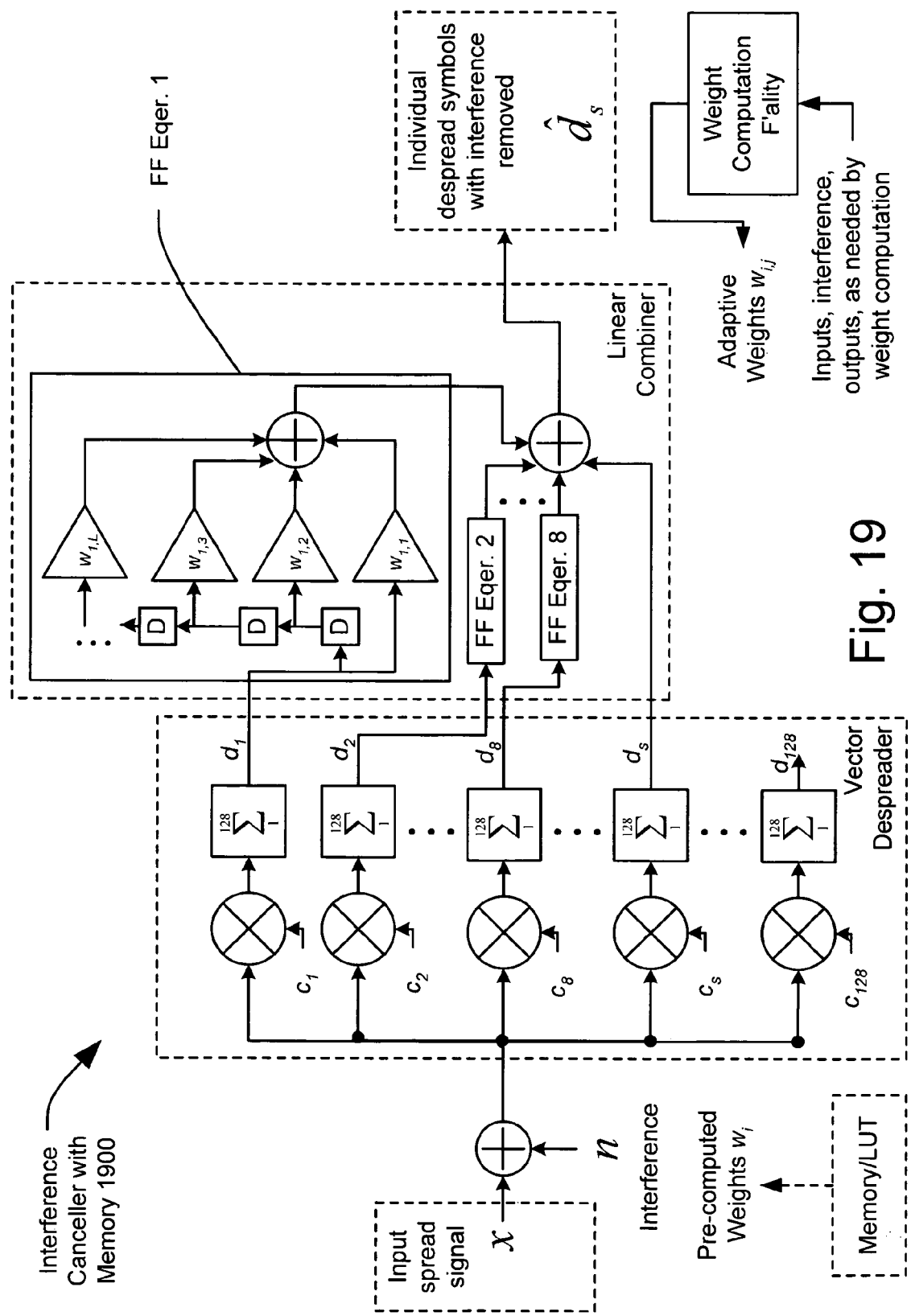
FIG. 19 is a diagram illustrating an embodiment of an interference canceller with memory that is built according to the present invention.

FIG. 19 is a diagram illustrating an embodiment of an interference canceller with memory 1900 that is built according to the present invention. The FIG. 19 shows an interference canceller with memory, that is, it uses the history of previous samples in computing the output. The weight $w_1$ has been replaced with "feed-forward equalizer 1" (FF Eqer. 1), a tapped delay line or FIR filter with L weights. The other adaptive weights have similarly been replaced with FF equalizers 2-8. It is noted that both the current and past soft de-spread symbols are included in the linear combination. Moreover, future soft de-spread symbols may also be included in the linear combination; these future soft de-spread symbols are "future" relative to the symbol currently being estimated. This permits each tap to have a frequency selective response.

Figure 20:
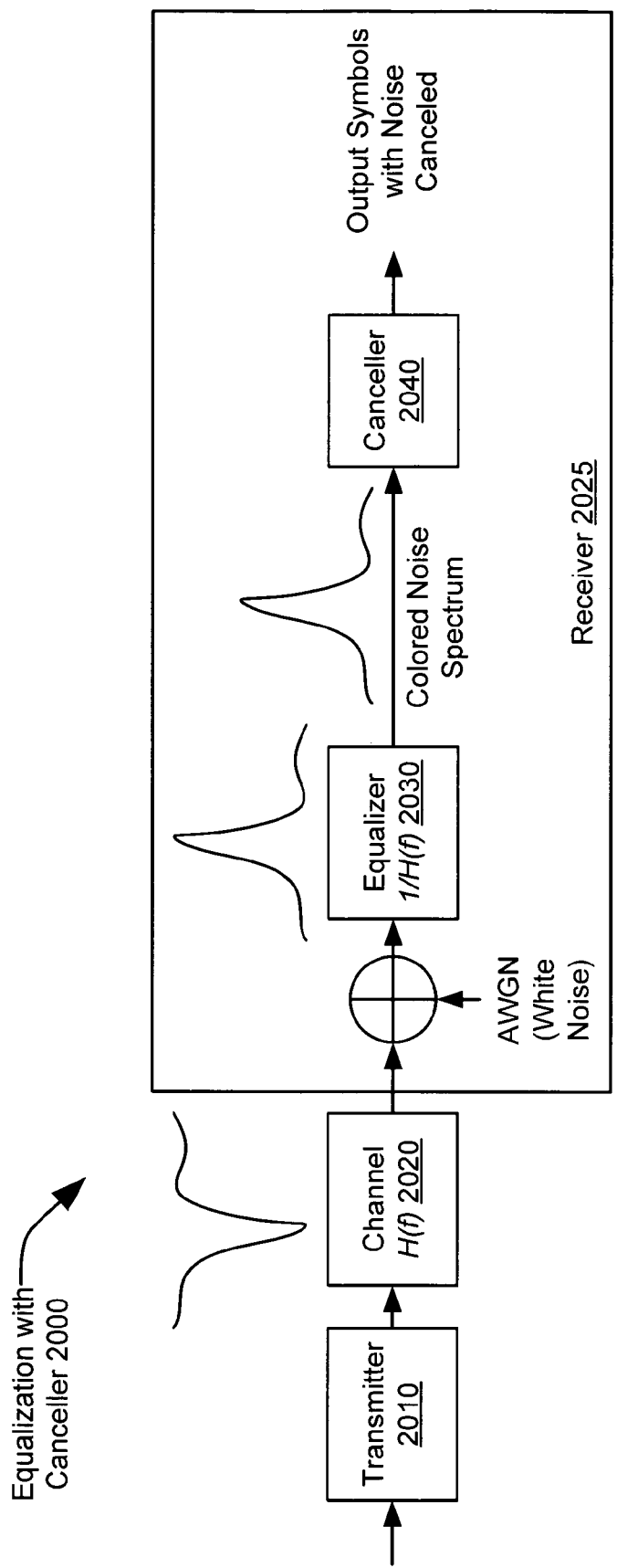
FIG. 20 is a diagram illustrating an embodiment of equalization with canceller that is arranged according to the present invention.

FIG. 20 is a diagram illustrating an embodiment of equalization with canceller 2000 that is arranged according to the present invention. The FIG. 20 may be viewed as being a representation of equalization of channel response, and cancellation of resulting colored noise. The canceller structure can also be used to help with equalization. The FIG. 20 considers a communications system with a transmitter 2010, a channel 2020 having a response H(f), and a receiver 2025. Let the channel response be H(f). We assume, as an example, that H(f) exhibits a null at some frequency in the signaling band of interest. Assume AWGN (additive white Gaussian noise) is added in the channel after H(f). We may use a standard adaptive equalizer 2030 at the receiver to provide the inverse (zero forcing) response, 1/H(f), which will have a narrow peak at the frequency location where the null exists in H(f). This peak will cause the white noise to be colored and to have a peak as well. This narrowband colored noise can be canceled (using the canceller 2040) by the present technique in exactly the same manner that other narrowband interference is canceled. The FIG. 20 shows yet another embodiment of how interference cancellation, according to the present invention, may be performed.

Figure 21:
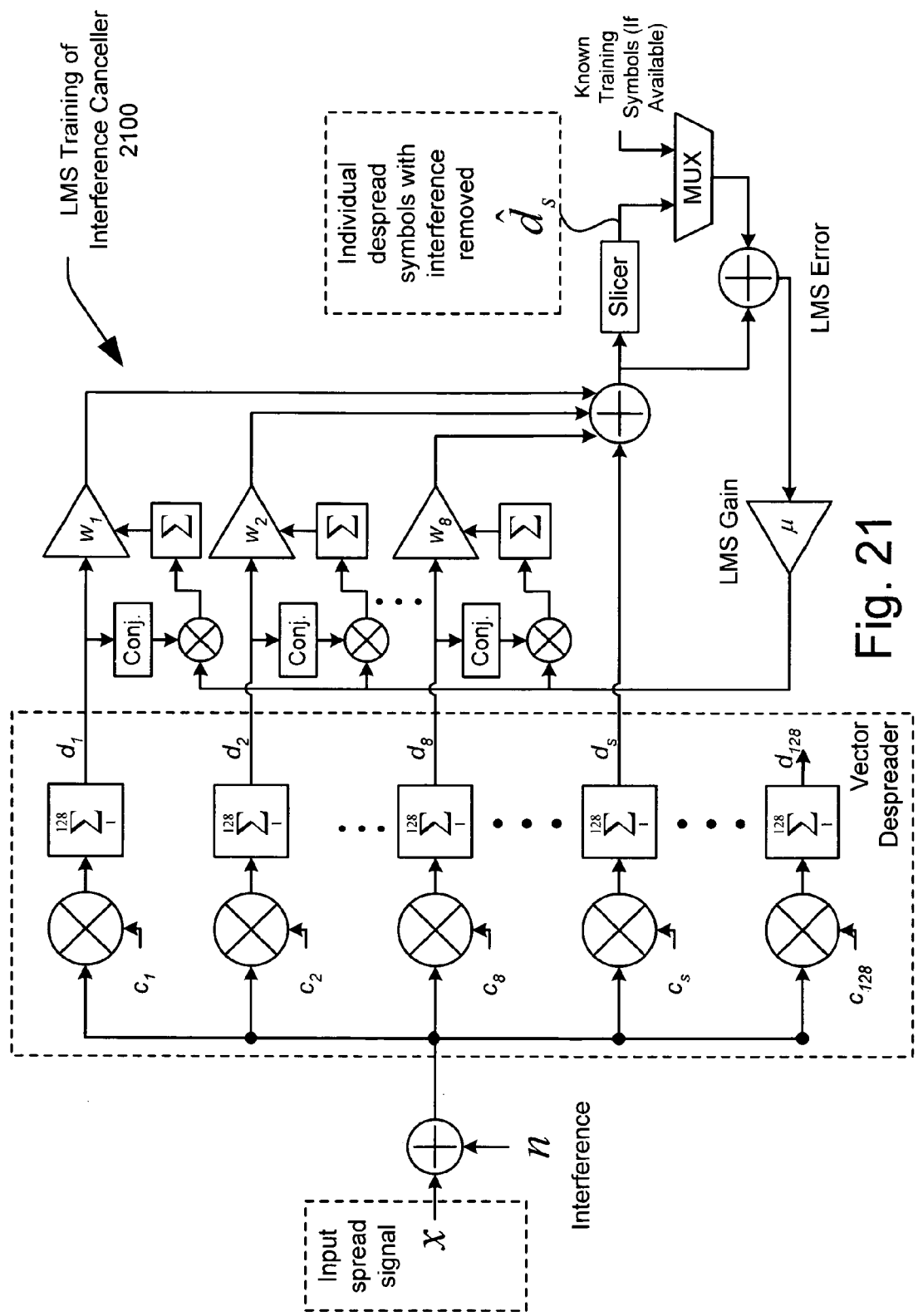
FIG. 21 is a diagram illustrating an embodiment of Least Means Square (LMS) training of an interference canceller according to the present invention.

FIG. 21 is a diagram illustrating an embodiment of Least Means Square (LMS) training of an interference canceller 2100 according to the present invention. The FIG. 21 may be viewed as being one embodiment that is operable to perform adaptation of an interference canceller using iterative methods. The present interference canceller 2100 can be adapted using iterative methods such as LMS or RLS. The FIG. 21 illustrates how the LMS method may be used to adapt the canceller weights. The output of the de-spreader for the desired code (containing soft decisions) is sliced to produce hard symbol decisions. If known training symbols are available, they replace the hard decisions, which may contain symbol errors, especially upon startup. The difference between the hard (or known) and soft decisions gives the LMS error sample. The error is correlated with the outputs of the unused code de-spreaders and used to update the adaptive weights $w_i$.

Within the FIG. 21, the slicer, the MUX, and the LMS error (and LMS step-size scaling μ) that are used to update the adaptive weights wi may be viewed as being just one embodiment of an iterative, error determining approach. Clearly, other error determining approaches (besides LMS) may be employed without departing from the scope and spirit of the invention. The error calculation and correlation with the outputs of the unused code de-spreaders that are used to update the adaptive weights wi may be viewed as being an iterative adaptive weight functionality that may be viewed as being provided in an implementation via an iterative adaptive weight functional block that communicatively couples to each of the outputs of the unused code de-spreaders.

Figure 22A:
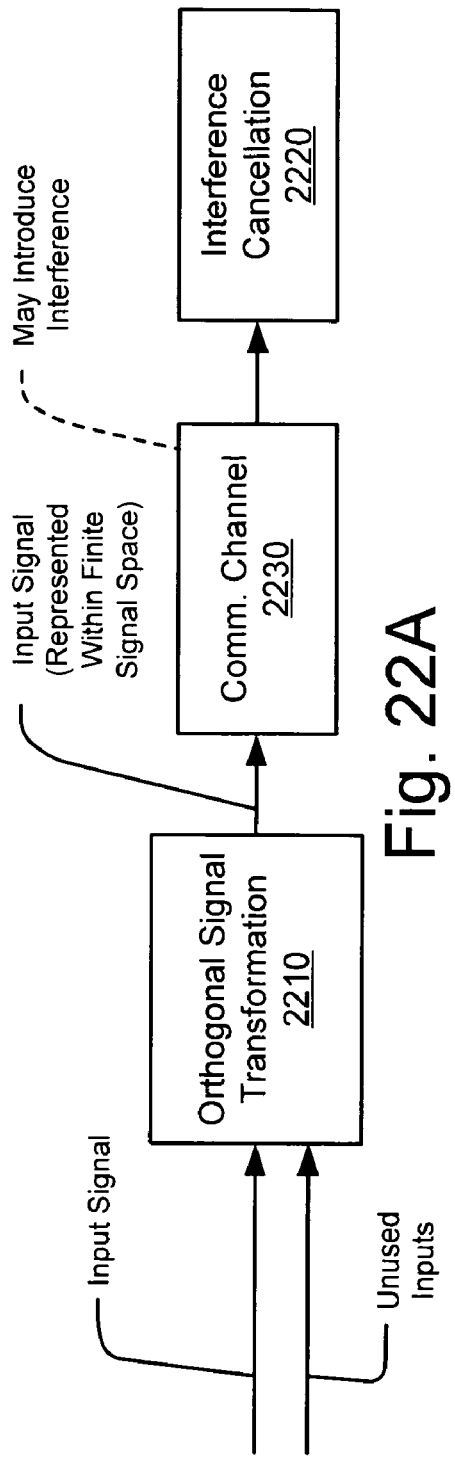
FIG. 22A is a diagram illustrating an embodiment of signal transformation according to the present invention.

FIG. 22A is a diagram illustrating an embodiment of signal transformation according to the present invention. The FIG. 22A includes the pre-processing of an input signal, and unused inputs, via an orthogonal transformation 2210 to generate a representation of the input signal within a finite signal space. The orthogonal transformation 2210 may be an orthonormal transformation in certain embodiments. Now that the input signal is represented in the finite signal space, the signal is then passed through a communication channel 2230 after which it is provided to an interference cancellation functional block 2220 that is operable to perform any of the various embodiments of interference cancellation described herein. The communication channel 2230 may introduce interference. It is noted that the present invention is operable to perform cancellation of interference of a variety of types including (1) narrowband interference in general, (2) Ham radio, CB radio and HF radio, (3) adjacent channel interference (spillover from desired signals in neighboring channels), (4) CDMA on a small number of codes, and (5) impulse/burst note. The present invention envisions any orthogonal transformation 2210 that is operable to transform an input signal into a representation of a finite number of elements within a finite signal space so as to facilitate the interference cancellation according to the present invention.

Figure 22B:
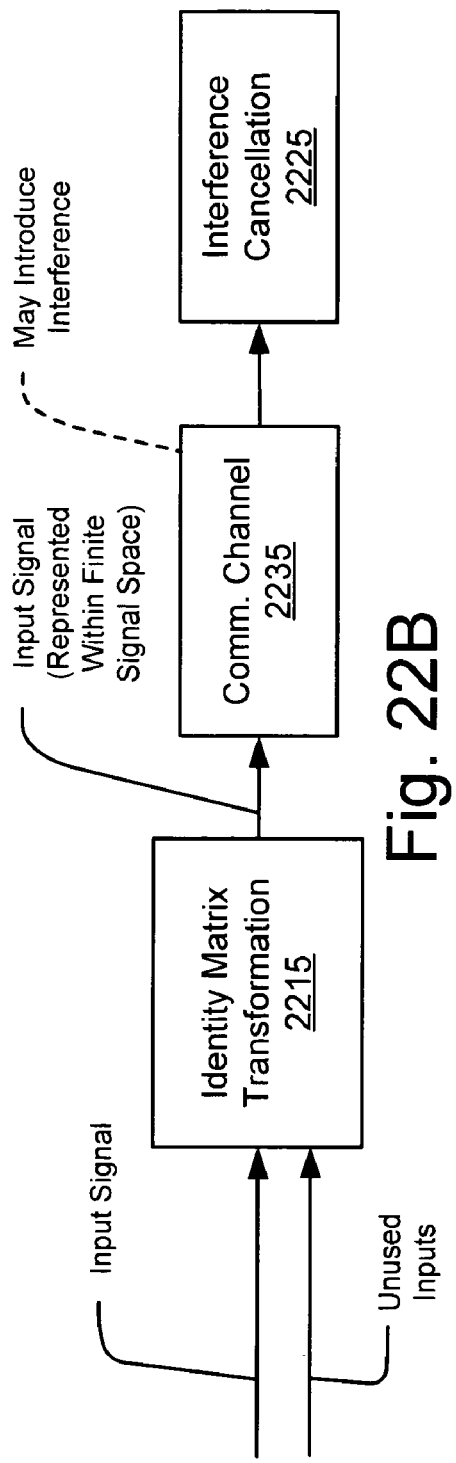
FIG. 22B is a diagram illustrating another embodiment of signal transformation according to the present invention.

FIG. 22B is a diagram illustrating another embodiment of signal transformation according to the present invention. The FIG. 22B includes the pre-processing of an input signal, and unused inputs, via an identity matrix transformation 2215 to generate a representation of the input signal within a finite signal space. Again, the orthogonal transformation 2215 may be an orthonormal transformation in certain embodiments. Now that the input signal is represented in the finite signal space, the signal is then passed through a communication channel 2235 after which it is provided to an interference cancellation functional block 2225 that is operable to perform any of the various embodiments of interference cancellation described herein. The communication channel 2235 may introduce interference. It is again noted that the present invention is operable to perform cancellation of interference of a variety of types including (1) narrowband interference in general, (2) Ham radio, CB radio and HF radio, (3) adjacent channel interference (spillover from desired signals in neighboring channels), (4) CDMA on a small number of codes, and (5) impulse/burst note. Further details are described below with respect to impulse noise cancellation.

Impulse noise is nearly zero most of the time, and large during a few samples. For the purpose of analysis only, we consider the rows of the N×N identity matrix as the basis set, where N is the number of samples per frame (or chips per spreading interval) under consideration. In this basis set, each time sample represents one dimension. Hence we see that the impulse noise only occupies a small number of dimensions. Thus it can be canceled by this technique, using an arbitrary basis set, such as the S-CDMA codes. The adapted de-spreading code has zeros (or nearly zeros) at the chips corresponding to the time location of the impulse noise. However, impulse noise occurs at a random, unpredictable location in each frame. If we know where it is, we can solve the equations for the weights. But the next frame it will be in a different place. This means re-doing the computations every frame, resulting in high complexity.

For low-level impulse noise, it may be difficult to locate the chips that are affected by impulse noise. We may use one or more "indicator codes" for this purpose, as follows. As an example, say we have 128 total codes—for example in the DOCSIS 2.0 situation. We designate 119 of these codes as used, or data-carrying codes. We designate 9 of the codes as unused codes, on which numerically-zero-valued symbols are transmitted. Of these 9 unused codes, 8 codes participate in the linear combiner for noise cancellation, and there is 1 extra or "indicator" code. The indicator code is de-spread as if it were a used code, that is, it is given the benefit of the linear combiner canceller. We expect to get a zero symbol at its de-spreader output; if we see noise instead of zero that provides an indication of the amount of noise that has not been canceled. We then proceed as follows to locate the impulse noise. Assume for example that there is one occurrence of impulse noise in a given symbol, and that the impulse noise affects 8 or fewer chips. We begin with a set of weights w that null chips 1 through 8 in the time domain. We use w to de-spread the indicator code, and observe the output y. We then modify w to null chips 2-9, and again observe y. In a similar manner, we scan w across the entire symbol, measuring y at each time offset. The power $|y|^2$ will exhibit a minimum for the weight set w that corresponds to the time location of the impulse noise. In this manner the location of the impulse noise can be determined. Once located, it can be canceled.

Figure 23:
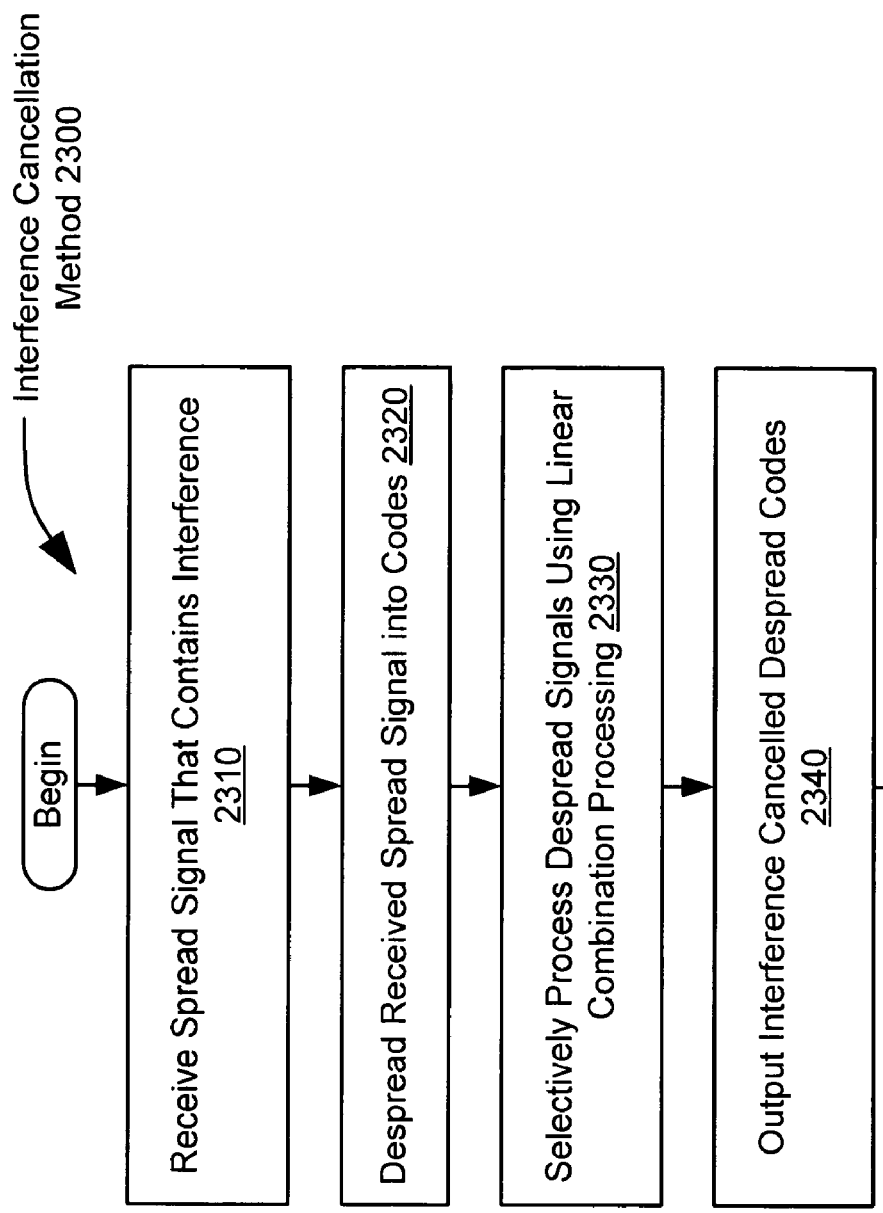
FIG. 23 is an operational flow diagram illustrating an embodiment of an interference cancellation method that is performed according to the present invention.

FIG. 23 is an operational flow diagram illustrating an embodiment of an interference cancellation method 2300 that is performed according to the present invention. In a block 2310, a spread signal is received that contains interference. Then, the received spread signal is de-spread into a number of codes in a block 2320. Each of the codes is selectively processed using linear combination processing as shown in a block 2330. There are a variety of ways in which the linear combination processing may be performed according to the present invention including using a number of unused codes, using all of the available codes, and/or using selected adjacent codes in addition to the unused codes. Ultimately, the interference cancelled de-spread codes are output as shown in a block 2340.

Figure 24:
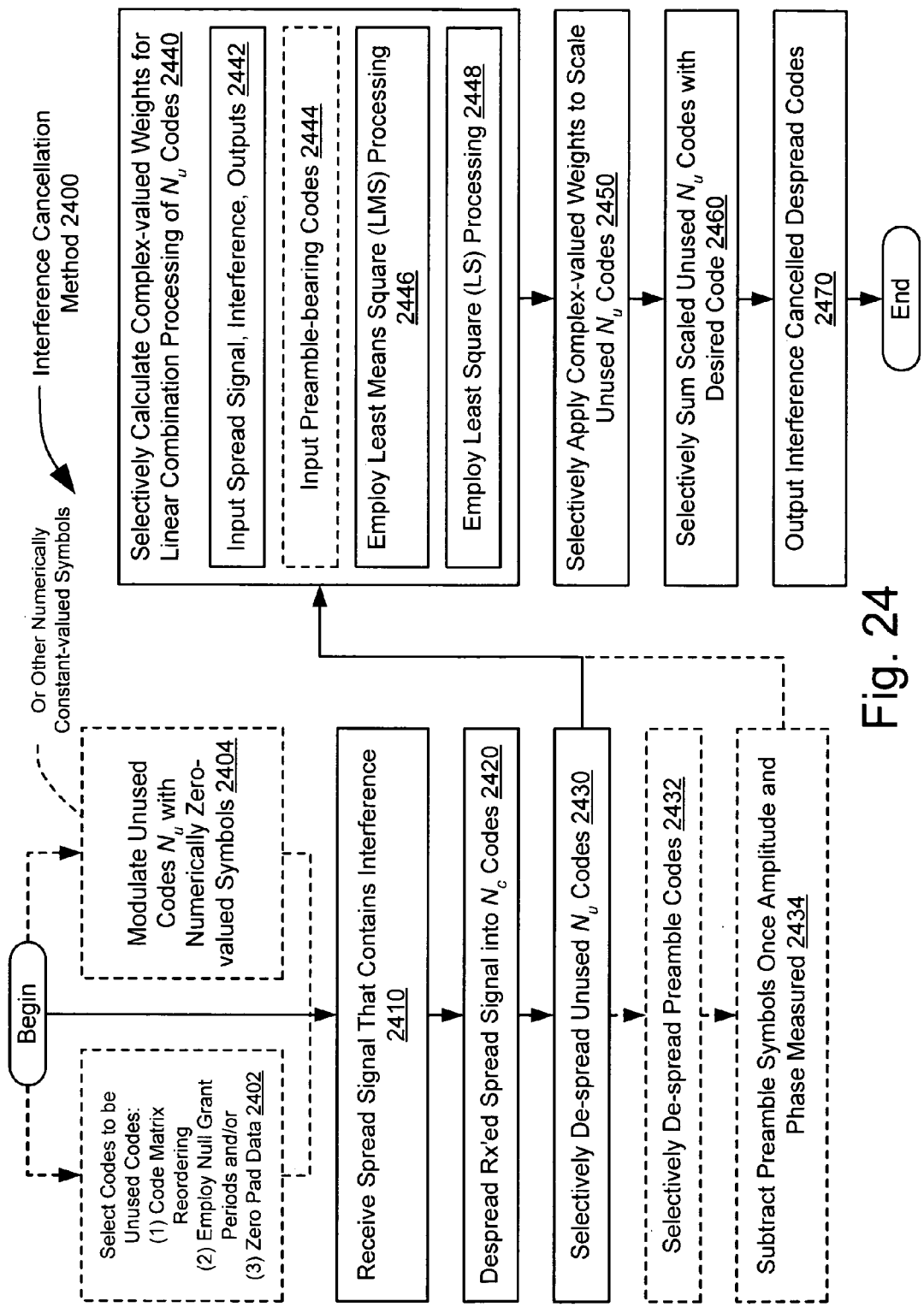
FIG. 24 is an operational flow diagram illustrating another embodiment of an interference cancellation method that is performed according to the present invention.

FIG. 24 is an operational flow diagram illustrating another embodiment of an interference cancellation method 2400 that is performed according to the present invention. Initially, in some embodiments, the method involves selecting those codes that are to be used as the unused codes as shown in a block 2402. As shown within the FIG. 24, there are three different ways in which this may be performed. They include code matrix reordering, employing null grant periods, and/or zero padding data. Even other ways are described when referring to the other Figures as well. These will be the codes that are used to perform the linear combining to effectuate the interference cancellation according to the present invention. In even other embodiments as shown in a block 2404, the unused codes ($N_u$) are modulated with numerically zero-valued symbols. Alternatively, the unused codes ($N_u$) may be modulated with numerically constant-valued symbols that are non-zero or with known-value symbols without departing from the scope and spirit of the invention.

In a block 2410, a spread signal is received that contains interference. Then, the received spread signal is de-spread into a number of codes ($N_c$) as shown in a block 2420. in a block 2430, each of the number of unused codes ($N_u$) is selectively de-spread. The method then will continue to the block 2440 in most instances.

However, in certain embodiments, the method will continue from the block 2430 to the block 2432 in which each of the number of preamble codes is selectively de-spread. The preamble symbols are known and can be subtracted once their amplitude and phase have been measured, as shown in a block 2434, for example using a preamble correlator. Thus the preamble-bearing codes can also be used as inputs to the linear combiner in order to better cancel the interference.

As shown in the block 2440, complex-valued weights for linear combination processing of the unused codes ($N_u$) are selectively calculated. This processing in the block 2440 may be performed by inputting the spread signal, interference, and/or outputs as shown in a block 2442. In the embodiments where the blocks 2432 and 2434 are performed, the preamble-bearing codes may be input as shown in a block 2444 when performing the processing in the block 2440. The processing in the block 2440 may be performed be employing LMS processing as shown in a block 2446 and/or LS processing as shown in a block 2448.

Then, in a block 2450, the complex value weights are selectively applied to scale the unused codes ($N_u$). In a block 2460, the now scaled unused codes ($N_u$) are selectively summed with the desired code. Ultimately, the interference cancelled de-spread codes are output as shown in a block 2440.

Figure 25:
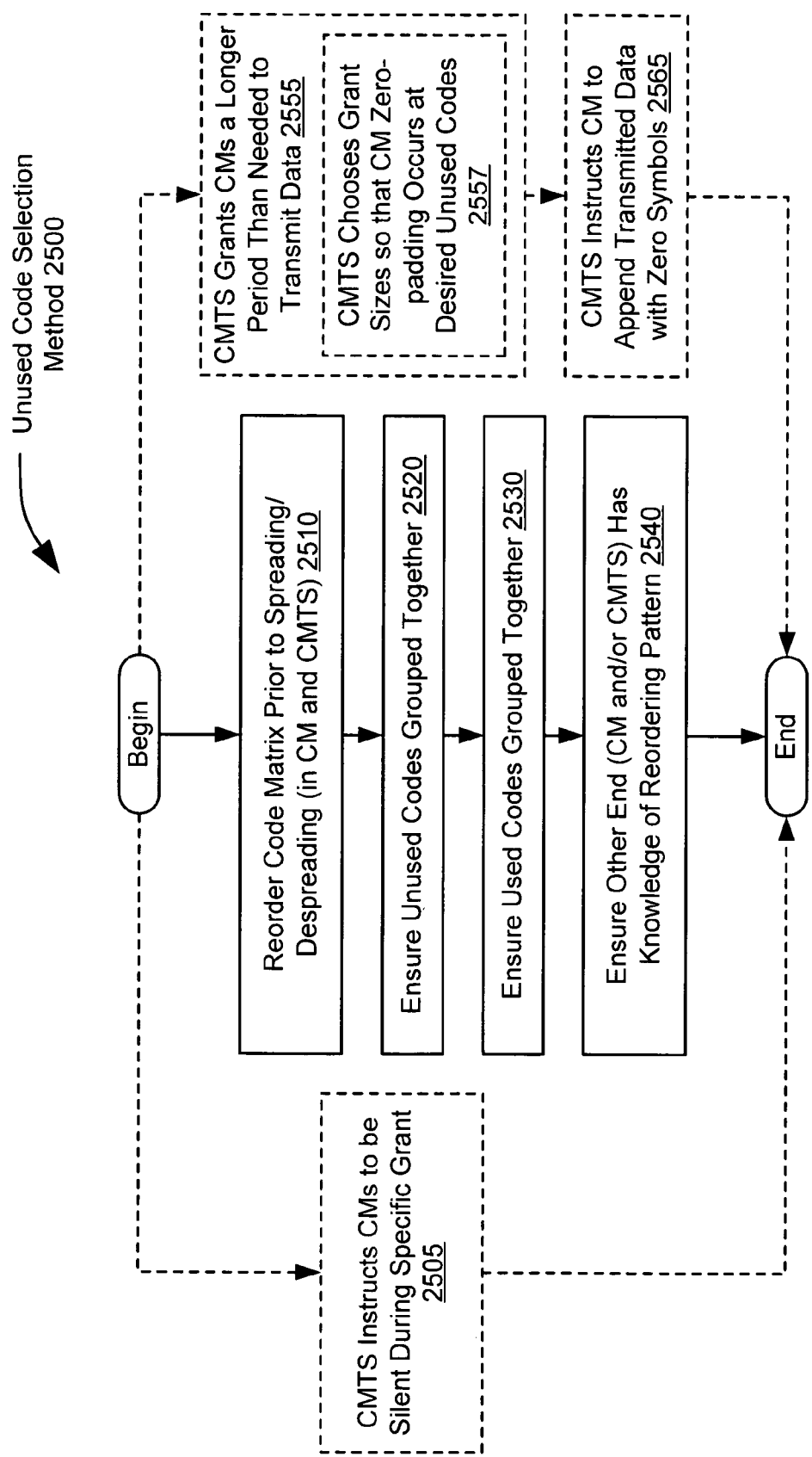
FIG. 25 is an operational flow diagram illustrating an embodiment of an unused code selection method that is performed according to the present invention.

FIG. 25 is an operational flow diagram illustrating an embodiment of an unused code selection method 2500 that is performed according to the present invention. The question arises whether any subset of the codes is a good choice for the unused codes. We consider the example of narrowband interference cancellation in a DOCSIS 2.0 S-CDMA system. For efficient narrowband interference canceling capability, the unused codes have to be chosen such that it is possible to combine them in the adapted codes (in the linear combiner) to form one or more notches in the frequency domain. Thus, for optimal performance, one might need to designate specific codes as unused. The current DOCSIS 2.0 draft specification does not permit the selection of which codes are unused. It has been found that successive, or "adjacent," DOCSIS 2.0 codes are not a good choice. This is because each code is approximately a shift of the previous code. This implies that adjacent or nearly adjacent codes have nearly the same frequency response. Some techniques that could be used to "force" unused codes at specific rows of the code matrix are the following:

The code matrix may be reordered. In this technique, both the CM and CMTS re-order the code matrix as shown in a block 2510, prior to spreading or de-spreading. This may be performed such that desired unused codes are grouped together (say at the lower part of the rearranged code matrix) as shown in a block 2520. Similarly, the desired used codes should be grouped as well (say at the upper part of the rearranged code matrix) as shown in a block 2530. Using such technique requires the knowledge of the reordering pattern at the CMTS as well as all CMs; this may be ensured as shown in a block 2540.

Alternatively, the selection of unused codes may be performed using null grant periods. In this technique, the CMTS instructs all CMs to be silent during a specific grant as shown in a block 2505 (i.e., the desired unused codes). This technique has the advantage that the CMs need not have prior knowledge of the unused codes and just follow the CMTS grants. However, it may be viewed as causing inefficiencies to the CMTS scheduling process that may prohibit this approach in some implementations.

Alternatively, the selection of unused codes may be performed by zero-padding the data. In this technique, the CMTS grants the CM a longer grant period that what is needed to transmit the grant data as shown in a block 2555. If desired when performing the operation of the block 2555, the grant sizes are chosen by the CMTS in a way such that the CM zero-padding occurs at the desired unused codes as shown in a block 2557. The CMTS also instructs the CM to append the transmitted data with zero-symbols as shown in a block 2565.

Figure 26:
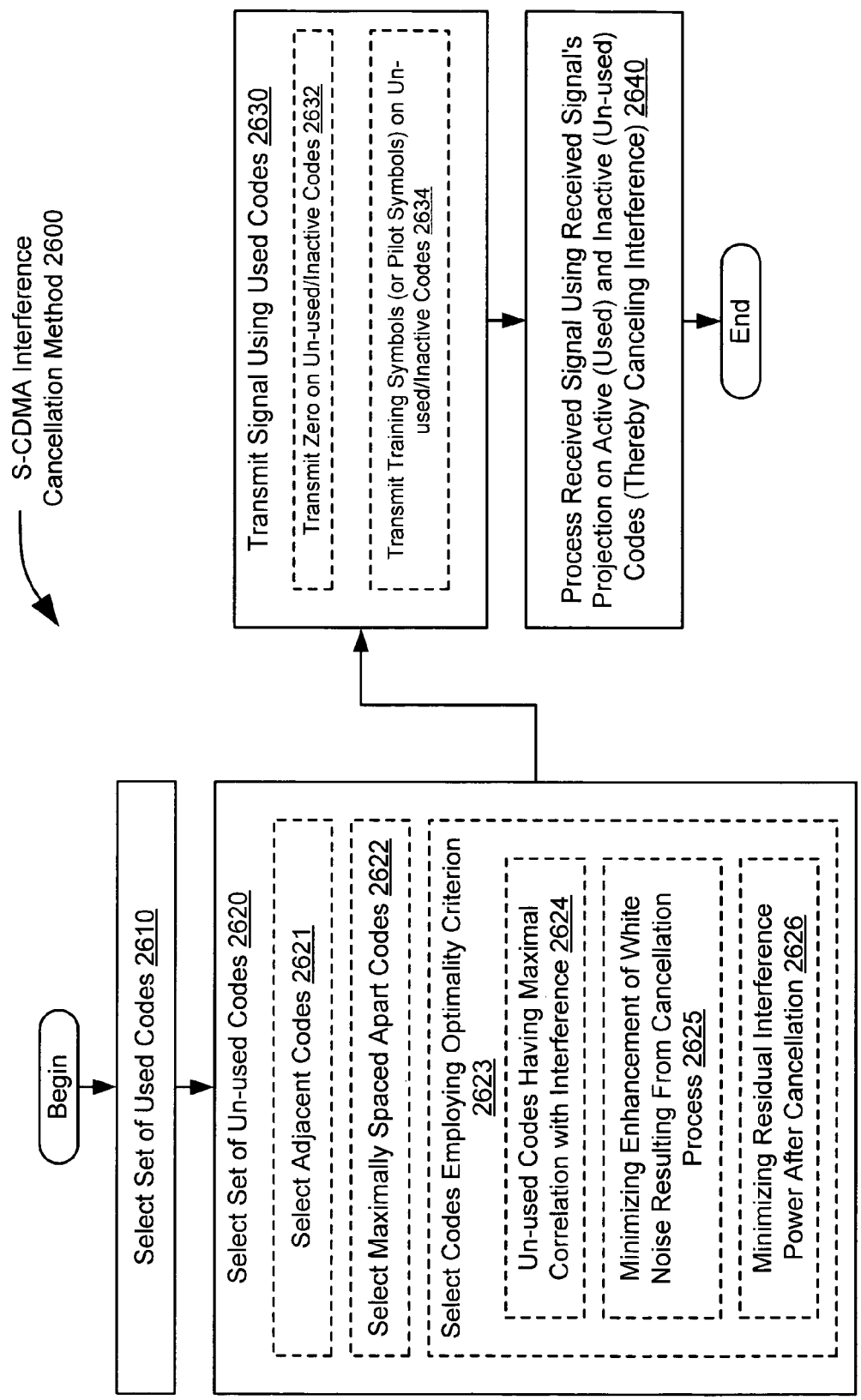
FIG. 26 is an operational flow diagram illustrating an embodiment of an S-CDMA interference cancellation method that is performed according to the present invention.

FIG. 26 is an operational flow diagram illustrating an embodiment of an S-CDMA interference cancellation method 2600 that is performed according to the present invention. In a block 2610, a set of used codes is selected. Then, in a block 2620, a set of unused codes is selected. A signal is transmitted using the used codes as shown in a block 2630. In certain embodiments, as shown in a block 2632, we transmit one or more zeroes on the inactive/unused codes. Alternatively, as shown in a block 2634, we transmit a known sequence (training or pilot symbols) on the inactive/unused codes. Alternatively, we may transmit lower order modulation on "inactive" codes.

Then, in a block 2640, the received signal is processed using the received signal's projection on the active (used) codes and the inactive (unused) codes thereby canceling interference. We process the received signal using both its projection onto a desired (active) code, and its projection onto the inactive codes, in order to cancel interference on the desired code. From certain perspectives, in the context of a system and method that employ vector de-spreading to a spread signal, the projection may be viewed as being the vector de-spreader output. However, in other contexts, a projection may be viewed as being the representation of the received signal across its finite signal space. This understanding of projection may be used to describe the representation of the signal across a finite signal space.

The operation of FIG. 26 is performed within the context of an S-CDMA communications system in the presence of interference. There are a number of types of S-CDMA systems that may support the method of the FIG. 26. For example, some types of S-CDMA systems include DOCSIS 2.0 set of codes and Walsh-Hadamard codes. The selection of the inactive/unused codes may be performed as illustrated and described above within some of the embodiments shown in a block 2621 including use codes 0, 1, 2, 3, . . . (adjacent codes, as done in DOCSIS 2.0 spec), spacing the inactive/unused codes maximally apart as shown in a block 2622, and selecting the codes according to an optimality criterion as shown in a block 2623.

For example, when spacing the inactive/unused codes maximally apart within DOCSIS 2.0 S-CDMA code set, the 8 unused codes out of 128 total codes might be code numbers {15 31 47 63 79 95 111 127}. When selecting a different number of unused codes within the DOCSIS 2.0 S-CDMA code set, they may be similarly maximally spaced apart.

In addition, the inactive/unused codes may be selected according to the optimality criterion of the block 2623. Examples of an optimality criteria would be to select unused codes include: (1) selecting inactive/unused codes that have maximal correlation with the interference as shown in a block 2624, (2) minimizing enhancement of white noise resulting from cancellation process as shown in a block 2625, and (3) minimizing residual interference power after cancellation as shown in a block 2626.

Figure 27:
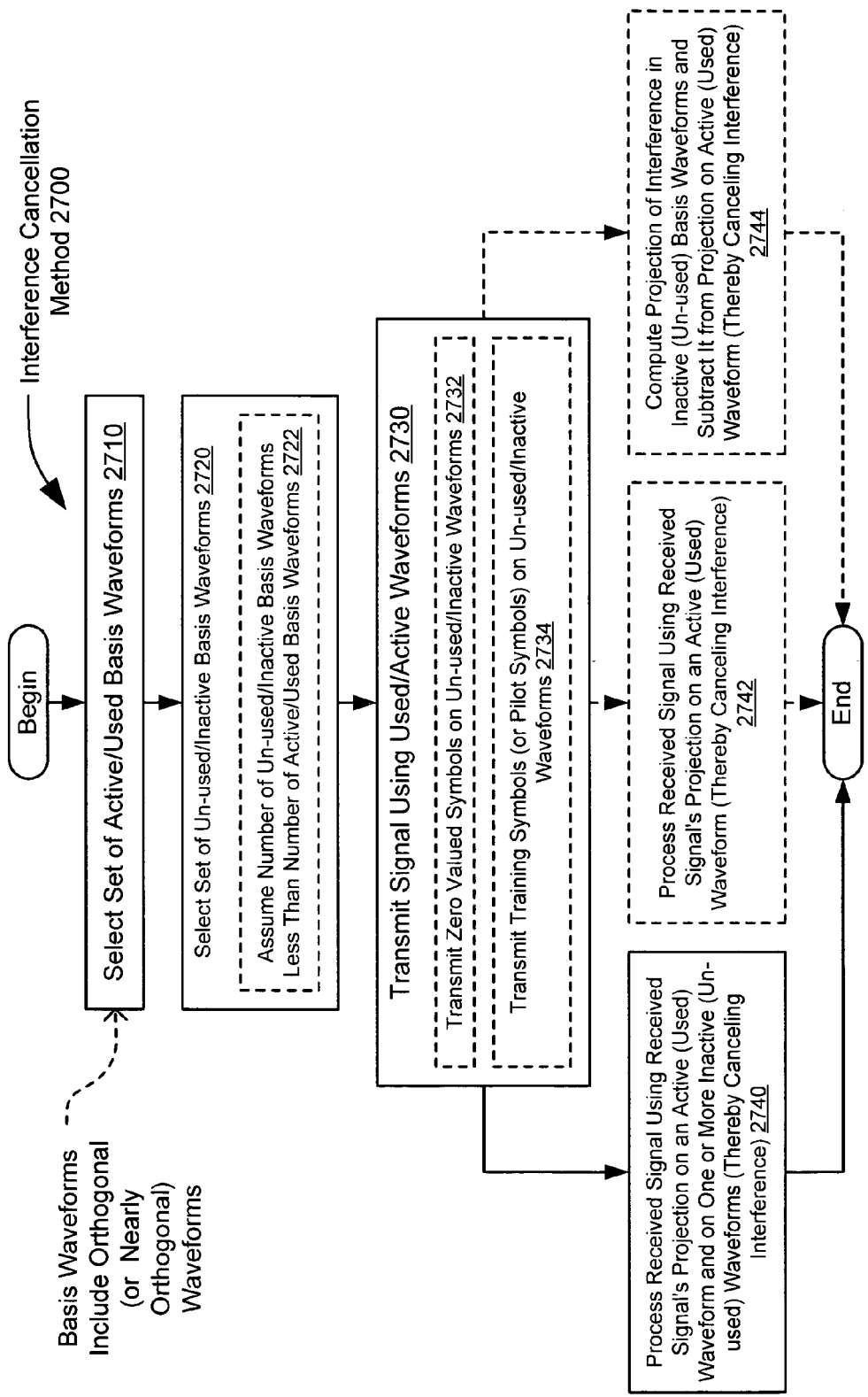
FIG. 27 is an operational flow diagram illustrating another embodiment of an interference cancellation method that is performed according to the present invention.

FIG. 27 is an operational flow diagram illustrating another embodiment of an interference cancellation method 2700 that is performed according to the present invention. In a block 2710, a set of active/used basis waveforms is selected. These basis waveforms may include orthogonal (or nearly orthogonal) waveforms; these waveforms may be viewed as being substantially orthogonal. There are a number of types of sets of orthogonal waveforms may be employed. Some specific examples of sets of orthogonal waveforms include: (1) S-CDMA codes, including DOCSIS 2.0 and Walsh-Hadamard, (2) an orthogonal set of binary spreading codes, (3) any orthogonal set of quaternary spreading codes, and (4) the rows of the identity matrix.

Then, in a block 2720, a set of inactive/unused basis waveforms is selected. In certain embodiments as shown in a block 2722, we may assume that the number of inactive/unused basis waveforms is less than number of active/used basis waveforms. A signal is transmitted using the active/used basis waveforms as shown in a block 2730. In certain embodiments, as shown in a block 2732, we transmit one or more zero valued symbols on the inactive/unused basis waveforms. Alternatively, as shown in a block 2734, we transmit a known sequence (training or pilot symbols) on the inactive/unused basis waveforms.

Then, in a block 2740, the received signal is processed using the received signal's projection on the active (used) basis waveforms and the inactive (unused) basis waveforms thereby canceling interference. We process the received signal using both its projection onto a desired (active) waveform, and its projection onto the inactive waveforms, in order to cancel interference on the desired waveform.

Alternatively, in a block 2742, the received signal is processed using the received signal's projection on the active (used) basis waveforms thereby canceling interference. We process the received signal using its projection onto a desired (active) waveform in order to cancel interference on the desired waveform.

In even alternative embodiments, in a block 2744, we compute the projection of the interference on the inactive/unused basis waveforms, and subtract it from the projection on the active/used basis waveforms of the received signal including interference thereby canceling interference. It is noted here that we can reduce the computational complexity by computing the null-space projection (the projection of the interference on the inactive basis waveforms) and subtracting it from the overall projection (the projection of the signal+interference on the active basis waveforms). As an example, if we have 120 active codes and 8 inactive codes, in the present method we only need to invert an 8×8 matrix. In the standard least-squares approach, we would have to invert a 120×120 matrix.

The selection of the inactive/unused basis waveforms may be performed as illustrated and described above within some of the embodiments selecting adjacent basis waveforms, spacing the inactive/unused basis waveforms maximally apart, and selecting the basis waveforms according to an optimality criterion. Examples of optimality criteria would be to select unused basis waveforms include: (1) selecting inactive/unused basis waveforms that have maximal correlation with the interference, (2) minimizing enhancement of white noise resulting from cancellation process, and (3) minimizing residual interference power after cancellation. These parameters that may be used to perform the selection of the inactive/unused basis waveforms is analogous to the selection of the inactive/unused codes that is performed above with respect to the FIG. 26, except here, the selection is with respect to the basis waveforms of the signal space.

Figure 28:
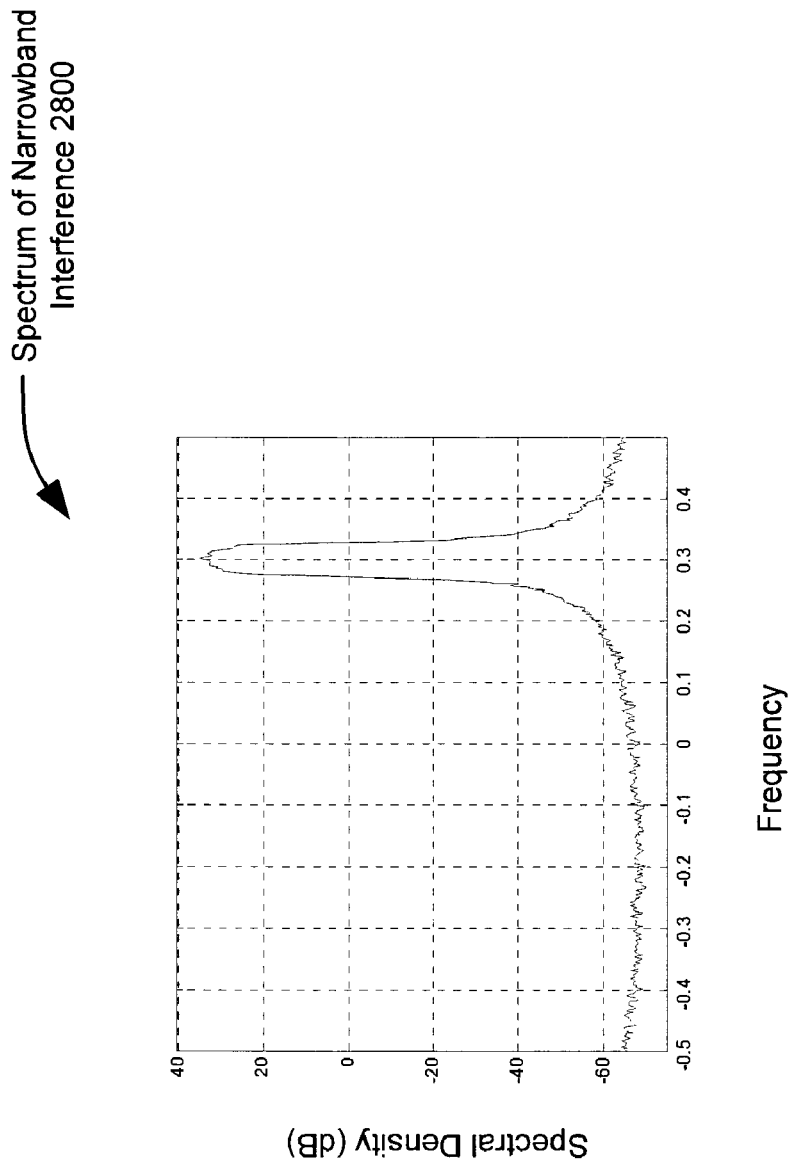
FIG. 28 is a diagram illustrating an embodiment of a spectrum of narrowband interference that may be addressed and overcome when practicing via the present invention.

FIG. 28 is a diagram illustrating an embodiment of a spectrum of narrowband interference 2600 that may be addressed and overcome when practicing the present invention. The FIG. 28 shows the spectrum of narrowband interference (for example, the signal n in the FIG. 16, 17, and/or 18) that may be present at the input of a communications receiver. The desired signal is not present in this Figure. In this example, the 3-dB bandwidth of the interference is $\frac{1}{32}$ of the symbol rate of the desired signal. Its power is equal to the desired signal (0 dBc), when the desired signal is present. The SNR (Signal to Noise) of the desired signal, when present, is 35 dB in the example.

Figure 29:
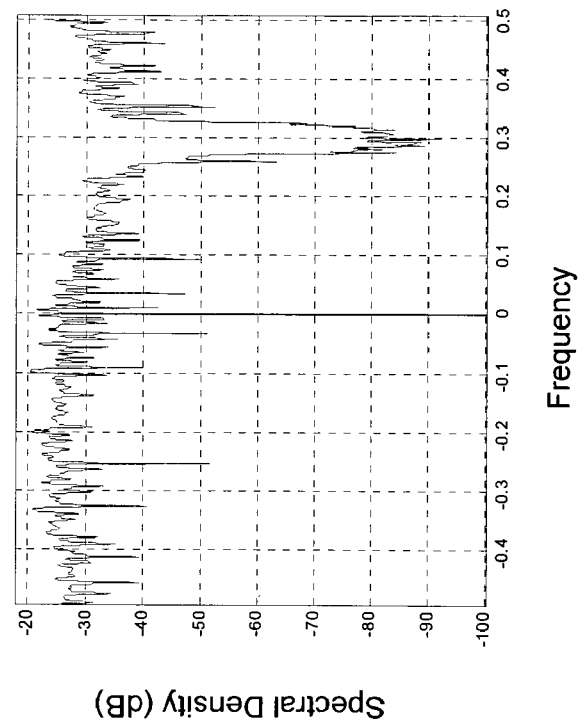
FIG. 29 is a diagram illustrating an embodiment of a spectrum of adapted code showing null at a location of interference that may be achieved when practicing via the present invention.

FIG. 29 is a diagram illustrating an embodiment of a spectrum of an adapted code showing null at a location of interference 2900 that may be achieved when practicing via the present invention. The FIG. 29 shows the spectrum of the adapted code. The adapted code is seen to have a null corresponding to the narrowband interference. Hence, the adapted code cancels the narrowband interference.

Figure 30:
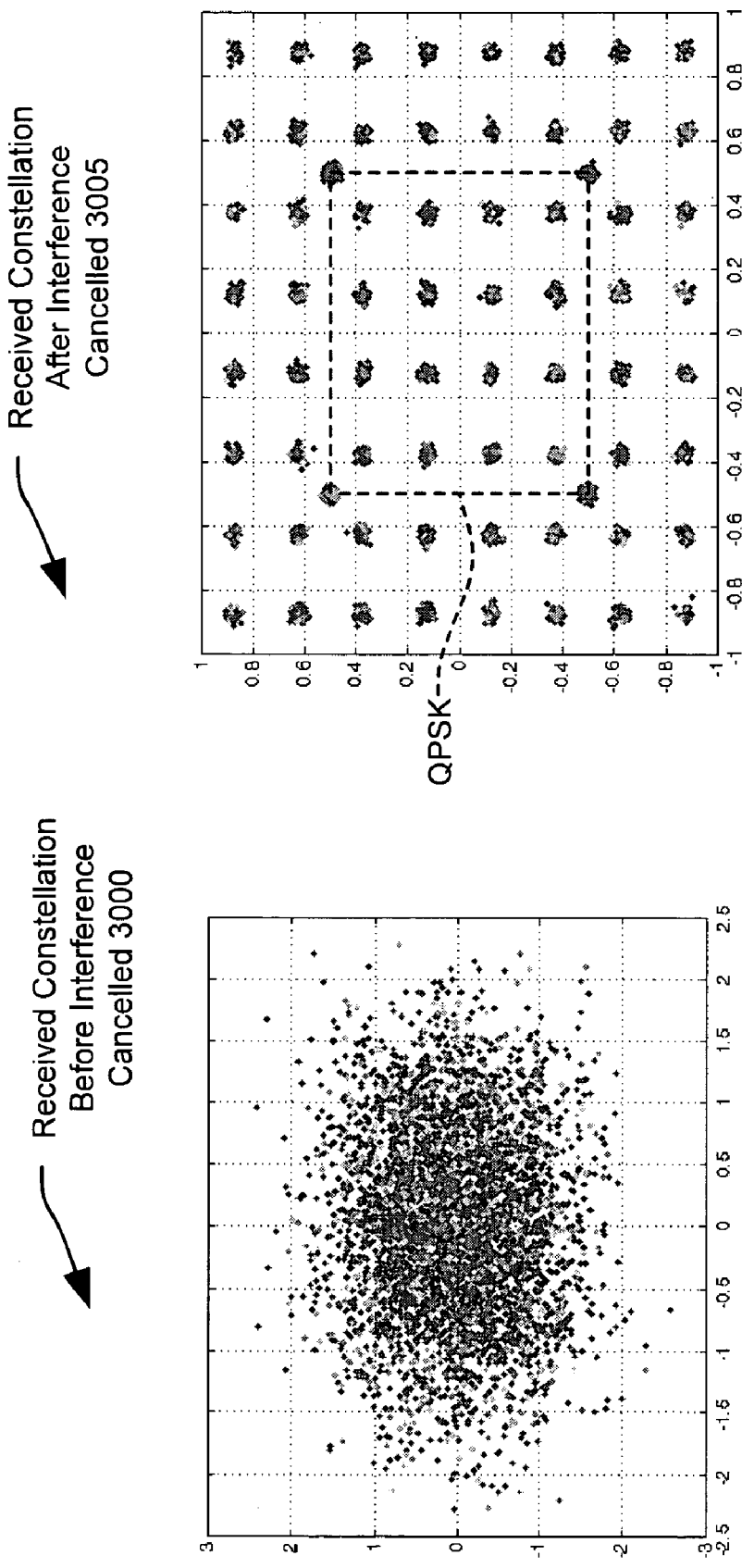
FIG. 30A is a diagram illustrating an embodiment of a received constellation before interference has been cancelled when practicing via the present invention.
FIG. 30B is a diagram illustrating an embodiment of a received constellation after interference has been cancelled when practicing via the present invention.

FIG. 30A is a diagram illustrating an embodiment of a received constellation before interference has been cancelled 3000 when practicing the present invention. The FIG. 30A shows the output $d_s$ of the vector de-spreader before interference cancellation is enabled using the linear combiner and weight computation functionality. This may be viewed as being the output $d_s$ within any of the FIG. 16, 17, and/or 18. That is, all the adaptive weights $w_i$ are zero, and only the normal de-spreading code $c_s$ is used to de-spread the desired signal. We see that the signal constellation is unrecognizable due to the large amount of interference, which has not yet been canceled.

FIG. 30B a diagram illustrating an embodiment of a received constellation after interference has been cancelled 3005 when practicing via the present invention. The FIG. 30B shows the output $d_s$ of the de-spreader after the interference cancellation of the present invention is enabled using the linear combiner and weight computation functionality. Now the adaptive weights $w_i$ have adapted and are nonzero, and as a result the adapted de-spreading code $c_a$ is used to de-spread the desired signal. We see that the 64 QAM signal constellation, plus the QPSK constellation used for the preamble, is now clearly recognizable and the interference has been effectively canceled.

[New Desscription for BP2285.1 from this Point Forward]

Figure 31:
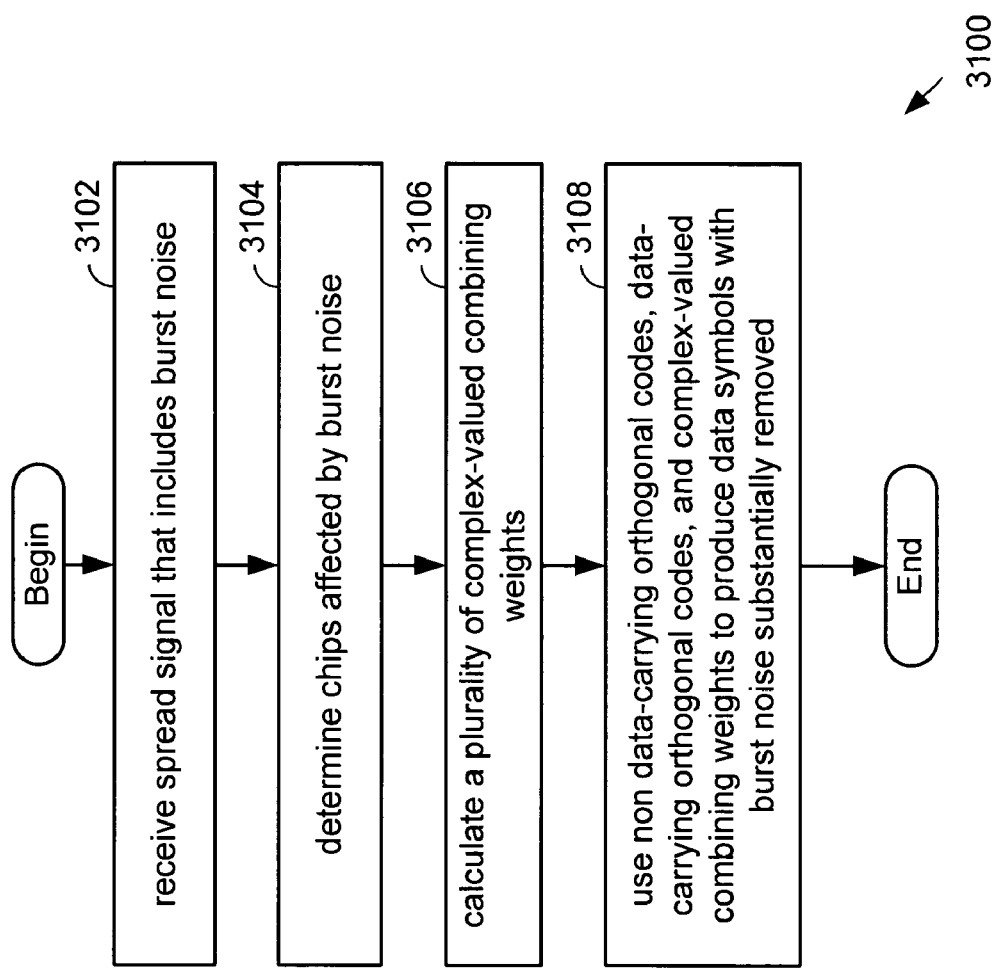
FIG. 31 is a flow chart illustrating an embodiment of a method of the present invention for removing burst noise from a received spread signal.

FIG. 31 is a flow chart illustrating an embodiment of a method of the present invention for removing burst noise from a received spread signal. With this method, a communication receiver receives a spread signal that was formed at a transmitter from at least one known-value symbol spread by a plurality of non data-carrying orthogonal codes and data symbols spread by at least one data-carrying orthogonal code. Any known set of symbols spread by the non-data-carrying codes may be employed. These known-value symbols can be constant or varying in some determined manner, as long as they are known to the receiver. Numerical zeros modulating the non-data-carrying codes are one of the simplest cases to implement. This spread signal was transmitted on a channel that introduced burst noise and was received with the burst noise (step 3102). After receipt, the receiver determines chips of the orthogonal codes that are affected by the burst noise (step 3104). One technique for determining the chips that are affected by the burst noise is described further in co-pending application Ser. No. 10/962,803 filed Oct. 12, 2004, pending, and entitled CHIP BLANKING AND PROCESSING IN SCDMA TO MITIGATE IMPULSE AND BURST NOISE AND/OR DISTORTION, and having common inventorship and common ownership with the present application. The method continues with calculating a plurality of complex-valued combining weights based upon the burst noise affected chips (step 3106). One technique for determining such complex-valued weights for burst noise interference will be described further herein after description of FIG. 38. However, other techniques can of course be used, some of which have been previously described with reference to FIGS. 22-27. The method concludes by using the plurality of non data-carrying orthogonal codes, the at least one data-carrying orthogonal code, and the plurality of complex-valued combining weights to de-spread the received spread signal to produce the data symbols with the burst noise substantially removed (step 3108). Various embodiments of the operations of step 3108 are described further herein with reference to FIGS. 33, 34, 36, and 37. Each of these various embodiments of the preset invention support multiple modulation types, including binary modulation types, quadrature modulation types, and higher order modulation types such as QAM modulations.

Figure 32:
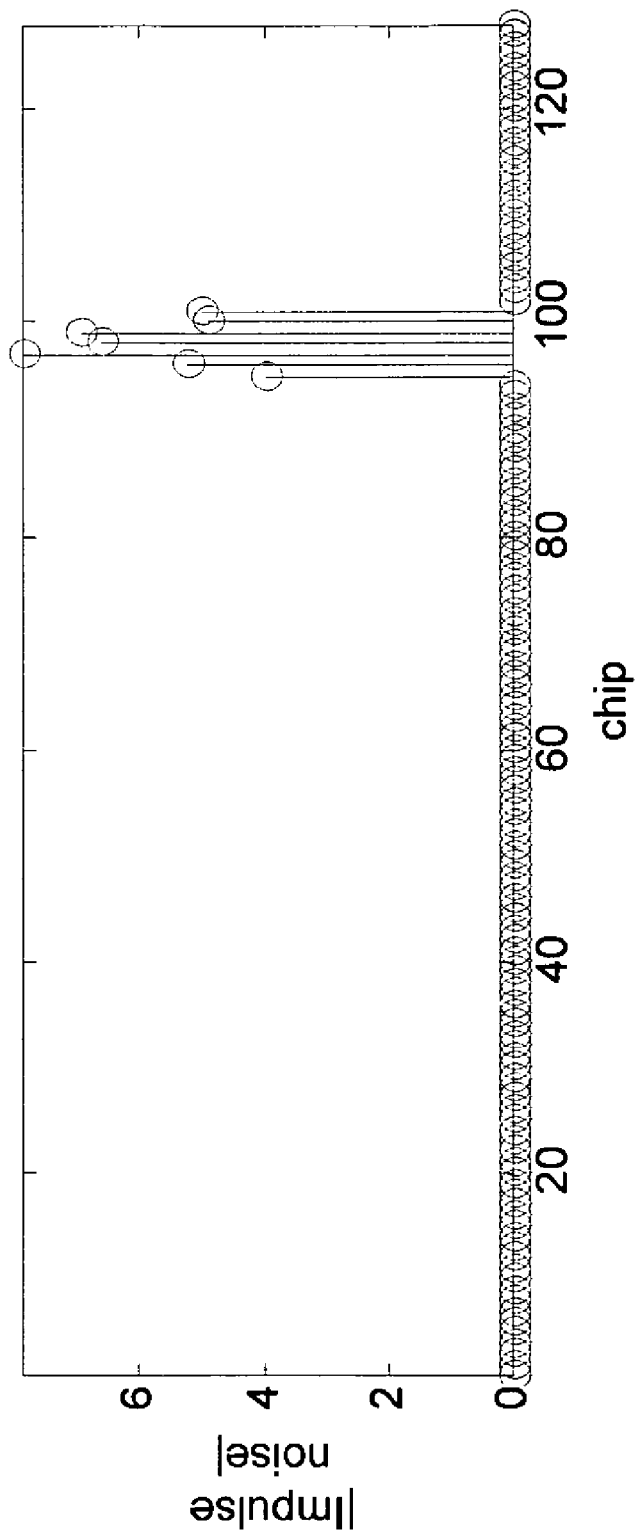
FIG. 32 is a graph illustrating the manner in which burst noise may affect a portion of the chips of a symbol of the spread signal, referenced with respect to chips of an orthogonal code (128 chips per symbol in this example).

FIG. 32 is a graph illustrating the manner in which burst noise may affect a portion of the chips of a symbol of the spread signal, referenced with respect to chips of an orthogonal code, e.g., the signal n in FIGS. 16, 17, and/or 18 that may be present at the input of a communications receiver. In the example of FIG. 32, burst noise is present during chips 94-100 of a 128 chip sequence S-CDMA code. Using a different approach for interference suppression, one could simply start with the normal S-CDMA code $c_s$ and arbitrarily replace a group of chips (those numbered 94-100 in the example) with zeros, or with very small values. However, such a modified code would no longer be orthogonal to the remaining S-CDMA codes. This loss of orthogonality would result in intercede interference (ICI). While the ICI could be removed by a successive interference canceller (SIC) as described in co-pending application Ser. No. 10/242,032, filed on Sep. 12, 2002, pending, entitled SUCCESSIVE INTERFERENCE CANCELLATION FOR CDMA, and having common inventorship and common ownership with the present application, such solution results in reduced performance in many cases compared to the present invention. In contrast, the communication system of the present invention complexly combines at least the non data-carrying codes so that the combination of adjusted codes causes the burst noise affected chips (94-100 in the example) to have vanishingly small values while maintaining the orthogonality of the spreading codes that are used to distinguish signals of interest.

Figure 33:
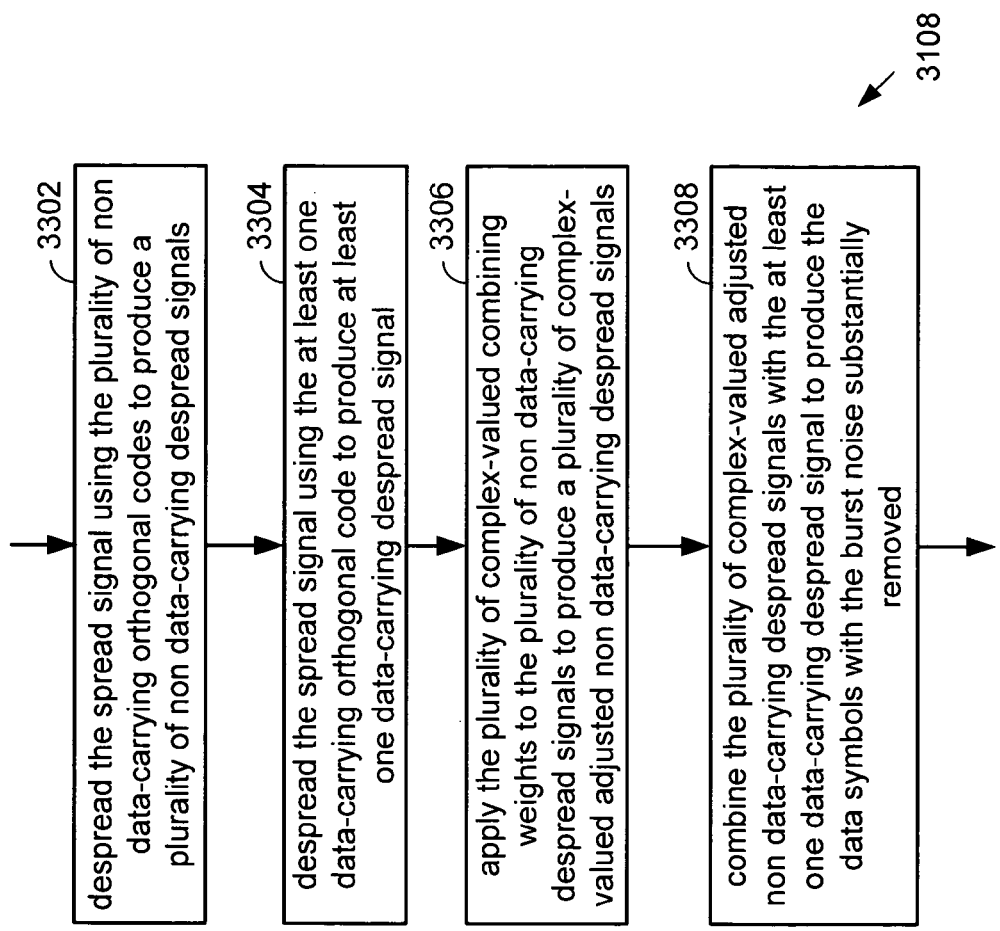
FIG. 33 is a flow chart illustrating a first embodiment of the method of FIG. 31 that may be implemented with the structure of FIG. 16.

FIG. 33 is a flow chart illustrating a first embodiment of the method of FIG. 32 that may be implemented with the structure of FIG. 16. With the embodiment of FIG. 33, step 3108 of FIG. 31 includes despreading the spread signal using the plurality of non data-carrying orthogonal codes to produce a plurality of non data-carrying despread signals (step 3302). The plurality of non data-carrying orthogonal codes are referred to as $c_1, c_2, \ldots c_8$ in FIG. 16. The non data-carrying despread signals are referred to as $d_1, d_2, \ldots d_8$ of FIG. 16. Step 3108 further includes despreading the spread signal using the at least one data-carrying orthogonal code to produce at least one data-carrying despread signal (step 3304), i.e., $d_s$ of FIG. 16. With these steps completed, the method includes applying the plurality of complex-valued combining weights ($w_1$-$w_8$ of FIG. 16) to the plurality of non data-carrying despread signals to produce a plurality of complex-valued adjusted non data-carrying despread signals (step 3306). The operations of step 3108 finally include combining the plurality of complex-valued adjusted non data-carrying despread signals with the at least one data-carrying despread signal to produce the data symbols with the burst noise substantially removed (step 3308).

Figure 34:
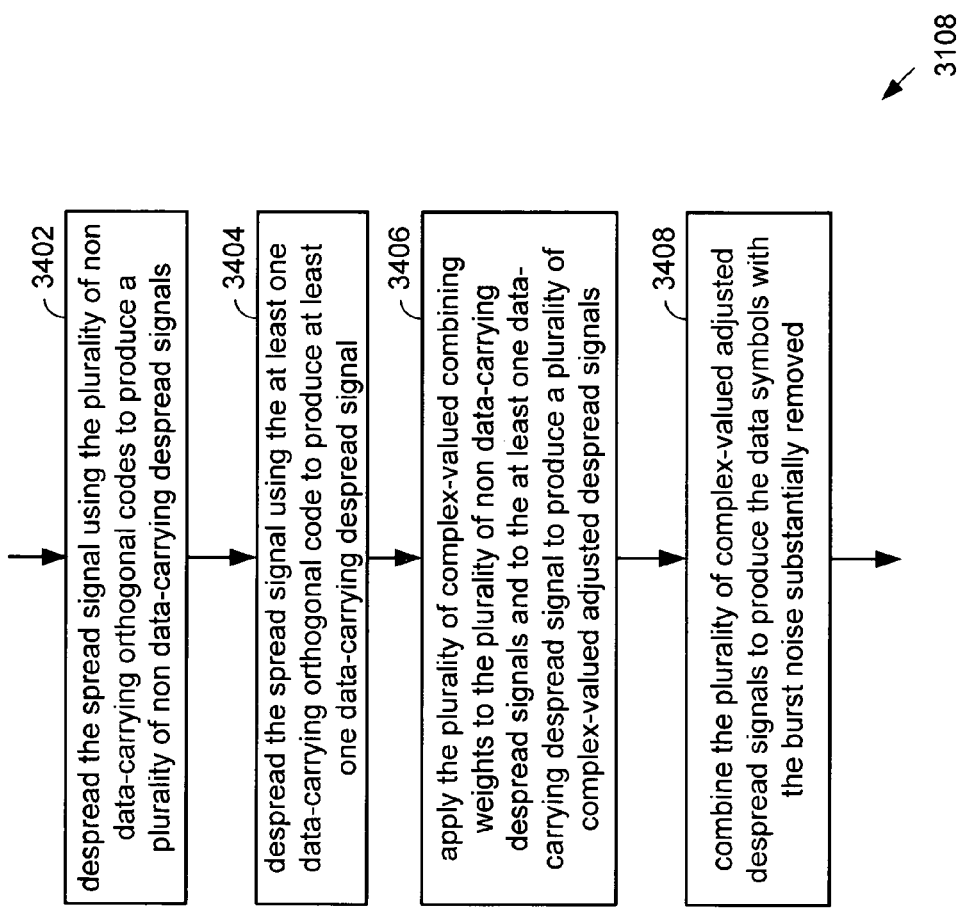
FIG. 34 is a flow chart illustrating a second embodiment of the method of FIG. 31 that may be implemented with the structure of FIG. 17.

FIG. 34 is a flow chart illustrating a second embodiment of the method of FIG. 32 that may be implemented with the structure of FIG. 17. With the embodiment of FIG. 34, step 3108 of FIG. 31 includes despreading the spread signal using the plurality of non data-carrying orthogonal codes to produce a plurality of non data-carrying despread signals (step 3402). The plurality of non data-carrying orthogonal codes are referred to as $c_1, c_2, \ldots c_8$ in FIG. 17. Step 3108 further includes despreading the spread signal using the at least one data-carrying orthogonal code to produce at least one data-carrying despread signal (step 3404). The at least one data-carrying orthogonal code referred to as $c_s$ in FIG. 17. Step 3108 then includes applying the plurality of complex-valued combining weights ($w_1$-$w_8$ and $w_s$ of FIG. 17) to the plurality of non data-carrying despread signals and to the at least one data-carrying despread signal to produce a plurality of complex-valued adjusted despread signals (step 3406). Step 3108 concludes with combining the plurality of complex-valued adjusted despread signals to produce the data symbols with the burst noise substantially removed (step 3408).

Figure 35:
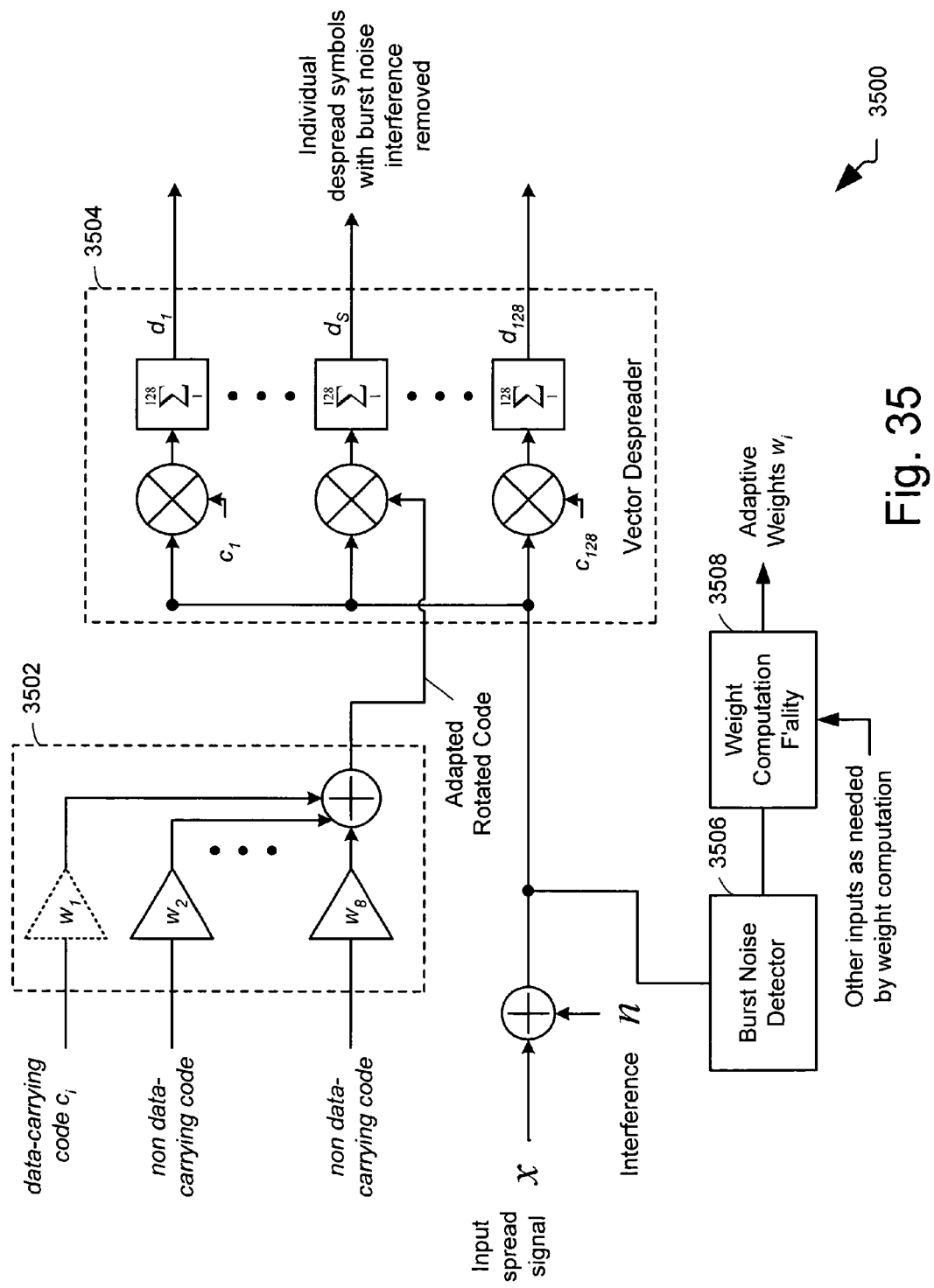
FIG. 35 is a diagram illustrating an embodiment of an interference canceller that is built according to the present invention illustrating a third or fourth embodiment of the method of FIG. 31.

FIG. 35 is a diagram illustrating an embodiment of an interference canceller 3500 that is built according to the present invention. With a first example of the interference canceller 3500, the linear combiner 3502 is operable to: (1) apply the plurality of complex-valued combining weights to the plurality of non data-carrying orthogonal codes to produce a plurality of complex-valued weighted non-data carrying orthogonal codes; and (2) combine the plurality of complex-valued weighted non-data carrying orthogonal codes with the at least one data-carrying orthogonal code to produce an adapted rotated code. In such case, the weight $w_1$ is unity while at least some of weights $w_2$ through $w_8$ are non-unity and complex-valued. With this example, the vector de-spreader 3504 is operable to despread the received spread signal using the adapted rotated code to produce the data symbols with the burst noise substantially removed. A burst noise detector 3506 is operable to detect chips of a code that are affected by burst noise. Weight computation block 3508 is operable to determine the weights $w_1$-$w_8$.

With a second example of the interference canceller 3500, the linear combiner 3502 is operable to: (1) apply the plurality of complex-valued combining weights to the plurality of non data-carrying orthogonal codes and to the at least one data-carrying orthogonal code to produce a plurality of complex-valued weighted orthogonal codes; and (2) combine the plurality of complex-valued weighted orthogonal codes to produce an adapted rotated code. In such case, all of weights $w_1$ through $w_8$ may be non-unity and complex-valued. With this example, the vector de-spreader 3504 is also operable to despread the received spread signal using the adapted rotated code to produce the data symbols with the burst noise substantially removed.

Figure 36:
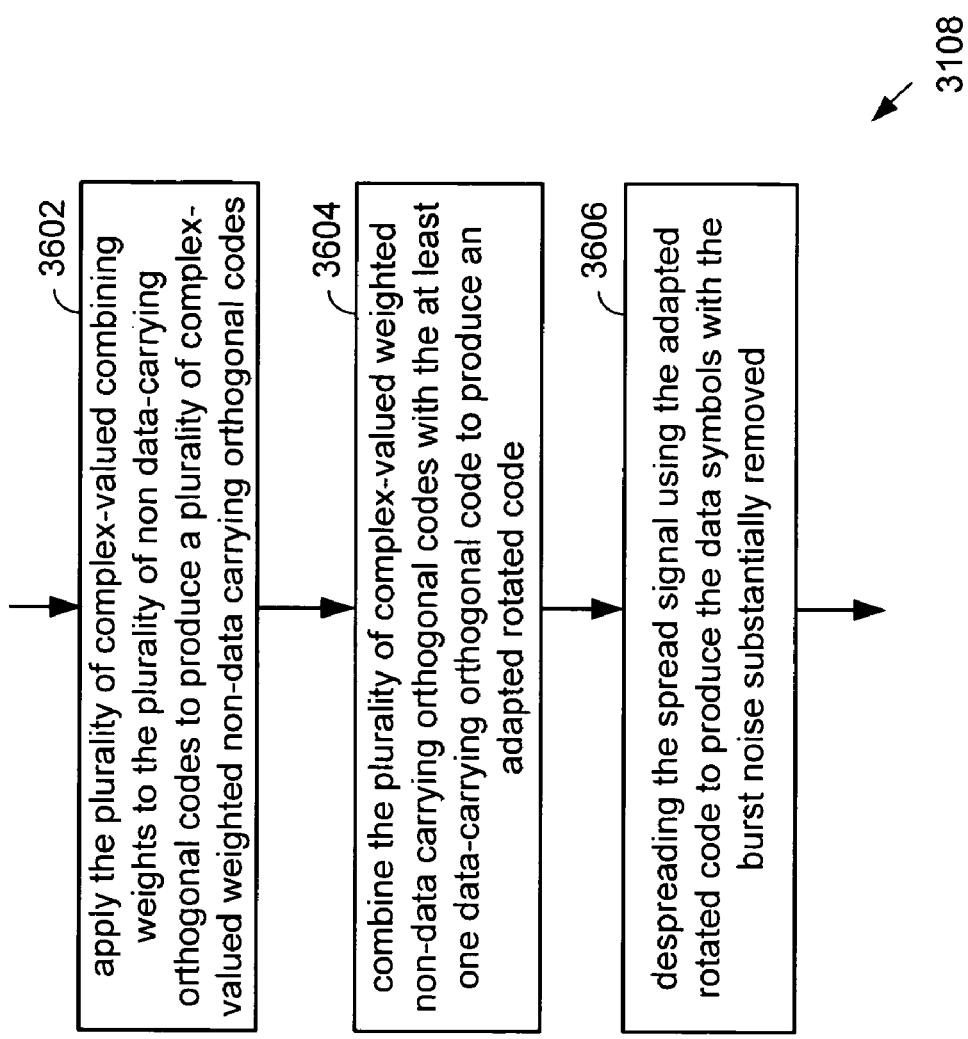
FIG. 36 is a flow chart illustrating a third embodiment of the method of FIG. 32 that may be implemented with the structure of FIG. 35.

FIG. 36 is a flow chart illustrating a third embodiment of the method of FIG. 32 with the structure of FIG. 35. Operation of step 3108 commences with applying the plurality of complex-valued combining weights to the plurality of non data-carrying orthogonal codes to produce a plurality of complex-valued weighted non-data carrying orthogonal codes (step 3602). Operation of step 3108 continues with combining the plurality of complex-valued weighted non-data carrying orthogonal codes with the at least one data-carrying orthogonal code to produce an adapted rotated code (step 3604). Operation of step 3108 concludes with despreading the spread signal using the adapted rotated code to produce the data symbols with the burst noise substantially removed (step 3606). This embodiment of step 3108 of FIG. 31 corresponds to the first example described above with reference to FIG. 35.

Figure 37:
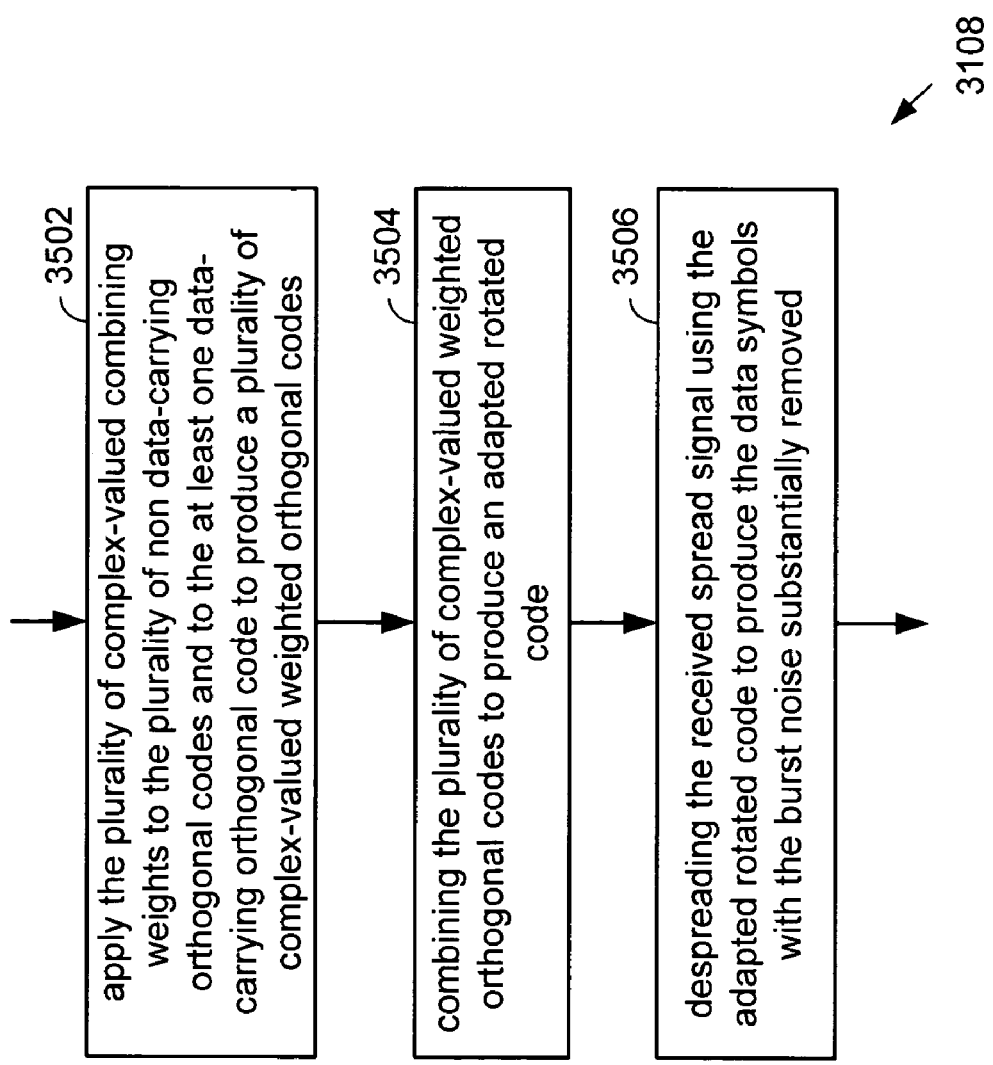
FIG. 37 is a flow chart illustrating a fourth embodiment of the method of FIG. 32 that may be implemented with the structure of FIG. 35.

FIG. 37 is a flow chart illustrating a fourth embodiment of the method of FIG. 32 with the structure of FIG. 35. Operation of step 3108 commences with applying the plurality of complex-valued combining weights to the plurality of non data-carrying orthogonal codes and to the at least one data-carrying orthogonal code to produce a plurality of complex-valued weighted orthogonal codes (step 3702). Operation of step 3108 continues with combining the plurality of complex-valued weighted orthogonal codes to produce an adapted rotated code (step 3704). Operation of step 3108 concludes with despreading the spread signal using the adapted rotated code to produce the data symbols with the burst noise substantially removed (step 3706). This embodiment of step 3108 of FIG. 31 corresponds to the second example described above with reference to FIG. 35.

Figure 38:
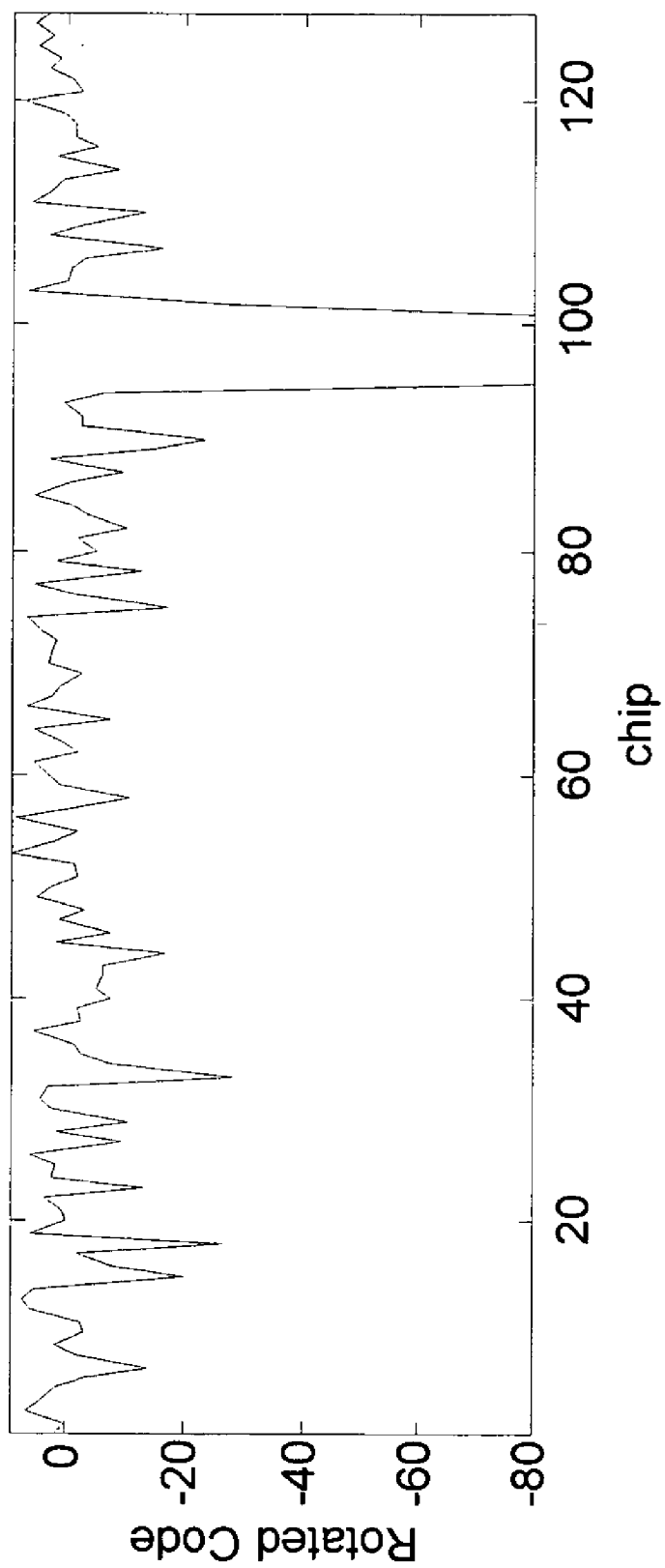
FIG. 38 is a chart illustrating the property in which an adapted rotated code is virtually zero during the period in which the burst noise is present in FIG. 32, thereby allowing the adapted rotated code to be employed to attenuate the burst noise illustrated in FIG. 32.

FIG. 38 is a chart illustrating the manner in which a plurality of rotated codes are employed to attenuate the burst noise illustrated in FIG. 31. The resulting adapted rotated code is nearly zero at the selected chips, but is still orthogonal to the other codes; that is, no ICI is added. The example of FIG. 38 corresponds most closely with the interference canceller of FIG. 35 and the operations of FIGS. 36 and 37. However, the principles described with regard to the other FIGs. are correctly related in FIG. 38, i.e., that the incoming signal is essentially zeroed for the burst noise affected chips without causing ISI.

One technique for determining complex-valued weights is next described. The example described first is directly applicable to the structure of FIG. 35. First, consider an S-CDMA system described by the equation $$r = Cx + v$$

Where
r is a length N column vector representing received signal plus noise samples, one sample per chip.
x is a length N column vector $[x_1 \, x_2 \, x_3 \ldots x_k \, 0 \, 0 \, 0 \ldots 0]^T$ representing N−k zeros followed by k transmitted data symbols.
C is an N×N orthonormal code matrix whose columns are the N orthonormal S-CDMA codes.
v is a length N column vector representing added burst noise samples, one sample per chip.

In this formula, the vector x contains k data symbols that are to be transmitted through the channel. Each symbol modulates one code vector in the code matrix C. In addition, there are N−k zero-valued symbols, which modulate N−k unused codes. These unused codes provide the redundancy that permits cancellation of interference in accordance with the present invention. Multiplication of x by the code matrix C represents the spreading operation that occurs in the transmitter (or transmitters). In a multiple-access system, this matrix multiplication (spreading) may be distributed across several transmitters, where each synchronized transmitter is assigned a subset of the codes. The spread signals from the various transmitters are added together in the channel in such a multiple-access system. The noise samples v represent added burst noise that occurs in the channel.

In the despreading process, the receiver multiplies the received vector r by the conjugate transpose C* of the code matrix. The despreader output y is given by $$y = C^* r$$

$$y = C^* C x + C^* v$$

$$y = x + C^* v$$

Where
y is a length N column vector representing despread signal plus noise samples (soft decisions at despreader output).

Note that C*C=I, the identity matrix, since the codes are orthonormal. We are left with the original data vector x plus a despread noise vector C*v. The code matrix can be partitioned into the used-code (data-carrying code) matrix $C_1$ and the unused-code (non data-carrying code) matrix $C_2$:

$$C = [C_1 | C_2]$$

Where
$C_1$ is the N×k matrix containing the used codes, that is, the matrix C with the columns corresponding to the unused codes removed
$C_2$ is the N×(N−k) matrix containing the unused codes, that is, the matrix C with the columns corresponding to the used codes removed Consider the N−k unused codes only. The despreader output is given by $$y_2 = x_2 + C_2^* v$$

$$y_2 = C_2^* v$$

Where the subscript "2" indicates that only the N−k rows corresponding to the unused codes are included in the matrices and vectors:
$y_2$ is a length N−k column vector representing despread signal plus noise samples (soft decisions at despreader output).
$x_2$ is a length N−k column vector $[0 \, 0 \ldots 0]^T$ representing the N−k zero symbols that are transmitted on the unused codes.
$C_2$ is the N×(N−k) matrix whose columns are the N−k unused S-CDMA codes.
v is a length N column vector representing added burst noise samples, one sample per chip.

Here we note that the despreader output corresponding to the unused codes contains the contribution of impulse noise samples, including the impulse noise samples, and no signal contribution, i.e., $$C_2^* r = C_2^* v$$

Furthermore, we can write:

$$y = C^* r = \begin{bmatrix} y_1 \\ y_2 \end{bmatrix} = \begin{bmatrix} x + C_1^* v \\ C_2^* v \end{bmatrix}$$

Now, in order to cancel impulse noise, we need to estimate the term $C_1^* v$. To do so, we use the noise-only term $y_2 = C_2^* v$. We now take advantage of the fact that for burst noise, only m samples of the noise vector v are of significant amplitude. The remaining N−m samples are assumed to be small enough that they can be ignored, and treated as zeros. This is a reasonable model for many cases of burst noise, which it is assumed to be localized in its time support. We further assume that we know which elements of the burst noise v are nonzero. For terminology, we may refer to the known positions of the burst noise as the significant noise samples, and the other (assumed zero) noise samples as the null noise samples. We now further prune the matrices and vectors to remove the elements corresponding to the null elements of v. We are left with the reduced system of equations:

$$y_2 = C_v^* v_{nz}$$

Where:
- $y_2$ is a length N–k column vector representing despread signal plus noise samples (soft decisions at despreader output).
- $v_{nz}$ is a length m column vector of non-zero noise samples only, where m is strictly less than or equal to the number of unused codes (N–k).
- $C_v$ is the (N–k)×m matrix whose columns are the N–k unused S-CDMA codes, with the rows corresponding to the null elements of v removed, leaving only the m chips in each code which correspond to the significant elements of v.

Using standard matrix optimization techniques, we can derive the optimal estimate for $v_{nz}$ given $y_2$, in the least-squares sense. The optimal estimate is given by $$\hat{v}_{nz} = [C_v C_v^*]^{-1} C_v y_2$$

We have now solved for the m estimated noise samples $\hat{v}_r$, and earlier we assumed knowledge of their positions in the length-N noise vector v. We can therefore reconstruct the full-size noise vector by placing zeros in the null positions and the estimated noise samples in the significant positions. The result is the length-N estimated burst-noise vector $\hat{v}$.

Now that we have estimated the noise, we may subtract it from the received vector r. This step removes the estimated interference from the received signal, that is, performs the desired cancellation. We then despread r with the matrix of used codes to get the despread symbols. The equation for these operations is:

$$\hat{x}_1 = C_1^*(r - \hat{v})$$

This form of the equation shows the interference being removed before the despreader.

Equivalently, the multiplication by the despreading matrix can be distributed over the subtraction to give:

$$\hat{x}_1 = C_1^* r - C_1^* \hat{v}$$
$$= y_1 - C_1^* \hat{v}$$

This form of the equation shows the interference being removed after the despreader. Unlimited further forms of the equation may be derived without departing from the spirit and scope of the invention.

Another variant embodiment of the present invention may be performed by applying the linear combiner at the chip level instead of the de-spread symbol level. In this approach, the 128 chips (again using the 128 code embodiment example) used in the de-spreader for the desired code are adapted (for example, using the LMS method, a LS method, or another iterative solution) until they converge to the near-optimal adapted de-spreading code. This adapted de-spreading code will be complex-valued and will be a linear combination of all 128 de-spreading codes. In this approach there are 128 adaptive complex weights that need to be trained, so convergence is slower than for the baseline approach in which, for example, only 8 weights need to be trained for the 8 unused codes.

Other methods for determining the combining weights may also be employed other than iterative solutions such as LMS and LS. For example, predetermined sets of combining weights may be stored for expected operational cases. For example, when burst noise has a duration of 16 chips or less of a spreading sequence, sets of combining weights may be stored and retrieved as required. In such case, a first set of combining weights would be retrieved and applied to cancel burst noise that corrupts chips 1-16, a second set of combining weights would be retrieved and applied for use on burst noise that arrives during chips 2-17, a third set of combining weights would be retrieved and applied for burst noise that arrives during chips 3-18, . . . , and an Nth set of combining weights would be retrieved and applied for burst noise that arrives during chips 113-128. This implementation obviates real-time computation of combining weights for the expected operational cases.

The general applicability of the present invention across a wide variety of contexts is to be understood. The present invention is operable to cancel not only narrowband interference, but any interference that occupies a small number of dimensions in the signal space. The first example, given above, is narrowband interference. The example that is emphasized in the present disclosure is impulse or burst noise. However, other types of interference may be substantially eliminated according to the present invention as well. A narrowband signal occupies a small number of DFT bins (DFT: discrete Fourier transform—one example of an orthonormal expansion) bins, showing that it occupies a small number of dimensions in signal space.

An extremely simple example is a CW (Continuous Wave) signal whose frequency is an integer multiple of the de-spread symbol rate; this CW signal occupies only a single bin in the DFT, or only one dimension in the signal space, where each dimension is, in this case, one DFT bin. Another example is a short burst of noise (impulse or burst noise). A short burst signal occupies a small number of time samples, again showing that it too occupies a small number of dimensions, where each dimension is, in this case, a time sample. Other types of signals can be constructed without limit that satisfies the property that they occupy a small number of dimensions. All such signals can be canceled by the present technique.

Again, the DFT is just one example of an orthonormal expansion. A second example is the code matrix in DOCSIS 2.0 S-CDMA. Innumerable other orthonormal transforms exist. If a signal occupies a small number of dimensions in any orthonormal transform, the present invention's technique will help cancel it.

The present invention may also be implemented to use unused spatial dimensions to cancel interference according to the present invention. For example, we can generalize the technique to spatial dimensions as well. One such interpretation of spatial dimensions is with respect to MIMO (multi-input multi-output) systems. We may designate certain transmit antennas to transmit zeros at certain times. At the receiver, we may also utilize the samples from extra receive antennas to cancel interference.

In any of the embodiments described herein, the present invention is operable to store pre-computed weights using any number of various storage techniques, such as a look up table (LUT), memory, or some other storage technique. This may be beneficial in some cases where it may be impractical to compute the weights fast enough, so we may want to pre-compute some "canned" sets of weights. As an example, consider very wideband interference that occupies ½ the bandwidth of the desired signal. Assuming an S-CDMA system, we will need to have 64 unused codes out of 128 total codes. Each desired code now has 64 adaptive weights that need to be solved for. This implies a very large matrix to invert, which is very complex to implement in real time. However, we note that in our favor, there are very few notches of this size (half the bandwidth) to go across the band. If, for example, we pre-compute the weights for several wideband notches and store the weight sets, then we can simply select the notch that most closely matches the interference when it occurs.

The present invention is also operable to support adjusting and tracking of pre-computed weights. As an extension to the above concept of storing pre-computed weights, we may store a single prototype set of weights, and modify the weights to move the notch around. For example, we can adjust the frequency of the notch without having to completely re-compute the weights. We can also adjust the depth of the notch. We can weight and superimpose pre-computed notches to build up a more complex notch structure. We can build a tracking loop that automatically adjusts the frequency (or other parameter) of the notch as the interference changes. Say there is narrowband interference, and we have applied a notch that cancels it. Now let the interference slew its frequency. We can implement a tracking loop that automatically slews the frequency location of the notch to track the frequency of the interference. There are many ways to implement such a tracking loop. One way is by taking an FFT of the interference, and tracking the energy in the peak corresponding to the interference. Another way is to dither the location of the notch, and measure the power or SNR at the output. We then move the notch in the direction of increasing SNR or decreasing interference or total power. Many other tracking methods can be devised.

The present invention may also be implemented to perform adjacent channel interference (ACI) cancellation when performing interference cancellation. For example, the canceller can also be used to cancel ACI. Consider a desired signal with signals present in the upper and lower adjacent channels. If the adjacent channel signals overlap slightly with the desired-signal band, ACI results. ACI is in general colored and can therefore be canceled using the present canceller technique.

In performing the processing, the present invention may employ a sliding window. The processing has thus far been described as being done on a block basis, where a block is typically a symbol of 128 chips in the DOCSIS 2.0 implementation. However, the present invention is also operable when employing a sliding block approach as well. This may have the greatest benefit when the code matrix is the identity matrix, where no spreading occurs.

Code hopping is defined in the DOCSIS 2.0 spec as a process whereby the code matrix is modified by a cyclic rotation of the rows of the entire code matrix (except possibly the all—1's code) on each spreading interval. This causes the set of unused codes to be different on each spreading interval, requiring the re-computation of the adaptive weights in the canceller on each spreading interval. It would be better to hop over the set of codes excluding the unused codes, so that the unused codes will be the same on each spreading interval. This would obviate the need to re-computation of the adaptive weights on each spreading interval, reducing processing complexity. Or, we can just turn off code hopping when the canceller is used. However, this latter approach removes the benefits of code hopping, which include fairness (equality of average performance) for all users.

In the case of the DOCSIS 2.0 S-CDMA code matrix, the rows, or basis functions, are nearly cyclic shifts of each other, with the exception of code 0. This property relates adjacent codes to shifts in time by one chip. This in turn relates the linear combiner used on the de-spreader outputs to a FIR filter in the time domain. This implies that the adaptive weights for the unused codes are similar to the weights that are produced by the time domain interference cancellation structure used for TDMA. The latter weights can be computed efficiently by the Trench method. Hence we might use the Trench method to compute an initial set of weights for the subspace-based canceller, and iterate the weights to a more exact solution using the LMS or similar tracking method.

In addition, a decision feedback equalizer (DFE)-like structure may also be performed, as follows. The canceller begins by using the de-spreader outputs of codes 1-8 (for example) in the linear combiner to estimate the output of the code 9 de-spreader. A hard decision is made on the symbol from code 9. Now that the symbol on code 9 is available, it can be used to estimate the symbol on code 10. Once the symbol on code 10 is available, it can be used to estimate the symbol on code 11, and so on. A DFE-like structure can be constructed that can run in both directions.

As mentioned and described above, the subspace canceller can be applied to an arbitrary code matrix (basis set). One such basis set is the discrete Fourier transform (DFT). In this context one should also mention the fast DFT methods collectively referred to as the fast Fourier transform (FFT). The DFT is not well suited for narrowband interference cancellation in the receiver without modifications to the cancellation approach. This is because each basis function, the complex tone $e^{jn\omega}$ (or alternatively written as $\exp(jn\omega)$), is designed to have minimal support in the frequency domain. The basis functions cannot cancel a narrowband interferer without very large weights. Instead, locating the canceller predominantly in the transmitter is a better choice. One simply does not transmit those tones that overlap with the interference, designating them as unused "codes" or tones. This approach has been known in the industry for some time in conjunction with discrete multi-tone (DMT) or orthogonal frequency division multiplexing (OFDM) systems.

Moreover, the subspace canceller can be integrated with FEC coding. In one approach, a Reed-Solomon code can provide parity symbols that are transmitted on the unused spreading codes instead of zero symbols. In another approach, different SNRs may exist on different spreading codes (for example, when spreading code hopping is turned off). In this case unequal transmitted power may be sent on each spreading code, or unequal numbers of bits per symbol of modulation. Or, unequal coding strength can be used on each spreading code: for example, rate ⅞ on one spreading code and rate ¾ on another spreading code. An important point is that these approaches will give a better result than code hopping. In code hopping, performance is averaged over all spreading codes. It is better to use our prior, knowledge of which spreading codes are disadvantaged, and give them more processing power or transmit power.

The present invention is also operable, when performing interference cancellation, to perform adjustment of transmitted spectrum to meet a desired spectral mask. It may be desirable to attenuate certain portions of the spectrum using the subspace canceller. In these applications the canceller is predominantly located in the transmitter. One example is in a wireless local area network (LAN) application. Here one has to place a notch in the transmit spectrum at the spectral location of the XM satellite radio service. The subspace canceller has a great advantage over a notch filter. A notch filter can notch out a designated spectral region, but in doing so, it distorts the desired signal. The subspace canceller can create the notch without distorting the desired signal. The subspace canceller may also have the following advantage over a notch filter. A notch filter can cause large excursions in the transmitted power, whereas the subspace canceller does not.

The interference cancellation according to the present invention may also be integrated with pre-coding. The subspace canceller can be integrated with pre-coding, such as Tomlinson-Harashima pre-coding. We note that the subspace canceller can be used for narrowband interference cancellation and also for equalization of a deep notch in the channel. These are two applications of pre-coding. Hence, if subspace cancellation and pre-coding were combined, would we get some of the advantages of both.

In view of the above detailed description of the invention and associated drawings, other modifications and variations will now become apparent. It should also be apparent that such other modifications and variations may be effected without departing from the spirit and scope of the invention.

The invention claimed is:

1. A communication system that is operable to perform burst noise cancellation, comprising:
a transmitter that is operable to produce a spread signal that comprises at least one known-value symbol spread by a plurality of non data-carrying orthogonal codes and data symbols spread by at least one data-carrying orthogonal code, the transmitter further operable to transmit the spread signal across a communication link; and
a receiver that is operable to receive the spread signal after being transmitted across the communication link, the received spread signal including burst noise, the receiver comprising:
a burst noise detector that is operable to determine burst noise affected chips of the orthogonal codes;
a weight computation functional block that is operable to calculate a plurality of complex-valued combining weights based upon the burst noise affected chips; and
a vector de-spreader and a linear combiner that are operable in combination to use the plurality of non data-carrying orthogonal codes, the at least one data-carrying orthogonal code, and the plurality of complex-valued combining weights to de-spread the received spread signal to produce the data symbols with the burst noise substantially removed.

2. The communication system of claim 1, wherein:
the vector de-spreader is operable to:
despread the received spread signal using the plurality of non data-carrying orthogonal codes to produce a plurality of non data-carrying despread signals; and
despread the received spread signal using the at least one data-carrying orthogonal code to produce at least one data-carrying despread signal; and
the linear combiner is operable to:
apply the plurality of complex-valued combining weights to the plurality of non data-carrying despread signals to produce a plurality of complex-valued adjusted non data-carrying despread signals; and
combine the plurality of complex-valued adjusted non data-carrying despread signals with the at least one data-carrying despread signal to produce the data symbols with the burst noise substantially removed.

3. The communication system of claim 1, wherein:
the vector de-spreader is operable to:
despread the received spread signal using the plurality of non data-carrying orthogonal codes to produce a plurality of non data-carrying despread signals; and
despread the received spread signal using the at least one data-carrying orthogonal code to produce at least one data-carrying despread signal; and the linear combiner is operable to:
apply the plurality of complex-valued combining weights to the plurality of non data-carrying despread signals and to the at least one data-carrying despread signal to produce a plurality of complex-valued adjusted despread signals; and
combine the plurality of complex-valued adjusted despread signals to produce the data symbols with the burst noise substantially removed.

4. The communication system of claim 1, wherein:
the linear combiner is operable to:
apply the plurality of complex-valued combining weights to the plurality of non data-carrying orthogonal codes to produce a plurality of complex-valued weighted non-data carrying orthogonal codes; and
combine the plurality of complex-valued weighted non-data carrying orthogonal codes with the at least one data-carrying orthogonal code to produce an adapted rotated code; and
the vector de-spreader is operable to despread the received spread signal using the adapted rotated code to produce the data symbols with the burst noise substantially removed.

5. The communication system of claim 1, wherein:
the linear combiner is operable to:
apply the plurality of complex-valued combining weights to the plurality of non data-carrying orthogonal codes and to the at least one data-carrying orthogonal code to produce a plurality of complex-valued weighted orthogonal codes; and
combine the plurality of complex-valued weighted orthogonal codes to produce an adapted rotated code; and
the vector de-spreader is operable to despread the received spread signal using the adapted rotated code to produce the data symbols with the burst noise substantially removed.

6. The communication system of claim 1, wherein the weight computation functional block employs at least one of least means square processing and least square processing to calculate the plurality of complex-valued combining weights.

7. The communication system of claim 1, wherein the data symbols are modulated according to at least one of Binary Phase Shift Keying (BPSK), Quadrature Phase Shift Keying (QPSK), 8 Quadrature Amplitude Modulation (QAM), 16 QAM, 32 QAM, 64 QAM, 128 QAM, 256 QAM, 516 QAM, and 1024 QAM.

8. The communication system of claim 1, wherein the receiver comprises at least one of a multi-channel headend physical layer burst receiver, a single chip wireless modem, a single chip Data Over Cable Service Interface Specification (DOCSIS)/EuroDOCSIS cable modem, a base station receiver, a mobile receiver, a satellite earth station, a tower receiver, a high definition television set top box receiver, and a transceiver.

9. A communication receiver that is operable to receive a spread signal formed from at least one known-value symbol spread by a plurality of non data-carrying orthogonal codes and data symbols spread by at least one data-carrying orthogonal code, the spread signal also including burst noise coupled to the spread signal during transmission, the receiver comprising:
a burst noise detector that is operable to determine burst noise affected chips of the orthogonal codes;
a weight computation functional block that is operable to calculate a plurality of complex-valued combining weights based upon the burst noise affected chips;
a vector de-spreader and a linear combiner that are operable in combination to use the plurality of non data-carrying orthogonal codes, the at least one data-carrying orthogonal code, and the plurality of complex-valued combining weights to de-spread the received spread signal to produce the data symbols with the burst noise substantially removed.

10. The communication receiver of claim 9, wherein:
the vector de-spreader is operable to:
despread the received spread signal using the plurality of non data-carrying orthogonal codes to produce a plurality of non data-carrying despread signals; and
despread the received spread signal using the at least one data-carrying orthogonal code to produce at least one data-carrying despread signal; and
the linear combiner is operable to:
apply the plurality of complex-valued combining weights to the plurality of non data-carrying despread signals to produce a plurality of complex-valued adjusted non data-carrying despread signals; and
combine the plurality of complex-valued adjusted non data-carrying despread signals with the at least one data-carrying despread signal to produce the data symbols with the burst noise substantially removed.

11. The communication receiver of claim 9, wherein:
the vector de-spreader is operable to:
despread the received spread signal using the plurality of non data-carrying orthogonal codes to produce a plurality of non data-carrying despread signals; and
despread the received spread signal using the at least one data-carrying orthogonal code to produce at least one data-carrying despread signal; and
the linear combiner is operable to:
apply the plurality of complex-valued combining weights to the plurality of non data-carrying despread signals and to the at least one data-carrying despread signal to produce a plurality of complex-valued adjusted despread signals; and
combine the plurality of complex-valued adjusted despread signals to produce the data symbols with the burst noise substantially removed.

12. The communication receiver of claim 9, wherein:
the linear combiner is operable to:
apply the plurality of complex-valued combining weights to the plurality of non data-carrying orthogonal codes to produce a plurality of complex-valued weighted non-data carrying orthogonal codes; and
combine the plurality of complex-valued weighted non-data carrying orthogonal codes with the at least one data-carrying orthogonal code to produce an adapted rotated code; and
the vector de-spreader is operable to despread the received spread signal using the adapted rotated code to produce the data symbols with the burst noise substantially removed.

13. The communication receiver of claim 9, wherein:
the linear combiner is operable to:
apply the plurality of complex-valued combining weights to the plurality of non data-carrying orthogonal codes and to the at least one data-carrying orthogonal code to produce a plurality of complex-valued weighted orthogonal codes; and
combine the plurality of complex-valued weighted orthogonal codes to produce an adapted rotated code; and
the vector de-spreader is operable to despread the received spread signal using the adapted rotated code to produce the data symbols with the burst noise substantially removed.

14. The communication receiver of claim 9, wherein the weight computation functional block employs at least one of least means square processing and least square processing to calculate the plurality of complex-valued combining weights.

15. The communication receiver of claim 9, wherein the data symbols are modulated according to at least one of Binary Phase Shift Keying (BPSK), Quadrature Phase Shift Keying (QPSK), 8 Quadrature Amplitude Modulation (QAM), 16 QAM, 32 QAM, 64 QAM, 128 QAM, 256 QAM, 516 QAM, and 1024 QAM.

16. The communication receiver of claim 9, wherein the receiver comprises at least one of a multi-channel headend physical layer burst receiver, a single chip wireless modem, a single chip Data Over Cable Service Interface Specification (DOCSIS)/EuroDOCSIS cable modem, a base station receiver, a mobile receiver, a satellite earth station, a tower receiver, a high definition television set top box receiver, and a transceiver.

17. A method in a communication device for canceling burst noise in a received spread signal that was formed from at least one known-value symbol spread by a plurality of non data-carrying orthogonal codes and data symbols spread by at least one data-carrying orthogonal code and that was received via a channel that introduced burst noise, the method comprising:
receiving the spread signal;
determining chips of the orthogonal codes that are affected by the burst noise;
calculating a plurality of complex-valued combining weights based upon the burst noise affected chips;
using the plurality of non data-carrying orthogonal codes, the at least one data-carrying orthogonal code, and the plurality of complex-valued combining weights to de-spread the received spread signal to produce the data symbols with the burst noise substantially removed.

18. The method of claim 17, wherein using the plurality of non data-carrying orthogonal codes, the at least one data-carrying orthogonal code, and the plurality of complex-valued combining weights to de-spread the received spread signal to produce the data symbols with the burst noise substantially removed comprises:
despreading the spread signal using the plurality of non data-carrying orthogonal codes to produce a plurality of non data-carrying despread signals;
despreading the spread signal using the at least one data-carrying orthogonal code to produce at least one data-carrying despread signal;
applying the plurality of complex-valued combining weights to the plurality of non data-carrying despread signals to produce a plurality of complex-valued adjusted non data-carrying despread signals; and
combining the plurality of complex-valued adjusted non data-carrying despread signals with the at least one data-carrying despread signal to produce the data symbols with the burst noise substantially removed.

19. The method of claim 17, wherein using the plurality of non data-carrying orthogonal codes, the at least one data-carrying orthogonal code, and the plurality of complex-valued combining weights to de-spread the received spread signal to produce the data symbols with the burst noise substantially removed comprises:
despreading the spread signal using the plurality of non data-carrying orthogonal codes to produce a plurality of non data-carrying despread signals; and
despreading the spread signal using the at least one data-carrying orthogonal code to produce at least one data-carrying despread signal;
applying the plurality of complex-valued combining weights to the plurality of non data-carrying despread signals and to the at least one data-carrying despread signal to produce a plurality of complex-valued adjusted despread signals; and combining the plurality of complex-valued adjusted despread signals to produce the data symbols with the burst noise substantially removed.

20. The method of claim 17, wherein using the plurality of non data-carrying orthogonal codes, the at least one data-carrying orthogonal code, and the plurality of complex-valued combining weights to de-spread the received spread signal to produce the data symbols with the burst noise substantially removed comprises:

applying the plurality of complex-valued combining weights to the plurality of non data-carrying orthogonal codes to produce a plurality of complex-valued weighted non-data carrying orthogonal codes;

combining the plurality of complex-valued weighted non-data carrying orthogonal codes with the at least one data-carrying orthogonal code to produce an adapted rotated code; and despreading the spread signal using the adapted rotated code to produce the data symbols with the burst noise substantially removed.

21. The method of claim 17, wherein using the plurality of non data-carrying orthogonal codes, the at least one data-carrying orthogonal code, and the plurality of complex-valued combining weights to de-spread the received spread signal to produce the data symbols with the burst noise substantially removed comprises:

applying the plurality of complex-valued combining weights to the plurality of non data-carrying orthogonal codes and to the at least one data-carrying orthogonal code to produce a plurality of complex-valued weighted orthogonal codes;

combining the plurality of complex-valued weighted orthogonal codes to produce an adapted rotated code; and despreading the received spread signal using the adapted rotated code to produce the data symbols with the burst noise substantially removed.

22. The method of claim 17, wherein determining chips of the orthogonal codes that are affected by the burst noise includes using at least one of least means square processing and least square processing to calculate the plurality of complex-valued combining weights.

* * * * *